United States Patent
Ito et al.

(10) Patent No.: US 9,989,939 B2
(45) Date of Patent: Jun. 5, 2018

(54) WIRELESS DEVICE, CONTROLLED DEVICE CONTROLLED BY THE SAME, CONTROL SYSTEM INCLUDING A WIRELESS DEVICE AND CONTROLLED DEVICE, AND PROGRAM FOR CAUSING A COMPUTER IN A WIRELESS DEVICE TO CONTROL A CONTROLLED DEVICE

(71) Applicants: NEC Communication Systems, Ltd., Minato-ku, Tokyo (JP); A School Corporation Kansai University, Suita-shi, Osaka (JP); Advanced Telecommunications Research Institute International, Soraku-gun, Kyoto (JP)

(72) Inventors: Tetsuya Ito, Tokyo (JP); Yukihiro Hara, Tokyo (JP); Masahito Iwai, Tokyo (JP); Yuma Asada, Osaka (JP); Yuta Okamoto, Osaka (JP); Shota Kakibuti, Osaka (JP); Ryou Nagase, Osaka (JP); Shohei Fukayama, Osaka (JP); Hironori Fukui, Osaka (JP); Noboru Miyamoto, Osaka (JP); Hiroyuki Yomo, Osaka (JP); Takatoshi Kimura, Kyoto (JP); Suhua Tang, Kyoto (JP); Akio Hasegawa, Kyoto (JP)

(73) Assignees: NEC COMMUNICATION SYSTEMS, LTD., Tokyo (JP); A SCHOOL CORPORATION KANSAI UNIVERSITY, Osaka (JP); ADVANCED TELECOMMUNICATIONS RESEARCH INSTITUTE INT, Kyoto (JP)

( * ) Notice: Subject to any disclaimer, the term of this patent is extended or adjusted under 35 U.S.C. 154(b) by 412 days.

(21) Appl. No.: 14/405,190

(22) PCT Filed: Mar. 26, 2013

(86) PCT No.: PCT/JP2013/058838
§ 371 (c)(1),
(2) Date: Dec. 3, 2014

(87) PCT Pub. No.: WO2014/030377
PCT Pub. Date: Feb. 27, 2014

(65) Prior Publication Data
US 2015/0148921 A1    May 28, 2015

(30) Foreign Application Priority Data
Aug. 21, 2012   (JP) .................... 2012-182433

(51) Int. Cl.
*G08B 15/02* (2006.01)
*G05B 15/02* (2006.01)
(Continued)

(52) U.S. Cl.
CPC ........... *G05B 15/02* (2013.01); *G05B 19/042* (2013.01); *G08C 17/02* (2013.01); *H04W 4/80* (2018.02);
(Continued)

(58) Field of Classification Search
CPC .................. G05B 15/02; G05B 19/042; G05B 2219/25196; G05B 2219/33192;
(Continued)

(56) References Cited

U.S. PATENT DOCUMENTS

| 8,704,644 B2 * | 4/2014 | Uno ....................... G08C 17/02 340/12.22 |
| 2004/0121725 A1 * | 6/2004 | Matsui ................... G08C 17/02 455/3.06 |

(Continued)

TBL1

| BIT SEQUENCE | FRAME LENGTH ($\mu$ s) |
|---|---|
| 000100010000 | L=230 |
| 000100010001 | L=260 |
| 001000100000 | L=290 |
| 001000100001 | L=320 |
| 001100110000 | L=350 |
| 001100110001 | L=380 |
| 001100110010 | L=410 |
| 000101000000 | L=440 |
| 000101000001 | L=470 |

FOREIGN PATENT DOCUMENTS

| JP | 10-327476 A | 12/1998 |
|---|---|---|
| JP | 11-234201 A | 8/1999 |

(Continued)

OTHER PUBLICATIONS

Official Communication issued in corresponding Japanese Patent Application No. 2014-531516, dated Jun. 9, 2015.

(Continued)

*Primary Examiner* — Mohamed Barakat
(74) *Attorney, Agent, or Firm* — Keating & Bennett, LLP

(57) ABSTRACT

A wireless device (1) searches a database that stores positional information of the wireless device (1), a device (2-4) and control identifiers for controlling the devices (2-4) in an associated manner, acquires a device (2-4) located near the wireless device (1) and a control identifier for controlling the device (2-4) based on the positional information of the wireless device (1), and, based on the device (2-4) and the control identifier for controlling the device (2-4) that have been acquired, determines a controlled device (at least one of the devices (2-4)) and generates a control identifier for the controlled device. The wireless device (1) transmits, by wireless communication, the generated controlled identifier to a receiver mounted on the controlled device to control the controlled device.

16 Claims, 37 Drawing Sheets

(51) Int. Cl.
   *G08C 17/02* (2006.01)
   *G05B 19/042* (2006.01)
   *H04W 4/02* (2018.01)

(52) U.S. Cl.
   CPC ........... *G05B 2219/25196* (2013.01); *G05B 2219/33192* (2013.01); *G08C 2201/21* (2013.01); *H04W 4/02* (2013.01)

(58) Field of Classification Search
CPC ... G08C 17/02; G08C 2201/21; H04W 4/008; H04W 4/02; H04W 64/00
See application file for complete search history.

(56) References Cited

U.S. PATENT DOCUMENTS

| 2004/0196801 | A1 | 10/2004 | Hiramatsu | |
|---|---|---|---|---|
| 2009/0067356 | A1* | 3/2009 | Sakamoto | H04W 52/0229 370/311 |
| 2009/0177397 | A1* | 7/2009 | Routtenberg | G06Q 30/02 701/469 |
| 2010/0228868 | A1* | 9/2010 | Sakai | H04W 28/18 709/228 |

FOREIGN PATENT DOCUMENTS

| JP | 2000-303729 A | 10/2000 |
|---|---|---|
| JP | 2001-69237 A | 3/2001 |
| JP | 2003-218785 A | 7/2003 |
| JP | 2003-244776 A | 8/2003 |
| JP | 2003-283471 A | 10/2003 |
| JP | 2004-166193 A | 6/2004 |
| JP | 2006-180379 A | 7/2006 |
| JP | 2007-104174 A | 4/2007 |
| JP | 2010-003469 A | 1/2010 |

OTHER PUBLICATIONS

Official Communication issued in corresponding Japanese Patent Application No. 2014-531516, dated Feb. 2, 2016.
Official Communication issued in International Patent Application No. PCT/JP2013/058838, dated Jun. 18, 2013.
Iwai et al., "Improved Wake-up Detection Schemes and Reduced False Wake-up Probability Using Optimal Wake-up ID", IEICE Technical Report, vol. 111, No. 468, Mar. 1, 2012, pp. 173-178.
Official Communication issued in corresponding Japanese Patent Application No. 2011-185243, dated Feb. 24, 2015.
Ito, T. et al., "An Overview of Radio-On-Demand Networks for Green Wireless Access", IEICE General Conference, B-6-132, Mar. 14-17, 2011, p. 132.
Kondo, Y. et al., "Radio-On-Demand Wake-up using Wireless LAN Signal", IEICE Technical Report, NS2010-185, Mar. 2011, pp. 123-128.
Namba, K. et al., "ID Design for Radio-On-Demand Networks Employing Wake-up Radio", IEICE Technical Report, NS2010-187, Mar. 2011, pp. 135-140.

* cited by examiner

FIG. 4

CID

| CONTROL OBJECT | CONTROL CLASSIFICATION | CONTROL VALUE |

FIG. 5

<table>
<tr><th colspan="3">POSITIONAL INFORMATION</th><th colspan="3">CONTROL IDENTIFIER</th><th></th></tr>
<tr><th>LONGITUDE/LATITUDE</th><th>LOCATION</th><th>NAME</th><th>CONTROL OBJECT</th><th>CONTROL CLASSIFICATION</th><th>CONTROL VALUE</th></tr>
<tr><td>LAT. x° N., LONG. y°</td><td>4-CHOME A BLDG.</td><td>CEILING LIGHT</td><td>0001 (OBJECT 1)</td><td>0001 (LIGHT SWITCH)</td><td>0001 (ON)</td></tr>
<tr><td>LAT. x° N., LONG. y°</td><td>4-CHOME A BLDG.</td><td>CEILING LIGHT</td><td>0001 (OBJECT 1)</td><td>0001 (LIGHT SWITCH)</td><td>0000 (OFF)</td></tr>
<tr><td>LAT. a° N., LONG. b°</td><td>4-CHOME A BLDG.</td><td>FLOOR AIR CONDITIONER</td><td>0001 (OBJECT 2)</td><td>0010 (AIR CONDITIONER'S TEMPERATURE)</td><td>0001 (UP)</td></tr>
<tr><td>LAT. a° N., LONG. b°</td><td>4-CHOME A BLDG.</td><td>FLOOR AIR CONDITIONER</td><td>0001 (OBJECT 2)</td><td>0010 (AIR CONDITIONER'S TEMPERATURE)</td><td>0000 (DOWN)</td></tr>
<tr><td>LAT. a° N., LONG. c°</td><td>4-CHOME B BLDG.</td><td>INDIRECT LIGHTING FOR WALLS</td><td>0001 (OBJECT 3)</td><td>0011 (MODULATED LIGHT)</td><td>0010 (LARGE)</td></tr>
<tr><td>LAT. a° N., LONG. c°</td><td>4-CHOME B BLDG.</td><td>INDIRECT LIGHTING FOR WALLS</td><td>0001 (OBJECT 3)</td><td>0011 (MODULATED LIGHT)</td><td>0001 (MEDIUM)</td></tr>
<tr><td>LAT. a° N., LONG. c°</td><td>4-CHOME B BLDG.</td><td>INDIRECT LIGHTING FOR WALLS</td><td>0001 (OBJECT 3)</td><td>0011 (MODULATED LIGHT)</td><td>0000 (SMALL)</td></tr>
<tr><td>LAT. w° N., LONG. z°</td><td>5-CHOME PARKING</td><td>LOCK WEST GATE</td><td>0001 (OBJECT 1)</td><td>0100 (LOCK/UNLOCK GATE)</td><td>0001 (UNLOCK)</td></tr>
<tr><td>LAT. w° N., LONG. z°</td><td>5-CHOME PARKING</td><td>LOCK WEST GATE</td><td>0001 (OBJECT 1)</td><td>0100 (LOCK/UNLOCK GATE)</td><td>0000 (LOCK)</td></tr>
</table>

DB

FIG. 6
TBL1
| BIT SEQUENCE | FRAME LENGTH ($\mu s$) |
|---|---|
| 000100010000 | L=230 |
| 000100010001 | L=260 |
| 001000100000 | L=290 |
| 001000100001 | L=320 |
| 001100110000 | L=350 |
| 001100110001 | L=380 |
| 001100110010 | L=410 |
| 000101000000 | L=440 |
| 000101000001 | L=470 |
FIG. 7
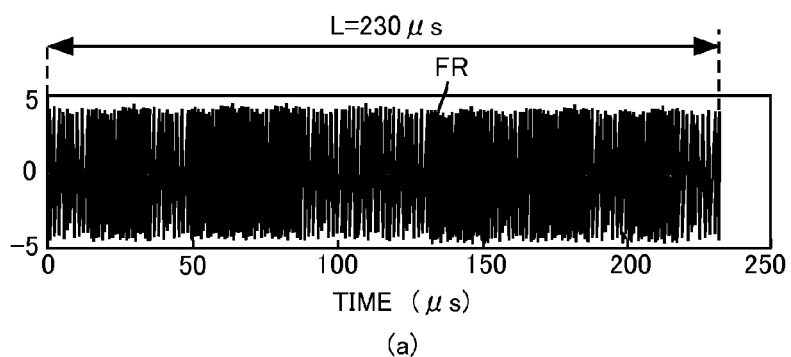
(a)
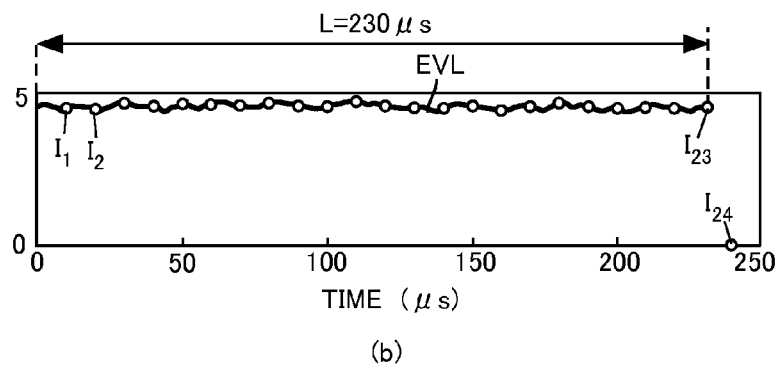
(b)

| CUMULATIVE VALUE | BIT SEQUENCE |
|---|---|
| $22 \leq c \leq 24$ | 000100010000 |
| $25 \leq c \leq 27$ | 000100010001 |
| $28 \leq c \leq 30$ | 001000100000 |
| $31 \leq c \leq 33$ | 001000100001 |
| $34 \leq c \leq 36$ | 001100110000 |
| $37 \leq c \leq 39$ | 001100110001 |
| $40 \leq c \leq 42$ | 001100110010 |
| $43 \leq c \leq 45$ | 000101000000 |
| $46 \leq c \leq 48$ | 000101000001 |

TBL2

FIG. 15

CONTROL OBJECT: 4-CHOME A BLDG., LAT. x° N., LONG. y°
OBJECT 1, LIGHT SWITCH, CHANGE INFORMATION OF ON

| TIME | DETAILS OF CHANGE |
|---|---|
| 09:30 | SHIFT INITIAL VALUES BY 1 BIT |
| 12:45 | INVERT PREVIOUS VALUES IN BIT |
| 13:00 | INVERT INITIAL VALUES IN BIT |
| 17:10 | CHANGE TO 010011101111 |
| 21:35 | INVERT PREVIOUS VALUES IN BIT |
| 03:00 | SHIFT PREVIOUS VALUES BY 3 BITS |

(a)

CONTROL OBJECT: 4-CHOME A BLDG., LAT. a° N., LONG. b°
OBJECT 2, AIR CONDITIONER'S TEMPERATURE, CHANGE INFORMATION OF UP

| TIME | DETAILS OF CHANGE |
|---|---|
| 08:30 | CHANGE TO 010111101111 |
| 08:45 | CHANGE TO 010010101111 |
| 09:00 | CHANGE TO 010011101011 |
| ⋮ | ⋮ |
| 17:00 | CHANGE TO 010011101111 |
| 17:15 | CHANGE TO 011011101111 |
| 17:30 | CHANGE TO 010111101101 |
| 17:45 | NO CID UNTIL 8:30 NEXT MORNING (CONTROL NOT ALLOWED) |

| POSITIONAL INFORMATION | | NAME | CONTROL IDENTIFIER | | |
|---|---|---|---|---|---|
| LONGITUDE/LATITUDE | LOCATION | | CONTROL OBJECT | CONTROL CLASSIFICATION | CONTROL VALUE |
| LAT. x° N., LONG. y° | 4-CHOME A BLDG. | BAG | ID 1 (OBJECT 1) | 0001 (CALLED OBJECT) | 0001 (LED ON) |
| LAT. x° N., LONG. y° | 4-CHOME A BLDG. | KEY | ID 1 (OBJECT 1) | 0010 (MONITORED OBJECT) | 0000 (MONITORING (TIME, LOCATION)) |

WIRELESS DEVICE, CONTROLLED DEVICE CONTROLLED BY THE SAME, CONTROL SYSTEM INCLUDING A WIRELESS DEVICE AND CONTROLLED DEVICE, AND PROGRAM FOR CAUSING A COMPUTER IN A WIRELESS DEVICE TO CONTROL A CONTROLLED DEVICE

TECHNICAL FIELD

The present invention relates to a wireless device, a controlled device controlled by the same, a control system including a wireless device and a controlled device, and a program for causing a computer in a wireless device to control a controlled device.

BACKGROUND ART

Wireless communication systems for reducing power consumption are known (Patent Document 1). The wireless communication system of Patent Document 1 includes a host, a router and an end device.

The router relays wireless communications between the host and the end device. Each of the router and the end device has a sleep mode and an active mode. The sleep mode is a state where the communication capability through Zigbee (registered trademark) is unavailable, and the active mode is a state where the communication capability through Zigbee is available.

When the end device in sleep mode detects abnormalities in temperature using a temperature sensor connected to itself, it transmits a WAKE-UP signal to the router. When the router receives the WAKE-UP signal from the end device, it transitions from the sleep mode to the active mode and relays wireless communications between the end device and the host.

When in the sleep mode, the router keeps active only two circuits, i.e. the frequency conversion circuit and the wave strength detection circuit, of the wireless circuitry that performs normal wireless communication, and uses these two circuits to detect the WAKE-UP signal.

Patent Document 1: JP 2007-104174 A

DISCLOSURE OF THE INVENTION

However, when the technique of Patent Document 1 for causing a device to transition from the sleep mode to the active mode using a WAKE-UP signal is applied to on/off control of a light or the like, it is difficult to specify a device (a light, for example) to be controlled by the controlling wireless device and to obtain a control identifier for controlling this device. Further, Patent Document 1 suffers from the problem that it is difficult to control a device based on information that specifies the transmitter of the WAKE-UP signal.

The present invention is made to solve these problems. An object of the present invention is to provide a wireless device capable of acquiring in a simple manner a control identifier for specifying a device to be controlled (a light, for example) and for controlling the device, and controlling the controlled device.

Another object of the present invention is to provide a controlled device that is controlled by a wireless device capable of acquiring in a simple manner a control identifier for specifying a device to be controlled (a light, for example) and for controlling the device, and controlling the controlled device.

Still another object of the present invention is to provide a control system including a wireless device capable of acquiring in a simple manner a control identifier for specifying a device to be controlled (a light, for example) and for controlling the device, and controlling the controlled device, and a controlled device that is controlled by this wireless device.

Yet another object of the present invention is to provide a control system capable of controlling a device based on information that specifies a transmitter.

Still another object of the present invention is to provide a program for causing a computer in a wireless device capable of acquiring in a simple manner a control identifier for specifying a device to be controlled (a light, for example) and for controlling the device, and controlling the controlled device, to control the controlled device.

According to an embodiment of the present invention, a wireless device includes a searching/acquiring means, a determining/generating means, and a transmitting means. The searching/acquiring means performs a searching/acquiring process that searches a database that stores, in an associated manner, positional information of the wireless device, a device and a control identifier for controlling the device, and acquires a device located near the wireless device and a control identifier for controlling the device based on the positional information of the wireless device. The determining/generating means performs a determining/generating process that determines a controlled device that is a device to be controlled and a control action for the controlled device based on the device located near the wireless device and the control identifier for controlling the device that have been acquired by the searching/acquiring means, and generates a control identifier for the controlled device based on the controlled device and the control action that have been determined. The transmitting means performs a transmitting process that transmits, by wireless communication, the control identifier generated by the determining/generating means to a receiver mounted on the controlled device determined by the determining/generating means. The control identifier includes specifying information that specifies the controlled device and control information that indicates the control action for the controlled device.

Also, according to an embodiment of the present invention, a controlled device is a controlled device controlled by the wireless device according to any one of claims 1 to 5, and includes a controlled element and a receiver. The controlled element is an electrical device that is to be controlled. The receiver receives the radio frame and, if a control identifier detected based on the received radio frame matches an identifier for the controlled device, controls the controlled element based on the detected control identifier.

Further, according to an embodiment of the present invention, a control system includes the wireless device according to any one of claims 1 to 5 and the controlled device according to claim 6 or 7.

Furthermore, according to an embodiment of the present invention, a control system includes a wireless device and a communication device. The wireless device transmits, at an arbitrary timing, first specifying information that specifies the wireless device. The communication device, upon receiving the first specifying information from the wireless device, transmits the first specifying information and second specifying information that specifies the communication device to a control device that controls a controlled device upon receiving the first specifying information.

Moreover, according to an embodiment of the present invention, a program for causing a computer to execute is a program for causing a computer to execute control of a controlled device in a wireless device, the program causing the computer to execute a first step in which a searching/acquiring means performs a searching/acquiring process that searches a database that stores, in an associated manner, positional information of the wireless device, a device and a control identifier for controlling the device, and acquires a device located near the wireless device and a control identifier for controlling the device based on the positional information of the wireless device; a second step in which a determining/generating means performs a determining/generating process that determines a controlled device that is a device to be controlled and a control action for the controlled device based on the device located near the wireless device and the control identifier for controlling the device that have been acquired by the searching/acquiring means, and generates a control identifier for the controlled device based on the controlled device and the control action that have been determined; and a third step in which a transmitting means performs a transmitting process that transmits, by wireless communication, the control identifier generated by the determining/generating means to a receiver mounted on the controlled device determined by the determining/generating means, where the control identifier includes specifying information that specifies the controlled device and control information that indicates the control action for the controlled device.

The wireless device according to embodiments of the present invention searches a database to acquire a device located near itself and a control identifier for the device based on its positional information, determines the controlled device and generates a control identifier for the controlled device based on the device and the control identifier for the device that have been acquired, and transmits the generated control identifier to a receiver of the controlled device. As a result, the wireless device acquires a control identifier for the controlled device based on the positional information of the wireless device and controls the controlled device.

Thus, a device to be controlled may be specified and a control identifier for controlling the device may be acquired in a simple manner to control the device that is controlled.

Further, since the controlled device according to embodiments of the present invention is a controlled device controlled by the wireless device according to any one of claims 1 to 5, a device to be controlled may be specified and may be controlled in a simple manner using a control identifier for controlling this device.

Furthermore, since the control system according to embodiments of the present invention includes the wireless device according to any one of claims 1 to 5 and the controlled device according to claim 6 or 7, a device to be controlled may be specified and a control identifier for controlling this device may be acquired in a simple manner to control the device that is controlled.

Moreover, in the control system according to embodiments of the present invention, the wireless device as a transmission source transmits, at an arbitrary timing, first specifying information that specifies the wireless device, and the communication device transmits the first specifying information and second specifying information that specifies the communication device to the control device that controls a controlled device upon receiving the first specifying information. As a result, after the control device receives the first specifying information from the communication device, it controls the controlled device.

Accordingly, the device may be controlled based on information that specifies the transmission source.

Further, the program for causing a computer to execute according to embodiments of the present invention causes a computer to execute the same operations as those of the wireless device described above.

Accordingly, a device to be controlled may be specified and a control identifier for controlling the device may be acquired in a simple manner to control the device that is controlled.

BRIEF DESCRIPTION OF THE DRAWINGS

FIG. 4 is a schematic diagram of a configuration of a control identifier.

FIG. 5 is a conceptual diagram of a database.

FIG. 6 shows a conversion table for bit sequence and frame length L, which indicates a time length of a radio frame.

FIG. 7 is a conceptual diagram of envelope detection and bit determination.

FIG. 15 shows specific examples of change rules according to which a control identifier may be changed over time.

FIG. 25 is a conceptual diagram of a database of Example Application 8.

BEST MODES FOR CARRYING OUT THE INVENTION

Figure 1:
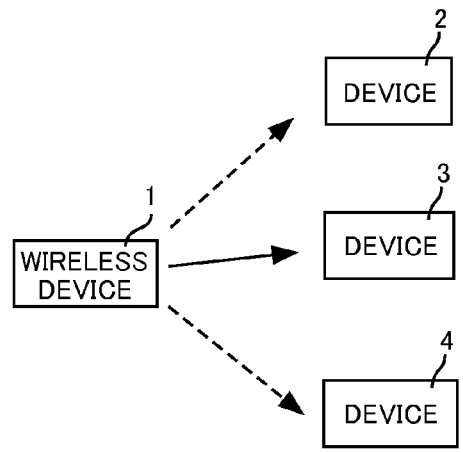
FIG. 1 is a schematic diagram of a control system according to an embodiment of the present invention.

Embodiments of the present invention will be described in detail with reference to the drawings. The same or corresponding parts in the drawings are labeled with the same numerals and their description will not be repeated.

FIG. 1 is a conceptual diagram of a control system according to an embodiment of the present invention. Referring to FIG. 1, a control system 10 according to an embodiment of the present invention includes a wireless device 1 and devices 2 to 4.

The wireless device 1 uses Global Positioning System (GPS), for example, to acquire its positional information. Then, based on the acquired positional information, the wireless device 1 acquires the devices 2 to 4 located near the wireless device and control identifiers CID for controlling the devices 2 to 4, using a method described further below. Subsequently, based on the acquired devices 2 to 4 and control identifiers CID, the wireless device 1 determines a controlled device that is a device to be controlled (at least one of the devices 2 to 4) and a control identifier CID for the controlled device.

Then, the wireless device 1 generates a radio frame having a frame length that represents the control identifier CID for the controlled device and transmits, via wireless communication, the generated radio frame to a receiver (not shown in FIG. 1) mounted on the controlled device.

Each of the devices 2 to 4 includes an electric device that is one of a light, speaker, monitor, camera and motor, for example. Each of the devices 2 to 4 receives a radio wave of a radio frame from the wireless device 1 when it is the controlled device, and, based on the received radio wave, detects a bit sequence using a method described further below. Then, if the detected bit sequence matches the control identifier CID for the relevant one of the device 2-4 (controlled device), each of the devices 2-4 controls the electric device (a light, for example) based on the control identifier CID.

Embodiment 1

Figure 2:
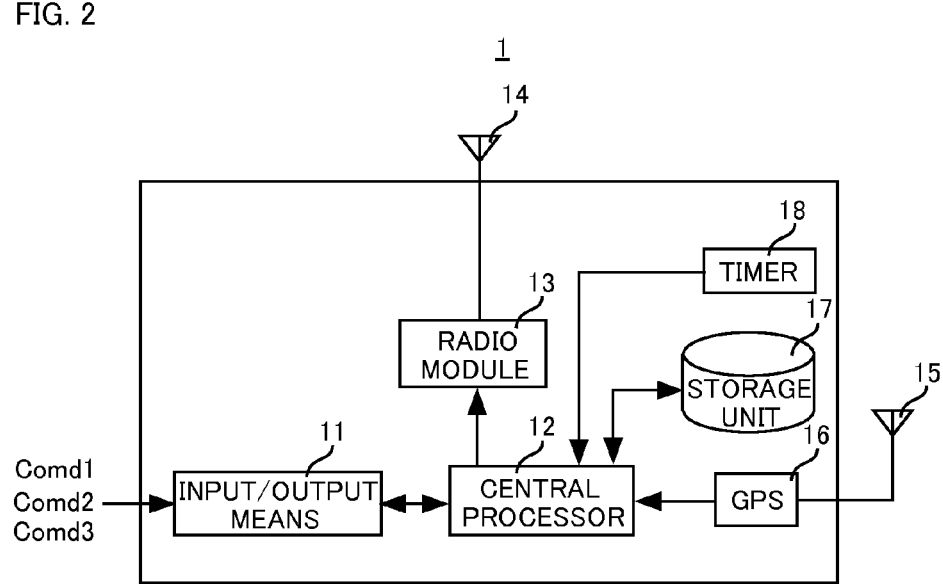
FIG. 2 is a schematic diagram of a configuration of the wireless device shown in FIG. 1 according to Embodiment 1.

FIG. 2 is a schematic diagram of a configuration of the wireless device 1 shown in FIG. 1 according to Embodiment 1. Referring to FIG. 2, the wireless device 1 includes an input/output means 11, a central processor 12, a radio module 13, antennas 14 and 15, a GPS 16, a storage unit 17, and a timer 18.

The input/output means 11 includes a display device. The input/output means 11 receives from a user of the wireless device 1 a command signal Comd1 for commanding control of an electric device mounted on at least one of the devices 2 to 4, and provides the received command signal Comd1 to the central processor 12.

When the input/output means 11 receives the devices 2 to 4 and control actions for the devices 2 to 4 from the central processor 12, it uses its display device to display the received devices 2 to 4 and control actions. Then, the input/output means 11 receives from the user of the wireless device 1 a command signal Comd2 that indicates which of the devices 2 to 4 is to be the controlled device and a command signal Comd3 that commands a control action for the controlled device, and outputs the received command signals Comd2 and Comd3 to the central processor 12.

The central processor 12 receives the command signals Comd1 to Comd3 from the input/output means 11. The central processor 12 receives the positional information of the wireless device 1 from the GPS 16. Further, the central processor 12 receives time information from the timer 18.

After the central processor 12 receives the command signal Comd1 from the input/output means 11 and receives the positional information of the wireless device 1 from the GPS 16, it searches the database DB stored in the storage unit 17 and, based on the positional information of the wireless device 1, acquires the devices 2 to 4 located near the wireless device 1 and the control identifiers CID for controlling the devices 2 to 4. Then, the central processor 12 outputs the devices 2 to 4 and the control actions for the devices 2 to 4 to the input/output means 11. Thereafter, when the central processor 12 receives the command signals Comd2 and Comd3 from the input/output means 11, it determines a controlled device out of the devices 2 to 4 based on the received command signals Comd2 and Comd3 and determines a control action for the determined controlled device. Then, based on the determined controlled device and control action, the central processor 12 generates a control identifier CID for the controlled device.

The wireless module 13 receives the control identifier CID for the controlled device from the central processor 12 and transmits, via the antenna 14, the received control identifier CID to the receiver of the controlled device using a method described further below. Here, the wireless module 13 transmits the control identifier CID to the receiver of the controlled device at a desired frequency.

The GPS 16 measures the positional information of the wireless device 1 via the antenna 15 and outputs the measured positional information to the central processor 12.

The storage unit 17 stores a database DB made up of the positional information of the wireless device 1, the devices 2 to 4 and the control identifiers CID for the devices 2 to 4 in an associated manner.

The timer 18 outputs time information to the central processor 12.

Figure 3:
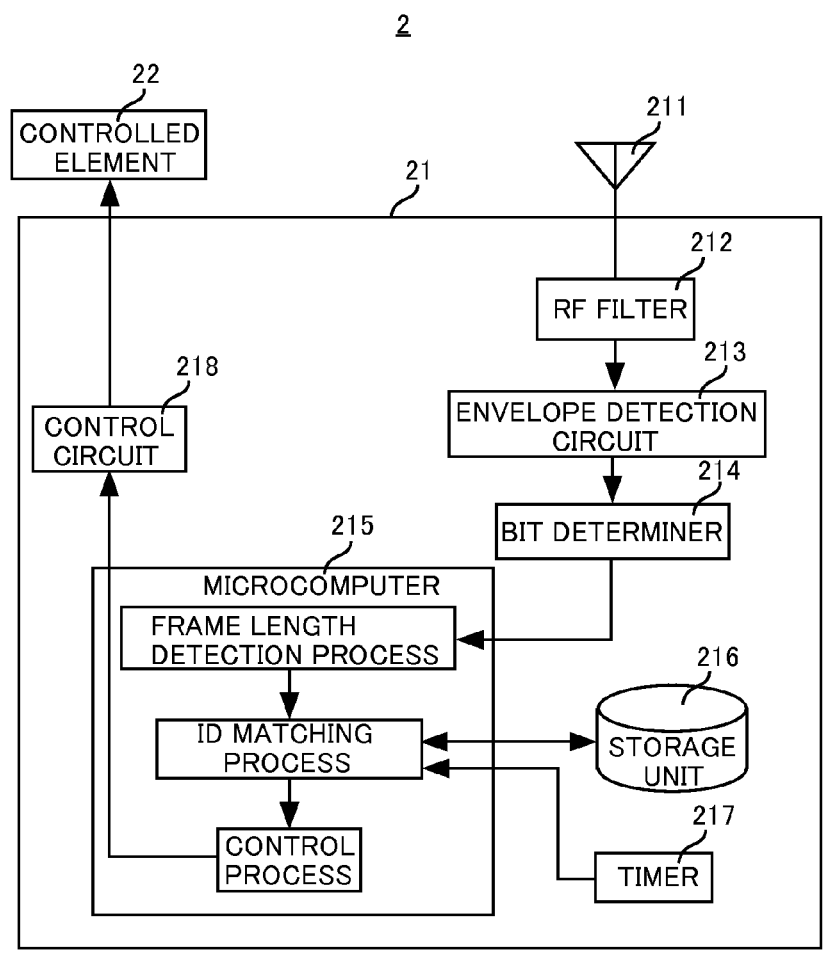
FIG. 3 is a schematic diagram of a configuration of a device shown in FIG. 1 according to Embodiment 1.

FIG. 3 is a schematic diagram of a configuration of the device 2 shown in FIG. 1 according to Embodiment 1. Referring to FIG. 3, the device 2 includes a receiver 21 and a controlled element 22. The receiver 21 includes an antenna 211, an RF filter 212, an envelope detection circuit 213, a bit determiner 214, a microcomputer 215, a storage unit 216, a timer 217 and a control circuit 218.

The receiver 21 receives a power of 100 μW, for example, from a power supply (not shown), and is driven by the received power. Further, the receiver 21 receives a radio wave of a radio frame from the wireless device 1 via the antenna 211, and, based on the received radio wave, detects a bit sequence using a method described further below, and determines whether the detected bit sequence matches the control identifier CID for the device 2. If the receiver 21 determines that the bit sequence matches the control identifier CID for the device 2, it controls the controlled element 22 based on the control identifier CID.

If the bit sequence does not match the control identifier CID for the device 2, the receiver 21 discards the bit sequence. Then, the receiver 21 waits to receive a radio frame.

The receiver 21 only has the function of receiving radio frames for controlling the device 2, and does not have the function of transmitting radio frames.

The controlled element 22 may be a light, speaker, monitor, camera or motor, for example. The controlled element 22 may be powered on, powered off, or may have its modulated light controlled, for example, in accordance with control by the receiver 21.

The antenna 211 is connected to the RF filter 212. The RF filter 212 receives a radio wave via the antenna 211 and extracts a signal having the frequency of a radio frame from the received radio wave. Then, the RF filter 212 outputs the extracted signal to the envelope detection circuit 213.

The envelope detection circuit 213 detects the envelope of the signal received from the RF filter 212 at a certain period (for example, 10 μs), and outputs the detection signal to the bit determiner 214.

The bit determiner 214 converts the detection signal received from the envelope detection circuit 213 to a bit value of "0" or "1" and outputs the converted bit sequence to the microcomputer 215.

The microcomputer 215 sequentially performs a frame length detection process, an ID matching process and a control process.

During the frame length detection process, the microcomputer 215 detects the frame length of the radio frame based on the bit sequence received from the bit determiner 214. More specifically, the microcomputer 215 accumulates the number of occurrences of the bit value of "1", and, when the bit value of "0" is input, converts the cumulative value found when the bit value of "0" is input to a bit sequence using a method described further below. Subsequently, the microcomputer 215 resets the cumulative value.

After the microcomputer 215 converts the cumulative value to a bit sequence, it reads the control identifiers CID for the device 2 from the storage unit 216 and determines whether the bit sequence matches the control identifier CID. That is, the microcomputer 215 performs the ID matching process.

If the microcomputer 215 determines that the bit sequence matches the control identifier CID, it outputs a control action for the controlled element 22 to the control circuit 218 based on this control identifier CID. That is, the microcomputer 215 performs the control process.

If the microcomputer 215 determines that the bit sequence does not match the control identifier CID, it discards the bit sequence.

The storage unit 216 stores the control identifiers CID for the device 2.

The timer 217 outputs time information to the microcomputer 215.

The control circuit 218 receives the control action from the microcomputer 215 and controls the controlled element 22 based on the received control action.

In Embodiment 1, each of the devices 3 and 4 shown in FIG. 1 has the same configuration as the device 2, shown in FIG. 3.

FIG. 4 is a schematic diagram of a configuration of a control identifier CID. Referring to FIG. 4, the control identifier CID includes control object, control classification, and control value.

Control object, control classification and control value are associated with each other. Control object indicates an object to be controlled. Control classification indicates a specific control item for each of the devices 2 to 4. Control value indicates a specific control action for a control classification. Control object and control classification constitute specifying information that specifies a controlled device, and control value constitutes control information indicating a control action for a controlled device. Each of control object, control classification and control value is represented as a bit value in 4 bit, for example.

FIG. 5 is a conceptual diagram of a database DB. Referring to FIG. 5, the database DB includes longitude/latitude, location, name, control object, control classification, and control value. Longitude/latitude, location, name, control object, control classification, and control value are associated with each other. Longitude/latitude and location constitute positional information, and control object, control classification and control value constitute a control identifier CID, as described above.

For example, a 4-chome A Building is located in latitude x degrees north, longitude y degrees. There is a ceiling light on a ceiling of the 4-chome A Building. This ceiling light is associated with positional information including a longitude/latitude (=latitude x degrees north, longitude y degrees) and a location (=4-chome A Building), "0001" which indicates Object 1 to be controlled is associated with positional information including a longitude/latitude (=latitude x degrees north, longitude y degrees) and a location (=4-chome A Building), "0001" which indicates a light switch as a control classification is associated with positional information including longitude/latitude (=latitude x degrees north, longitude y degrees) and a location (=4-chome A Building); and "0001" which indicates ON as a control value is associated with positional information including a longitude/latitude (=latitude x degrees north, longitude y degrees) and a location (=4-chome A Building). Similarly, a control object ("0001") and control classification ("0001") are associated with positional information including a longitude/latitude (=latitude x degrees north, longitude y degrees) and a location (=4-chome A Building), and "0000" which indicates OFF as a control value is associated with positional information including a longitude/latitude (=latitude x degrees north, longitude y degrees) and a location (=4-chome A Building). As such, the control action for the ceiling light in the 4-chome A Building in latitude x degrees north, longitude y degrees is to turn on or off the light switch of a ceiling light.

For floor air-conditioning, indirect lighting for walls, and locking of the west gate, a name, control object, control classification and control value are associated with positional information in an analogous manner.

For floor air-conditioning, a control action may be increasing the air conditioner's temperature or reducing the air conditioner's temperature; for indirect lighting for walls, a control action may be setting the modulated light to Large, setting the modulated light to Medium or setting the modulated light to Small; and for locking of the west gate, a control action may be unlock the gate or lock the gate.

Thus, the database DB includes control identifiers CID each made up of a control object, control classification and control value associated with positional information. The database DB is stored in the storage unit 17 of the wireless device 1.

If each of the devices 2 to 4 is a ceiling light, the storage unit 216 of each of the devices 2 to 4 stores a control identifier of "000100010000" and a control identifier of "000100010001". If each of the devices 2 to 4 is a floor air conditioner, the storage unit 216 of each of the devices 2 to 4 stores a control identifier of "001000100000" and a control identifier of "001000100001". If each of the devices 2 to 4 is an indirect lighting for walls, the storage unit 216 of each of the devices 2 to 4 stores a control identifier of "001100110000", a control identifier of "001100110001" and a control identifier of "001100110010". If each of the devices 2 to 4 is a lock for the west gate, the storage unit 216 of each of the devices 2 to 4 stores a control identifier of "000101000000" and a control identifier of "000101000001".

It is to be noted that, in the database DB, the control object of the lock for the west gate is Object 1, because the lock for the west gate is in a location (5-chome) that is distant from the location of the ceiling lights and other objects (4-chome), which will not allow the gate to be controlled wirelessly at the same time as the ceiling lights and other objects.

FIG. 6 shows a conversion table for bit sequence and frame length L, which indicates a time length of a radio frame. Referring to FIG. 6, the conversion table TBL1 includes bit sequence and frame length. The bit sequence and frame length are associated with each other.

The frame length L of 230 µs is associated with the bit sequence of "000100010000". The frame length L of 260 (µs) is associated with the bit sequence of "000100010001". The frame length L of 290 (µs) is associated with the bit sequence of "001000100000". The frame length L of 320 (µs) is associated with the bit sequence of "001000100001". The frame length L of 350 (µs) is associated with the bit sequence "001100110000". The frame length L of 380 (µs) is associated with the bit sequence of "001100110001". The frame length L of 410 (µs) is associated with the bit sequence of "001100110010". The frame length L of 440 (µs) is associated with the bit sequence of "000101000000". The frame length L of 470 (µs) is associated with the bit sequence of "000101000001".

The bit sequences of "000100010000" and the like have the format "A1A2A3A4B1B2B3B4C1C2C3C4" and are control identifiers CID for controlled devices. The 4 bits to the left (=A1A2A3A4) indicate a control object, the 4 bits in the middle (=B1B2B3B4) indicate a control classification, and the 4 bits to the right (=C1C2C3C4) indicate a control value.

The central processor 12 of the wireless device 1 holds the conversion table 1. The central processor 12 refers to the conversion table TBL1 to allocate the frame length L=230 (µs) to the control identifier CID of "000100010000".

Then, the central processor 12 determines such a payload size that the frame length is closest to the L=230 (µs), generates a payload having the determined payload size, and outputs the generated payload to the radio module 13. Then, the radio module 13 receives the payload from the central processor 12, generates a radio frame including the received payload, and transmits the generated radio frame to the receiver 21 of the controlled device (i.e. one of the devices 2 to 4).

If the central processor 12 allocates the frame length L=230 (µs) to the control identifier CID of "000100010000", it determines a transmission rate for transmitting in such a way that the time length of the radio frame including the control identifier CID of "000100010000" is 230 (µs), and outputs the determined transmission rate and the control identifier CID of "000100010000" to the radio module 13. The radio module 13 receives from the central processor 12 the control identifier CID of "000100010000" and the transmission rate. Then, the radio module 13 generates a radio frame including the control identifier CID of "000100010000", and transmits the generated radio frame to the receiver 21 of the controlled device (i.e. one of the devices 2 to 4) at the transmission rate received from the central processor 12.

If the central processor 12 allocates the frame length L=230 (µs) to the control identifier CID of "000100010000", it determines such a payload size that the frame length is closest to L=230 (µs), and generates a payload having the determined payload size. Further, the central processor 12 determines a transmission rate for transmitting in such a way that the time length of a radio frame including the generated payload is 230 (µs). Then, the central processor 12 outputs the generated payload and the determined transmission rate to the radio module 13. The radio module 13 receives the payload and transmission rate from the central processor 12 and generates a radio frame including the received payload. Then, the radio module 13 transmits the generated radio frame to the receiver 21 of the controlled device (i.e. one of the devices 2 to 4) at the transmission rate received from the central processor 12.

Thus, the radio module 13 controls at least one of payload size and transmission rate such that the frame length is L=230 (µs), and uses at least one of the controlled payload size and transmission rate to transmit a radio frame to the receiver 21 of the controlled device (i.e. one of the devices 2 to 4).

The content of the data that forms the payload may be random values or specified values.

If the central processor 12 transmits the control identifier CID of "000100010001" or the like, it outputs a payload and/or transmission rate to the radio module 13 in an analogous manner.

In the conversion table TBL1, the frame lengths L are separated by 30 µs so as to decrease the clock frequency of the receiver 21 and allow the receiver 21 to recognize a break between two adjacent radio frames.

As described above, the wireless device 1 transmits a radio frame having a frame length that represents a control identifier CID to the receiver 21 of a controlled device (i.e. one of the devices 2 to 4).

FIG. 7 is a conceptual diagram of envelope detection and bit determination. Referring to FIG. 7, the envelope detection circuit 213 of the receiver 21 receives a radio frame FR from the RF filter 212. The radio frame FR may have, for example, a frame length L of 230 (µs) (see (a)).

The envelope detection circuit 213 detects an envelope EVL of the radio frame FR and detects the detected envelope EVL every 10 (µs) to determine the detection values I1 to I24 (see (b)).

Then, the envelope detection circuit 213 outputs the detection values I1 to I24 to the bit determiner 214. The bit determiner 214 determines the detection values I1 to I24 in terms of bit to obtain the bit sequence "111 . . . 1110". Then, the bit determiner 214 outputs the bit sequence "111 . . . 1110" to the microcomputer 215.

The microcomputer 215 accumulates the number of occurrences of the bit value of "1", starting with the beginning of the bit sequence of "111 . . . 1110", and obtains the cumulative value of "23". Then, since the value of the 24th bit is "0", the microcomputer 215 converts the cumulative value of "23" to a bit sequence and, thereafter, resets the cumulative value.

Figures 8, 9:
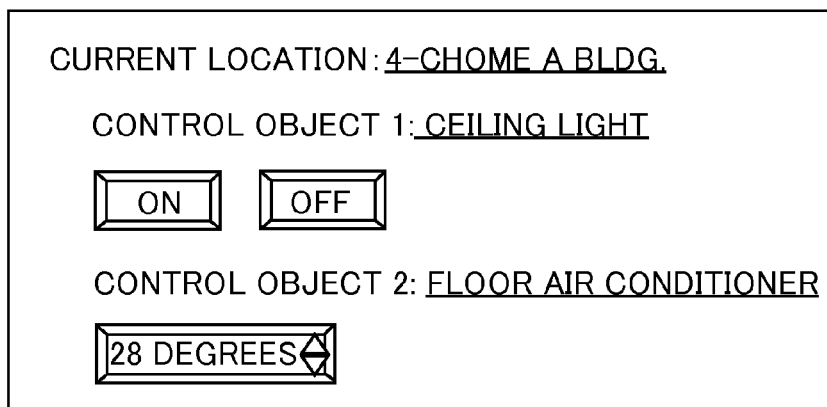
FIG. 8 shows a conversion table for cumulative value and bit sequence.
FIG. 9 shows an example of a displayed screen of the display device on the input/output means of the wireless device shown in FIG. 1.

FIG. 8 shows a conversion table for cumulative value and bit sequence. Referring to FIG. 8, the conversion table TBL2 includes cumulative value and bit sequence. The entries of cumulative value and bit sequence are associated with each other.

The bit sequence of "000100010000" is associated with the cumulative values c of $22 \leq c \leq 24$. The bit sequence of "000100010001" is associated with the cumulative values c of $25 \leq c \leq 27$. The bit sequence of "001000100000" is associated with the cumulative values c of $28 \leq c \leq 30$. The bit sequence of "001000100001" is associated with the cumulative values c of $31 \leq c \leq 33$. The bit sequence of "001100110000" is associated with the cumulative values c of $34 \leq c \leq 36$. The bit sequence of "001100110001" is associated with the cumulative values c of $37 \leq c \leq 39$. The bit sequence of "001100110010" is associated with the cumulative values c of $40 \leq c \leq 42$. The bit sequence of "000101000000" is associated with the cumulative values c of $43 \leq c \leq 45$. The bit sequence of "000101000001" is associated with the cumulative values c of $46 \leq c \leq 48$.

The microcomputer 215 holds the conversion table TBL2. If the microcomputer 215 obtains a cumulative value c of "23", it refers to the conversion table TBL2 and converts the cumulative value c of "23" to the bit sequence of "000100010000".

If the converted bit sequence of "000100010000" matches a control identifier CID for the device 2, the microcomputer 215 refers to the control value of the control identifier CID to detect a control action, and outputs the detected control action to the control circuit 218.

If the converted bit sequence of "000100010000" does not match the control identifier CID for the device 2, the microcomputer 215 discards the bit sequence of "000100010000" and does not output anything to the control circuit 218.

FIG. 9 shows an example of a displayed screen of the display device on the input/output means 11 of the wireless device 1 shown in FIG. 1.

A display screen of the display device of the input/output means 11 will be described presupposing that the device 2 is the ceiling light in the database DB shown in FIG. 5, the device 3 is the floor air conditioner in the database DB shown in FIG. 5, and the devices 2 and 3 are located near the wireless device 1.

When the central processor 12 of the wireless device 1 receives the command signal Comd1 from the input/output means 11 and receives from the GPS 16 positional information including a longitude/latitude (=latitude x degrees north, longitude y degrees) and a place (=4-chome A Building), it searches the database DB stored in the storage unit 17, and, based on the positional information, obtains the ceiling light and floor air conditioner located near the wireless device 1, a control identifier for the ceiling light ([0001 (Object 1), 0001 (Light Switch), 0001 (ON)] and [0001 (Object 1), 0001 (Light Switch), 0000 (OFF)]), and a control identifier for the floor air conditioner ([0010 (Object 2), 0010 (Air Conditioner's Temperature), 0001 (Up)] and [0010 (Object 2), 0010 (Air Conditioner's Temperature), 0000 (Down)]).

Then, the central processor 12 outputs to the input/output means 11 the acquired ceiling light and floor air conditioner, the control identifier for the ceiling light ([0001 (Object 1), 0001 (Light Switch), 0001 (ON)] and [0001 (Object 1), 0001 (Light Switch), 0000 (OFF)]), the control identifier for the floor air conditioner ([0010 (Object 2), 0010 (Air Conditioner's Temperature), 0001 (Up)] and [0010 (Object 2), 0010 (Air Conditioner's Temperature), 0000 (Down)]), and current location of the wireless device 1 (4-chome A Building).

The input/output means 11 receives from the central processor 12 the ceiling light and floor air conditioner, the control identifier for the ceiling light ([0001 (Object 1), 0001 (Light Switch), 0001 (ON)] and [0001 (Object 1), 0001 (Light Switch), 0000 (OFF)]), the control identifier for the floor air conditioner ([0010 (Object 2), 0010 (Air Conditioner's Temperature), 0001 (Up)] and [0010 (Object 2), 0010 (Air Conditioner's Temperature), 0000 (Down)]), and the current location of the wireless device 1 (4-chome A Building).

Then, the input/output means 11 displays the current location of the wireless device 1 (4-chome A Building) on the display device. Further, based on the control identifier for the ceiling light ([0001 (Object 1), 0001 (Light Switch), 0001 (ON)] and [0001 (Object 1), 0001 (Light Switch), 0000 (OFF)]), the input/output means 11 displays on the display device "Ceiling Light" as control object 1, and an "On Button" and "Off Button". Furthermore, based on the control identifier for the floor air conditioner ([0010 (Object 2), 0010 (Air Conditioner's Temperature), 0001 (Up)] and [0010 (Object 2), 0010 (Air Conditioner's Temperature), 0000 (Down)]), the input/output means 11 displays on the display device "Floor Air Conditioner" as control object 2, and an "Up/Down Button" for temperature.

Then, the user of the wireless device 1 looks at the display screen of the input/output means 11 and selects a control object and a control action that he desires to control. For example, if the user of the wireless display 1 desires to turn the "Ceiling Light" "Off", he may tap on the area of "Ceiling Light" as control object 1, and depress the "Off Button".

If the area of "Ceiling Light" is tapped on, the input/output means 11 receives the command signal Comd2 commanding that the "Ceiling Light" be the controlled device, and, if the "Off Button" is depressed, receives the command signal Comd3 commanding the control action ("Off") for the controlled device ("Ceiling Light").

Then, the input/output means 11 outputs the received command signals Comd2 and Comd3 to the central processor 12.

After the central processor 12 receives from the input/output means 11 the command signals Comd2 and Comd3, based on the command signal Comd2, it determines, out of the devices 2 and 3 located near the wireless device 1, the device 2 as the controlled device, and, based on the command signal Comd3, determines a control action (=the light switch being turned "Off") for the controlled device (=device 2). Then, based on the determined controlled device and control action, the central processor 12 generates a control identifier CID of "000100010000", and refers to the table TBL1 to detect the frame length (=230 µs) corresponding to the generated control identifier CID (="000100010000").

Thereafter, the central processor 12 and radio module 13 control at least one of payload size and a transmission rate using the method described above, and transmits a radio frame having the frame length of 230 µs to the receiver 21 of the device 2.

If the user of the wireless device 1 selects "Floor Air Conditioner" as a control object, the central processor 12 receives from the input/output means 11 a command signal Comd2 that defines the "Floor Air Conditioner" as a controlled device. Further, if the temperature is increased from an initially displayed temperature (i.e. 28 degrees), the central processor 12 receives from the input/output means 11 a command signal Comd3 for increasing the air conditioner's temperature, and, if the temperature is decreased from the initially displayed temperature (i.e. 28 degrees), receives from the input/output means 11 a command signal Comd3 for decreasing the air conditioner's temperature. Then, based on the command signals Comd2 and Comd3, the central processor 12 generates a control identifier CID for the "Floor Air Conditioner" using the method described above. Thereafter, using the method described above, the central processor 12 and radio module 13 transmit to the receiver 21 of the device 3 a radio frame having a frame length that represents the control identifier CID for the "Floor Air Conditioner".

If the user of the wireless device 1 selects both the "Ceiling Light" and "Floor Air Conditioner" as controlled devices, the central processor 12 receives from the input/output means 11 the command signals Comd2 and Comd3 for each of the "Ceiling Light" and "Floor Air Conditioner", and, based on the received command signals Comd2 and Comd3, generates a control identifier CID for the "Ceiling Light" and a control identifier CID for the "Floor Air Conditioner" using the method described above. Then, using the method described above, the central processor 12 and radio module 13 transmit to the receiver 21 of the device 2 a radio frame having a frame length that represents the control identifier CID for the "Ceiling Light" and transmits to the receiver 21 of the device 3 a radio frame having a frame length that represents the control identifier CID for the "Floor Air Conditioner".

Figure 10:
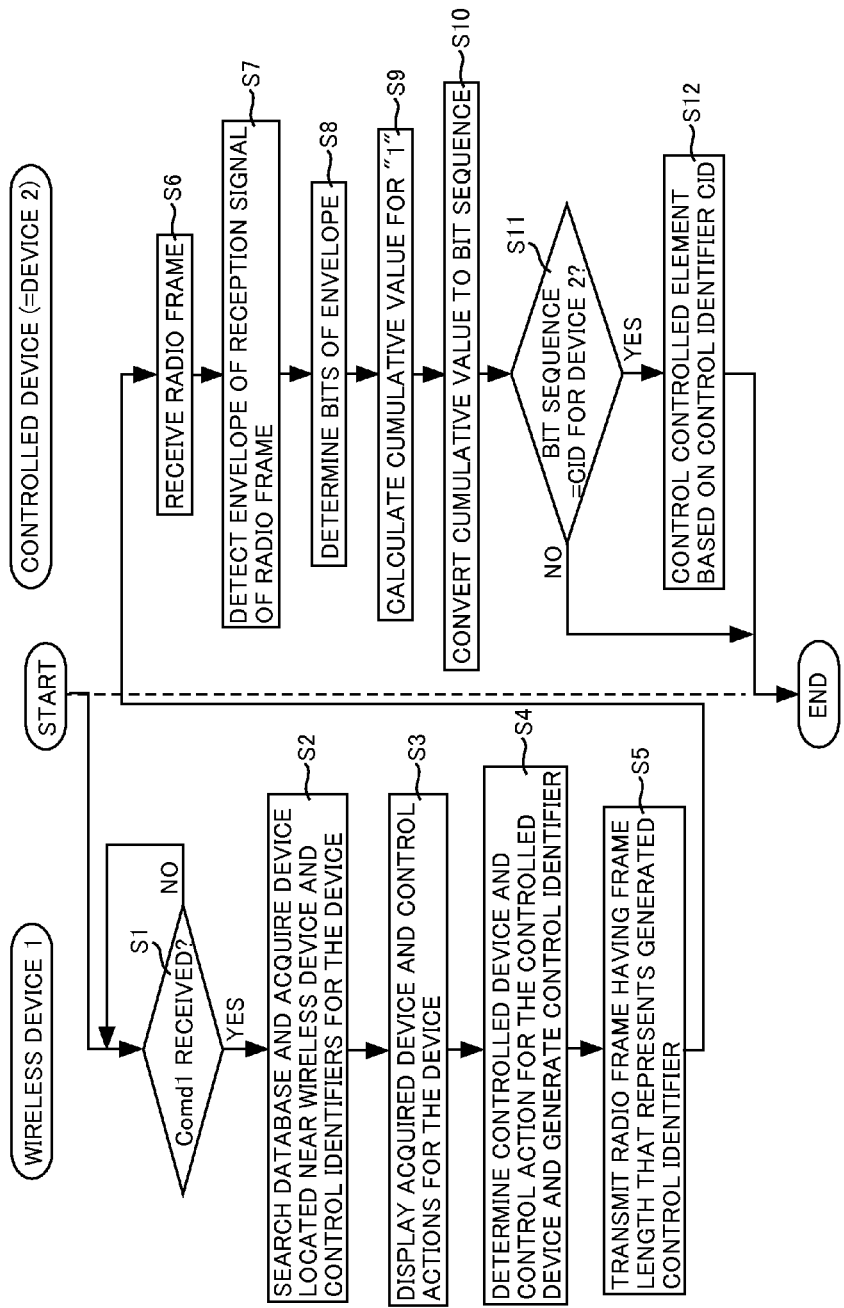
FIG. 10 is a flow chart illustrating the operation of the control system shown in FIG. 1 according to Embodiment 1.

FIG. 10 is a flow chart illustrating the operation of the control system 10 shown in FIG. 1 according to Embodiment 1.

In connection with FIG. 10, the operation of the control system 10 will be described presupposing that the device 2 is a controlled device.

Referring to FIG. 10, if, upon starting a series of operation, the central processor 12 of the wireless device 1 receives a command signal Comd1 from the input/output means 11 (step S1), it searches the database DB stored in the storage unit 17 and, based on the positional information of the wireless device 1 received from the GPS 16, acquires devices located near the wireless device 1 and control identifiers CID for the devices (step S2).

Then, the central processor 12 outputs the acquired devices and control identifiers CID for the devices to the input/output means 11, and the input/output means 11 displays the devices and the control actions for the devices on the display device using the method described above (step S3).

Thereafter, the central processor 12 receives the command signals Comd2 and Comd3 from the input/output means 11, and, based on the received command signals Comd2 and Comd3, determines a controlled device (=device 2) and a control action for the controlled device using the method described above, and generates a control identifier CID (step S4).

Then, using the method described above, the central processor 12 and radio module 13 transmit to the receiver 21 of the controlled device (=device 2) a radio frame having a frame length that represents the control identifier CID for the controlled device (=device 2).

In the receiver 21 of the controlled device (=device 2), the RF filter 212 receives a radio wave via the antenna 211 and extracts a signal having the frequency of the radio frame from the received radio wave. Thus, the receiver 21 receives the radio frame (step S6). Then, the RF filter 212 outputs the extracted signal to the envelope detection circuit 213.

The envelope detection circuit 213 detects the envelope of the signal received from the RF filter 212 at a certain period (step S7), and outputs the detected detection signal to the bit determiner 214.

The bit determiner 214 converts the detection signal received from the envelope detection circuit 213 to a bit value of "0" or "1" to perform bit determination for the envelope (step S8). Then, the bit determiner 214 outputs the converted bit sequence to the microcomputer 215.

The microcomputer 215 accumulates the number of occurrences of the bit value of "1" in the bit sequence received from the bit determiner 214, and, when the bit value of "0" is input, stops accumulation for "1" and calculates the cumulative value found at that moment as the cumulative value of "1" (step S9). Then, the microcomputer 215 refers to the table TBL2 and converts the calculated cumulative value to a bit sequence (step S10).

After the microcomputer 215 converts the cumulative value to a bit sequence, it reads the control identifier CID for the controlled device (=device 2) from the storage unit 216, and determines whether the bit sequence matches the control identifiers CID (step S11).

For example, if the device 2 is the "Ceiling Light" shown in FIG. 5, the storage unit 216 of the device 2 stores the control identifier CID_A of "000100010000" and the control identifier CID_B of "000100010001". Accordingly, the microcomputer 215 reads two control identifiers CID_A and CID_B from the storage unit 216 and determines whether the bit sequence matches each of the two control identifiers CID_A and CID_B.

If it is determined at step S11 that the bit sequence matches the control identifier CID (=one of the control identifiers CID_A and CID_B), the microcomputer 215 outputs the control action to a control circuit 218 based on the control identifier CID and the control circuit 218 controls the controlled element 22 in accordance with the control action received from the microcomputer 215 (step S12).

For example, if the device 2 is the "Ceiling Light" shown in FIG. 5 and it is determined that the bit sequence matches the control identifier CID_A (="000100010000"), the microcomputer 215 refers to the four bits to the left (="0001") of the control identifier CID_A (="000100010000") and detects that the control object is object 1, and detects that the device 2 is to be controlled. Further, the microcomputer 215 refers to the four bits in the middle (="0001") of the control identifier CID_A (="000100010000") and detects that the control classification is the light switch, and refers to the four bits to the right (="0000") of the control identifier CID_A (="000100010000") and detects that the light switch is to be turned off. Then, the microcomputer 215 outputs the control action of turning off the light switch of the device 2 to the control circuit 218, and, in accordance with the control action indicated by the microcomputer 215, the control circuit 218 turns off the light switch of the controlled element 22.

If it is determined at step S11 that the bit sequence does not match the control identifiers CID, the microcomputer 215 discards the bit sequence.

Then, if it is determined at step S11 that the bit sequence does not match the control identifiers CID or after step S12, the process ends.

In this way, the central processor 12 of the wireless device 1 searches a database DB including positional information of the wireless device 1 and control identifiers CID for the devices 2 to 4 arranged in an associated manner and determines a controlled device (=device 2) out of the devices 2 to 4 located near the wireless device 1, and generates the control identifiers CID for the determined controlled device (=device 2) (see steps S1 to S4), and therefore the wireless device 1 may acquire in simple manner the control identifiers CID for specifying the device 2 which is to be controlled and for controlling the device 2.

Further, the wireless device 1 transmits a control identifier CID to the controlled device (=device 2) and, if the control identifier CID matches the control identifiers for the controlled device (=device 2), the receiver 21 of the controlled device (=device 2) controls the controlled element 22 based on the control identifier CID (see steps S5, S11 and S12), and therefore the wireless device 1 can control the controlled device (=device 2) in a simple manner.

Accordingly, it is possible to acquire in simple manner the control identifiers CID for specifying a controlled device and for controlling the controlled device to control the controlled device in a simple manner.

Since the user of the wireless device 1 can control the devices 2 to 4 located near the wireless device 1, the user of a smartphone as the wireless device 1, for example, may use his smartphone if he is near public facilities to control the devices 2 to 4 provided in the public facilities in accordance with the flow chart of FIG. 10. Thus, a user may use his smartphone as a remote control, and prevent from scrambling for a remote control.

Since the wireless device 1 uses a frame length that represents a control identifier CID and transmits it to the receiver 21 of the controlled device, the receiver 21 may demodulate the control identifier CID based on a received radio wave even when being driven at a low power of 100 µW.

While FIG. 10 has been described in connection with an implementation where just one device 2 is to be controlled, the operation of the control system 10 may be performed in accordance with the flow chart of FIG. 10 even if two or more devices are to be controlled. In this case, the wireless device 1 performs the above steps S1 to S5 in parallel or in series for the two or more devices, and each of the two or more devices performs the above steps S6 to S12.

Steps S1 to S5 shown in FIG. 10 constitute a program for causing a computer in the wireless device 1 to control a controlled device. In this case, the program including steps S1 to S5 is stored in the storage unit 17, and the central processor 12 reads the program stored in the storage unit 17 and executes it. Then, the central processor 12 performing step S2 in accordance with the program constitutes the "searching/acquiring means", the central processor 12 performing step S4 in accordance with the program constitutes the "determining/generating means", and the central processor 12 and radio module 13 performing step S5 in accordance with the program constitutes the "transmitting means".

In the above description, the database DB is stored in the storage unit 17 of the wireless device 1; alternatively, in Embodiment 1, the database DB may be stored in a cloud server. In this case, after the central processor 12 receives a command signal Comd1 from the input/output means 11, it uses the radio module 13 and antenna 14 to access the cloud server via a wireless access network (3G) to search the database DB, and, based on the positional information of the wireless device 1, acquires the devices 2 to 4 located near the wireless device 1 and the control identifiers CID for the devices 2 to 4. Otherwise, the controlled device (=at least one of the devices 2 to 4) is controlled in accordance with the above description.

Example Implementation 1

In Example Implementation 1, a smartphone is used as a specific example of the wireless device 1. The user installs on his smartphone (mobile phone) a control application program for controlling the electric devices mounted on the devices 2 to 4.

The installed control application program holds the database DB, described above, and is stored, together with the database DB, in the storage unit of the smartphone.

If the input/output means of the smartphone receives from the user of the smartphone a command to activate the control application program, it outputs a command signal Comd1 to the central processor of the smartphone, and, in response to the command signal Comd1, the central processor reads the control application program from the storage unit and executes the read control application program.

When the control application program is to be activated, the central processor performs authentication using a password, for example, and, if the user of the smartphone is properly authenticated, performs subsequent operations. Here, when the control application program is to be activated, the central processor displays an entry field for a password on the display screen of the smartphone and, if it is verified that the input password is the correct one, determines that the user of the smartphone has been properly authenticated.

The central processor uses GPS to acquire the positional information of the smartphone in accordance with the control application program. Alternatively, the central processor may acquire positional information (address and building name, for example) from the user via the input/output means in accordance with the control application program.

Further, the central processor searches the database DB stored in the storage unit in accordance with the control application program, and, based on the positional information of the smartphone, acquires the devices 2 to 4 located near the smartphone and the control identifiers CID for the devices 2 to 4. Then, the central processor displays the devices 2 to 4 and the control actions of the devices 2 to 4 on the display device of the input/output means in accordance with the control application program.

Otherwise, the central processor performs the same operations as those of the central processor 12 and radio module 13 described above and transmits radio frames having frame lengths that represent the control identifiers CID for the controlled device to the receiver 21 of the controlled device in accordance with the control application program.

Figure 11:
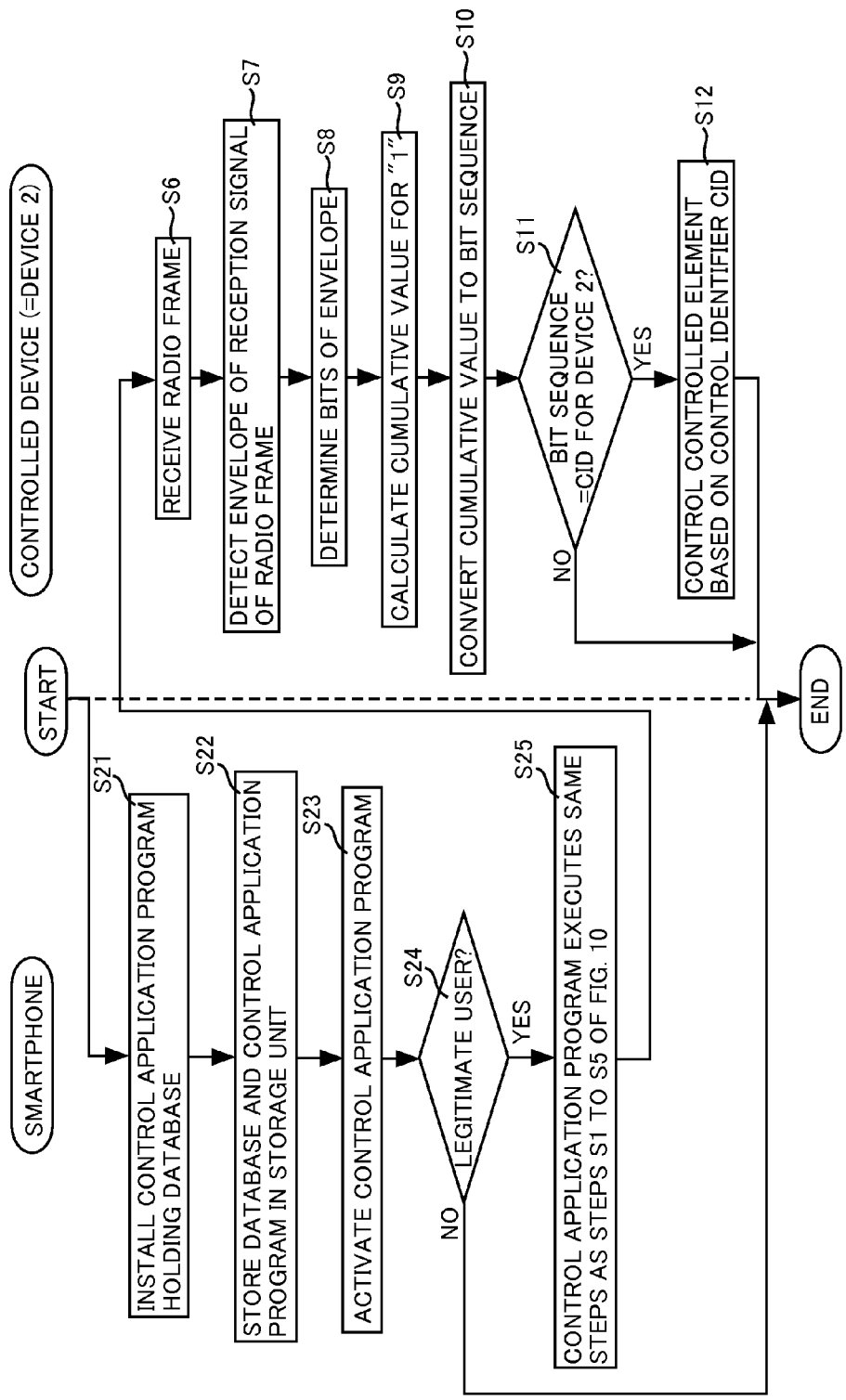
FIG. 11 is a flow chart illustrating the operation of Example Implementation 1 of the control system, including a smartphone and devices.

FIG. 11 is a flow chart illustrating the operation of Example Implementation 1 of the control system 10A including a smartphone and devices 2 to 4.

In connection with FIG. 11, the operation of the control system 10A will be described presupposing that the device 2 is a controlled device. The flow chart of FIG. 11 is the same as that of FIG. 10 except that steps S1 to S5 of the flow chart of FIG. 10 are replaced by steps S21 to S25.

Referring to FIG. 11, upon starting a series of operation, the control application program holding the database DB is installed on the smartphone (step S21).

Then, the database DB and control application program are stored in the storage unit of the smartphone (step S22).

Thereafter, the control application program is activated (step S23), and the control application program causes the central processing unit (CPU) to display an entry field for a password on the display screen of the smartphone. Then, the user of the smartphone inputs a password, and the control application program causes the CPU to receive the password of the user.

Then, the control application program causes the CPU to determine whether the received password matches the correct password to cause the CPU to determine whether the user is legitimate (step S24).

If it is determined at step S24 that the password matches the correct password, i.e. it is determined that the user is legitimate, the control application program causes the CPU to sequentially perform the same steps as steps S1 to S5 of FIG. 10 (step S25).

Thereafter, the controlled device (=device 2) sequentially performs steps S6 to S12 described above.

If it is determined at step S24 that the password does not match the correct password, i.e. it is determined that the user is not legitimate, the process ends.

Thus, according to the flow chart of FIG. 11, only a properly authenticated user transmits the control identifiers CID for the controlled device (=device 2) to the receiver 21 of the controlled device.

Accordingly, only a properly authenticated user may control the controlled device. For example, only the residents of an apartment can control the lights installed in the apartment, or only the users of the office may control the lights installed in the office.

FIG. 11 has been described in connection with an implementation where one device 2 is controlled; alternatively, in Example Implementation 1, two or more devices may be controlled.

The CPU performing step S24 of FIG. 11 constitutes the "control means", where, if it is determined at step S24 that the user of the smartphone is a legitimate one, the control means controls the above "searching/acquiring means", "determining/generating means" and "transmitting means" to perform steps S1 to S5 shown in FIG. 10.

Generally, as discussed above, Example Implementation 1 may be employed in cases where a device is controlled where the use is limited to a legitimate user.

Example Implementation 2

In Example Implementation 2, the database DB is not stored in the storage unit 17 of the wireless device 1; instead, it may be stored in a cloud server, for example. Then, the central processor 12 of the wireless device 1 uses the radio module 13 and antenna 14 to access the cloud server via a wireless access network (for example, a 3G link) to search the database DB.

Figure 12:
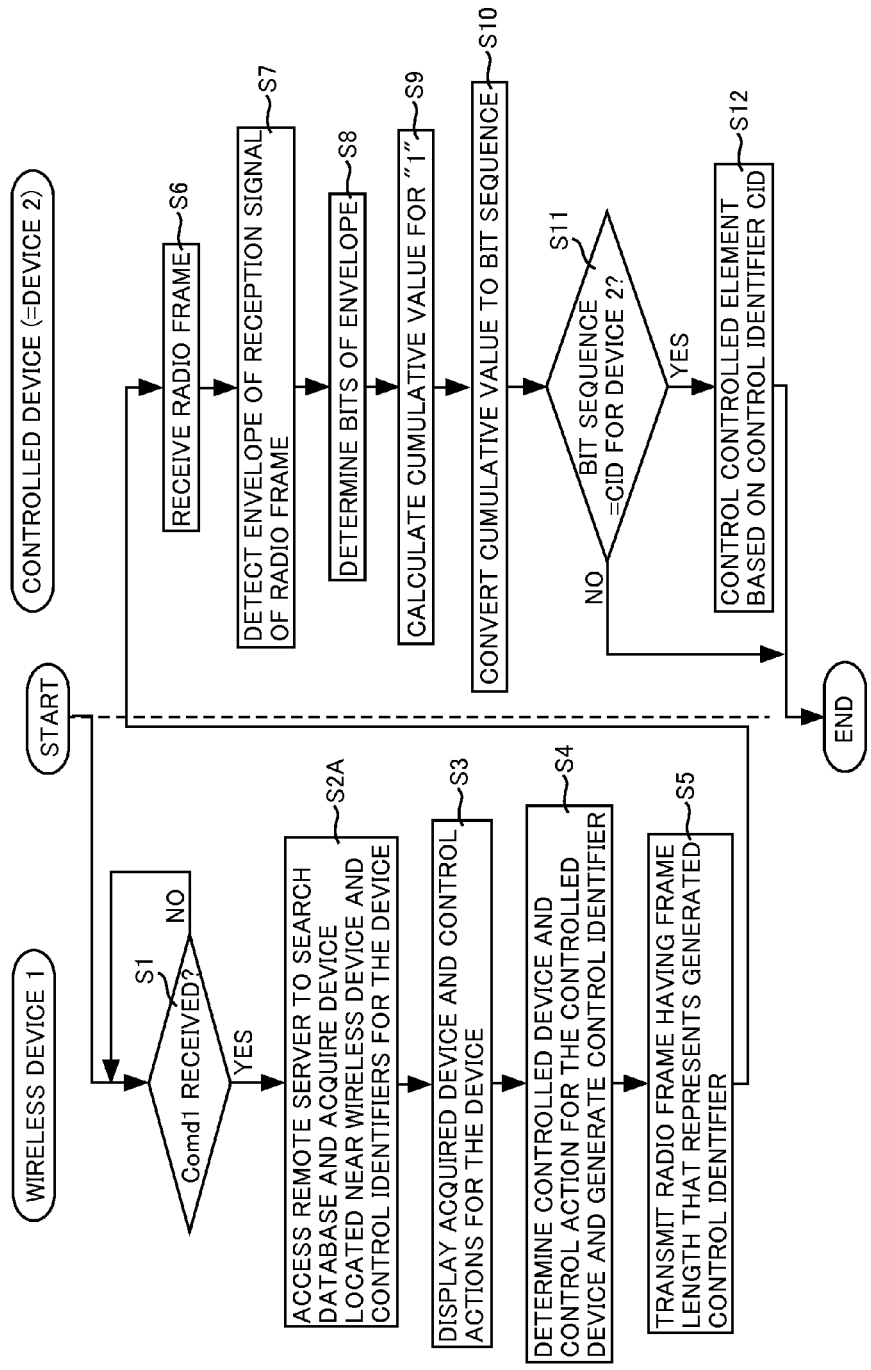
FIG. 12 is a flow chart illustrating the operation of Example Implementation 2 of the control system.

FIG. 12 is a flow chart illustrating the operation of Example Implementation 2 of the control system 10.

The flow chart of FIG. 12 is the same as that of FIG. 10 except that step S2 of the flow chart of FIG. 10 is replaced by step S2A.

Referring to FIG. 12, upon starting a series of operation, step S1 described above is performed, and the central processor 12 of the wireless device 1 uses the radio module 13 and antenna 14 to access a remote server (for example, a cloud server) via a wireless access network (3G) to search the database DB, and acquires the devices 2 to 4 located near the wireless device 1 and the control identifiers CID for the devices 2 to 4 (step S2A).

Thereafter, steps S3 to S12 described above are sequentially performed and the process ends.

In this way, in Example Implementation 2, the database DB is stored not in the wireless device 1 but in a remote server, thus allowing databases DB to be managed centrally.

In Example Implementation 2, the remote server may have the function of authenticating the user of the wireless device 1. This will limit the access to the database DB to a legitimate user. As a result, security could be improved Generally, as discussed above, Example Implementation 2 may be employed in cases where the database DB is stored in a remote server.

Example Implementation 3

In Example Implementations 1 and 2, the user of the wireless device 1 operates the wireless device to search the database DB and control the controlled device; in Example Implementation 3, a control application program installed on the wireless device 1 causes the central processor 12 to automatically search the database DB and control the controlled device.

In this case, the user of the wireless device 1 presets a desired control action for the control application program. For example, the user of the wireless device 1 presets the control action of "the lights near my home being on after 20:00 in the evening" for the control application program.

The input/output means 11 of the wireless device 1 receives the control application program from the user of the wireless device 1, and outputs the received control application program to the central processor 12.

The central processor 12 stores in the storage unit 17 the control application program received from the input/output means 11.

Then, the central processor 12 reads the control application program from the storage unit 17 and continuously executes the read control application program. Accordingly, the wireless device 1 controls the controlled device only when the controlled device is located near itself.

Figure 13:
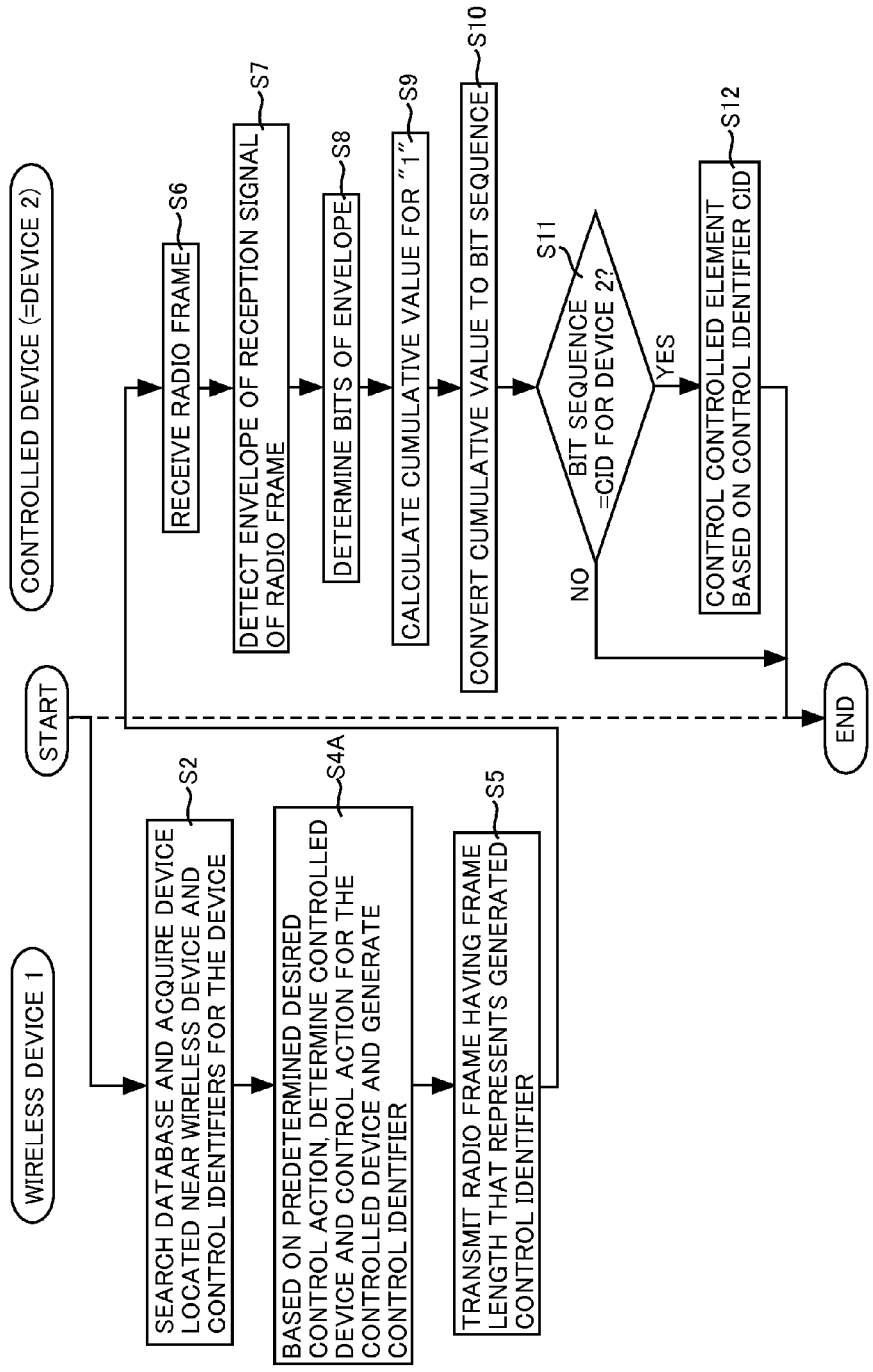
FIG. 13 is a flow chart illustrating the operation of Example Implementation 3 of the control system.

FIG. 13 is a flow chart illustrating the operation of Example Implementation 3 of the control system 10.

The flow chart of FIG. 13 is the same as that of FIG. 10 except that steps S1 and S3 of the flow chart of FIG. 10 are removed and step S4 is replaced by step S4A.

Referring to FIG. 13, upon starting a series of operation, step S2 described above is performed, and, based on the desired control action that has been preset, the central processor 12 decides a controlled device and a control action for the controlled device, and generates a control identifier CID (step S4A). In this case, the central processor 12 may generate, for example, the control identifier CID having the control value of "the lights near my home being on after 20:00 in the evening".

Then, after step S4A, steps S5 to S12 described above are sequentially performed.

According to the flow chart of FIG. 13, a control application program installed on the wireless device 1 causes the central processor 12 to automatically search the database DB and control the controlled device and therefore the user of the wireless device 1 may automatically control a device located near the user just by moving.

Although FIG. 13 shows that the process ends after "NO" at step S11 or after step S12, in reality, steps S2, S4A and S5 to S12 are repeatedly performed.

The number of controlled devices is not limited to 1, and a plurality of devices may be controlled. If a plurality of devices are controlled, the user of the wireless device 1 presets a plurality of control actions for controlling the plurality of devices for the control application program.

Thus, generally, Example Implementation 3 may be employed in cases where a device located in a fixed location is to be controlled. The user of the wireless device 1 may move close to the device located in a fixed location and thereby automatically controlling this device by a predetermined control action.

(Additional Functions)

If a control identifier CID is represented as a frame length, it is possible to monitor a radio frame and acquire the frame length to reconstruct the same control identifier CID. As such, a malicious user may control a control object which he is not authorized to control.

To address this, the control identifier CID may be changed over time such that a control identifier CID that is valid when the controlled device is to be controlled cannot be acquired if the database DB is not searched.

A control identifier CID may be changed over time in terms of the bit values of the control identifier CID, the bit length of the control identifier CID, and the radio frequency at which the control identifier CID is transmitted.

Each control object has a different change rule changing a control identifier CID over time.

Further, the change rules are stored in the storage unit 17 of the wireless device 1, the storage unit 216 of each of the devices 2 to 4, and the storage unit of the cloud server, and only an authenticated user may refer to the change rules.

Furthermore, the wireless device 1 as a control source refers to the positional information of the wireless device 1 and the control identifiers CID for the devices 2 to 4 and, in addition, the changes in the control identifiers CID over time to acquire a control identifier CID based on the location and time, and uses the acquired control identifier CID to control a controlled device.

Here, the input/output means 11 of the wireless device 1 receives change rules from the user of the wireless device 1 and outputs the received change rules to the central processor 12. Then, the central processor 12 receives the change rules from the input/output means 11 and stores the received change rules to the storage unit 17.

Each of the devices 2 to 4 holds the change rules in its own storage unit 216 and changes their valid control identifiers CID at predetermined times.

Figure 14:
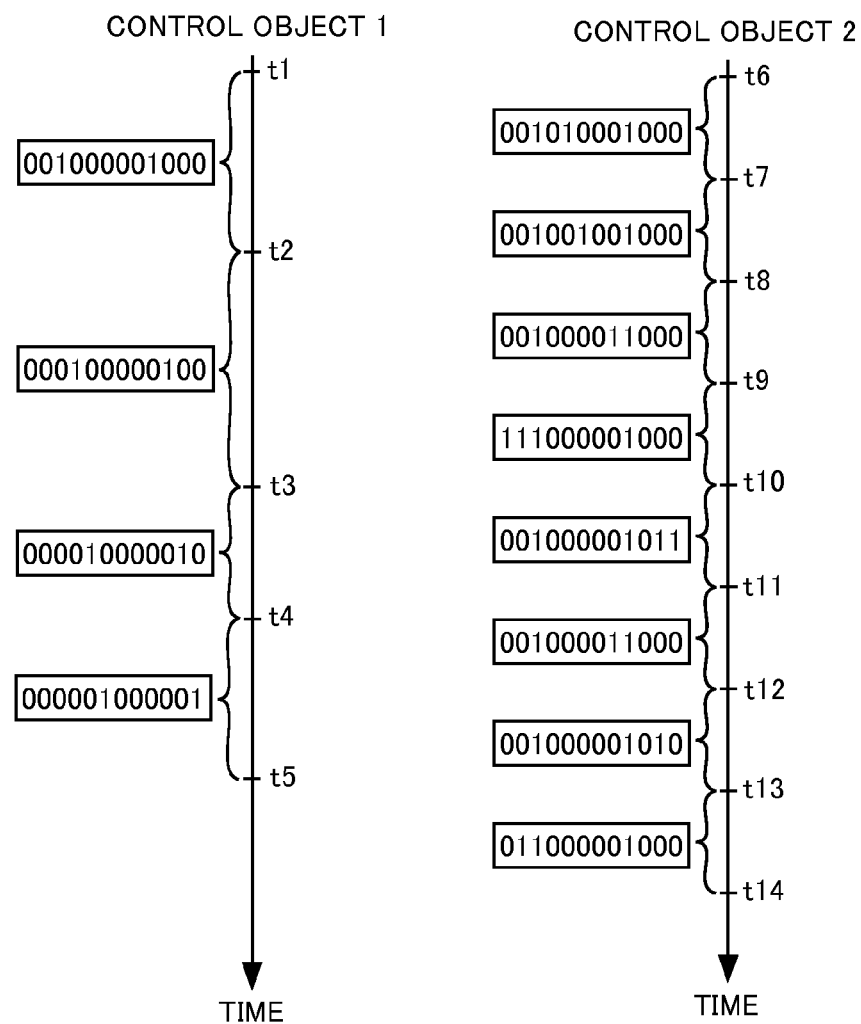
FIG. 14 is a conceptual diagram showing how a control identifier may be changed over time.

FIG. 14 is a conceptual diagram showing how a control identifier CID may be changed over time. Referring to FIG. 14, a control identifier CID for the control object 1 is set to "001000001000" for the duration from time t1 to time t2, is set to "000100000100" for the duration from time t2 to time t3, is set to "000010000010" for the duration from time t3 to time t4, and is set to "000001000001" for the duration from time t4 to time t5. The duration from time t1 to time t2, the duration from time t2 to time t3, the duration from time t3 to time t4 and the duration from time t4 to time t5 are different in length each other.

A control identifier CID for the control object 2 is set to "001010001000" for the duration from time t6 to time t7, is set to "001001001000" for the duration from time t7 to time t8, is set to "001000011000" for the duration from time t8 to time t9, is set to "111000001000" for the duration from time t9 to time t10, is set to "001000001011" for the duration from time t10 to time t11, is set to "001000011000" for the duration from time t11 to time t12, is set to "001000001010" for the duration from t12 to time t13, and is set to "011000001000" for the duration from time t13 to time t14. The duration from time t6 to time t7, the duration from time t7 to time t8, the duration from time t8 to time t9, the duration from time t9 to time t10, the duration from time t10 to time t11, the duration from time t11 to time t12, the duration from time t12 to time t13, and the duration from time t13 to time t14 are equal in length each other.

In this way, each of the control objects 1 and 2 has different change rules for control identifiers CID.

The change rules for control identifiers CID shown in FIG. 14 are merely exemplary, and control identifiers CID may be changed in accordance with any change rules as long as each control object has a different control identifier CID.

FIG. 15 shows specific examples of change rules changing a control identifier CID over time. Referring to FIG. 15, change rules for control identifiers CID for the "Ceiling Light" provided in the 4-chome A Building located in latitude x degrees north, longitude y degrees and the "Floor Air Conditioner" provided in the 4-chome A building located in latitude a degrees north, longitude b degrees in the database DB shown in FIG. 5 will be described.

For "Ceiling Light", the control information of turning on the light switch will be described; for "Floor Air Conditioner", the control information of increasing the air conditioner's temperature will be described.

At 9:30, the control identifier CID for "Ceiling Light" is changed to a control identifier with its initial values shifted by one bit. Since the initial values of the control identifier CID is "000100010001" (see FIG. 5), the control identifier CID for "Ceiling Light" is changed to "100010001000" at 9:30.

At 12:45, the control identifier CID for "Ceiling Light" is changed to a control identifier with its previous values inverted in bit. That is, the control identifier CID for "Ceiling Light" is changed to "011101110111" at 12:45.

Subsequently, at 13:00, the control identifier CID for "Ceiling Light" is changed to a control identifier with its initial values inverted in bit. That is, the control identifier CID for "Ceiling Light" is changed to "111011101110" at 13:00.

At 17:10, the control identifier CID for "Ceiling Light" is changed to "010011101111".

At 21:35, the control identifier CID for "Ceiling Light" is changed to a control identifier with its previous values inverted in bit. That is, the control identifier CID for "Ceiling Light" is changed to "101100010000" at 21:35.

At 3:00, the control identifier CID for "Ceiling Light" is changed to a control identifier with its previous values shifted by three bits. That is, the control identifier CID for "Ceiling Light" is changed to "000101100010" at 3:00 (see FIG. 15, (a)).

As a result, the control object, i.e. object 1, the control classification, i.e. the light switch, and the control value, i.e. ON, are represented by different 4 bits depending on the each time.

The control identifier CID for "Floor Air Conditioner" is changed to "010111101111" at 8:30, is changed to "010010101111" at 8:45, is changed to "010011101011" at 9:00, and on and after is changed every 15 minutes, and is changed to "010011101111" at 17:00, is changed to "011011101111" at 17:15, is changed to "010111101101" at 17:30, and is changed to no control identifier (control not allowed) at 17:45, which lasts until 8:30 next day (see FIG. 15(b)).

As a result, the control object, i.e. object 2, the control classification, i.e. the air conditioner's temperature, and the control value, i.e. increase, are represented by different 4 bits depending on the each time.

In this way, a control identifier CID is changed by changing, over time, the bit values that represent the control object, control classification and control value which constitute the control identifier CID.

Figure 16:
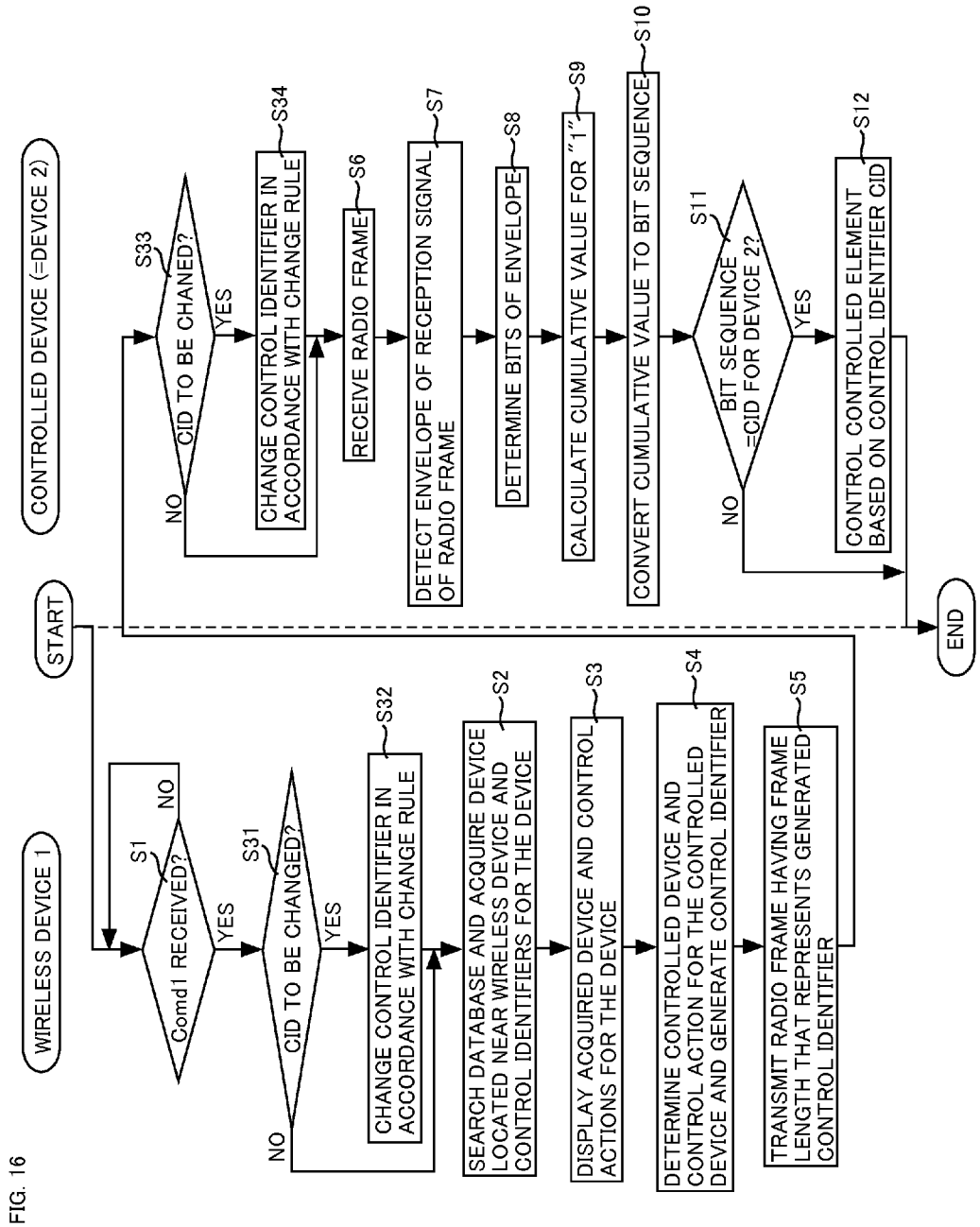
FIG. 16 is a flow chart illustrating the operation of the control system in an implementation where a control identifier is changed over time.

FIG. 16 is a flow chart illustrating the operation of the control system 10 in an implementation where a control identifier CID is changed over time.

The flow chart of FIG. 16 is the same as that of FIG. 10 except that steps S31 and S32 are added between steps S1 and S2 of the flow chart of FIG. 10 and steps S33 and S34 are added between steps S5 and S6.

Referring to FIG. 16, upon starting a series of operation, the step S1 described above is executed. Then, after the central processor 12 of the wireless device 1 receives a command signal Comd1 from the input/output means 11, it reads change rules from the storage unit 17, and, based on time information from the timer 18, determines whether a control identifier CID is to be changed (step S31). Here, if the time indicated by the time information received from the timer 18 matches a time in the change rules, the central processor 12 determines that the control identifier CID is to be changed, and, if the time indicated by the time information received from the timer 18 does not match time in the change riles, determines that the control identifier CID is not to be changed.

If it is determined at step S31 that the control identifier CID is to be changed, the central processor 12 changes the control identifier CID in the database DB in accordance with the change rules (step S32).

If it is determined at step S31 that the control identifier CID is not to be changed, or after step S32, the wireless device 1 sequentially performs steps S2 to S5 described above.

Here, if the process has transitioned from step S32 to step S2, the central processor 12, at step S2, acquires the devices 2 to 4 located near the wireless device 1 and the changed control identifiers CID for the devices 2 to 4.

After step S5, the microcomputer 215 of the controlled device (=device 2) reads the change rules from the storage unit 216 and, based on the time information from the timer 217, determines whether a control identifier CID is to be changed (step S33). Here, the microcomputer 215 determines whether the control identifier CID is to be changed in accordance with the same determination method as that of the central processor 12 at step S31.

At step S33, if it is determined that the control identifier CID is to be changed, the microcomputer 215 changes the control identifier CID stored in the storage unit 216 in accordance with the change rules (step S34). Here, the control identifier CID is changed in the same manner as the control identifier CID is changed at step S32, at the same time as the control identifier CID is changed at step S32.

If it is determined at step S33 that the control identifier CID is not to be changed, or after step S34, the controlled device (=device 2) sequentially performs steps S6 to S12 described above. Thus, the process ends.

If the process has transitioned from step S34 to step S6, the controlled device (=device 2) determines whether a bit sequence matches a control identifier CID using the changed control identifiers CID (see step S11).

In this way, according to the flow chart of FIG. 16, the wireless device 1 and controlled device (=device 2) change control identifiers CID in accordance with the same change rules and at the same times, and the wireless device 1 controls the controlled device (=device 2) based on the changed control identifiers CID. Thus, only the user of a wireless device 1 that holds the change rules can control the controlled device, thereby improving security.

If the database DB is stored in a remote server (for example, a cloud server), the operation of the control system 10 is performed in accordance with a flow chart that is the flow chart shown in FIG. 12 in which steps S31 and S32 shown in FIG. 16 are added between steps S1 and S2A shown in FIG. 12 and steps S33 and S34 shown in FIG. 16 are added between steps S5 and S6.

In this case, at step S32, the central processor 12 uses the radio module 13 and antenna 14 to access the remote server (for example, a cloud server) via a wireless access network (a 3G link) and changes control identifiers CID in the database DB in accordance with the change rules.

Now, example applications of the control system 10 will be described.

EXAMPLE APPLICATIONS

Example Application 1

Figure 17:
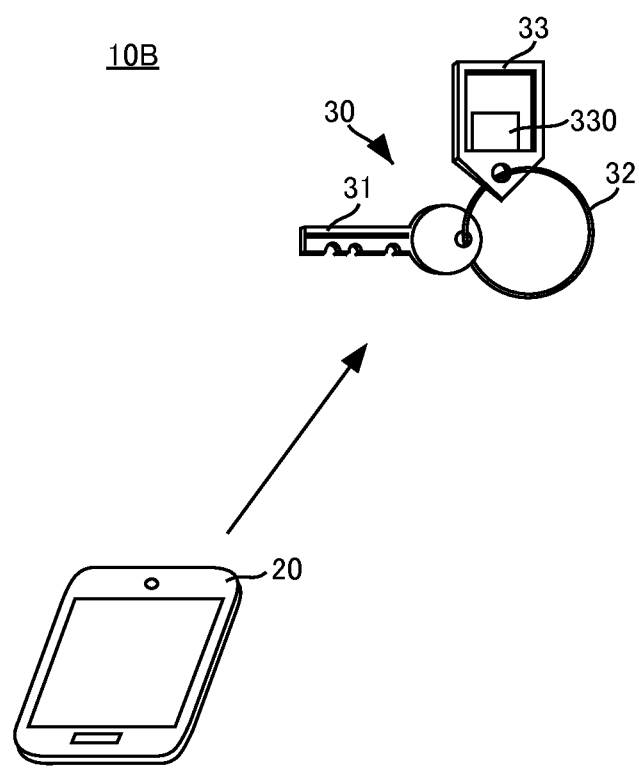
FIG. 17 is a schematic diagram of the control system of Example Application 1.

FIG. 17 is a schematic diagram of the control system of Example Application 1. Referring to FIG. 17, a control system 10b according to Example Application 1 includes a smartphone 20 and a key 30.

The smartphone 20 includes the arrangement of the wireless device 1 shown in FIG. 1. The key 30 is held and carried around by the user of the smartphone 20.

The key 30 includes a key body 31, a ring 32 and a tab 33. The key body 31 is connected to the tab 33 via the ring 32.

The tab 33 includes a receiver 330, and the receiver 330 has the same configuration as the receiver 21 described above.

The smartphone 20 uses GPS, for example, to acquire a current location and a current time. Then, the smartphone 20 acquires the control identifier CID for the device (key 30) based on information indicating that the user of the smartphone 20 holds the key 30, which is to be controlled. In this case, the smartphone 20 holds in advance devices such as the key 30 held by the user and the control identifiers CID for the devices stored in the storage unit 17 in an associated manner. Then, if the smartphone 20 receives information indicating that the user holds the key 30, it acquires a control identifier CID by reading the control identifier CID corresponding to the key 30 from the storage unit 17.

After the smartphone 20 acquires the control identifier CID, it transmits a radio frame having a frame length that represents the control identifier CID for the key 30, the current location, and the current time to the receiver 330 of the key 30.

The receiver 330 receives the radio frame, current location and current time from the smartphone 20. Then, based on the received radio wave, the receiver 330 detects the bit sequence using the method described above, and, if the detected bit sequence matches the control identifier CID for the key 30, stores in the storage unit 216 the received current location and current time in an associated manner.

If the detected bit sequence does not match the control identifier CID for the key 30, the receiver 330 discards the current location and current time.

In this way, in Example Application 1, the smartphone 20 acquires periodically a current location and a current time and transmits the acquired current location and current time, together with the control identifier CID for the key 30, to the receiver 330 of the key 30, and, only if the receiver 330 receives the control identifier CID for the key 30 from the smartphone 20, it stores in the storage unit 216 the current location of the smartphone 20 and current time in an associated manner.

As a result, if by any chance the user of the smartphone 20 loses the smartphone 20, he will know place and time that he lost the smartphone 20 if he acquires the current locations and current times stored in the receiver 330 of the key 30. That is, the last current location and current time stored in the receiver 330 indicate place and time that the smartphone 20 was lost since no current location of the smartphone 20 and current time may be stored in the receiver 330 without the smartphone 20.

In this way, in Example Application 1, in addition to the control identifier CID for the key 30, by transmitting information that the smartphone 20 holds (for example, time and location) to the receiver 330 of the key 30, the user can know place and time that he lost the smartphone 20.

In Example Application 1, the key 30 may be replaced by a watch; generally, any object that the user of the smartphone 20 holds may be used.

As described above, in Example Application 1, information that allows the user of the smartphone 20 to know place and time that he lost the smartphone 20 is transmitted to the receiver 330 mounted on an object held by the user, where the information stored in the receiver 330 may be any information that allows the user to know place and time that he lost the smartphone 20.

Thus, generally, Example Application 1 may be employed in cases where it is desired to know place and time that a smartphone 20 was lost.

Alternatively, in Example Application 1, the smartphone 20 may be not hold the database DB described above, and may store in the storage unit 17 a program for setting a control identifier CID for the key 30 and read this program from the storage unit 17 to acquire the control identifier CID for the key 30. Still alternatively, the user of the smartphone 20 may set a control identifier CID for the key 30 for the smartphone 20.

Still alternatively, in Example Application 1, the smartphone 20 may transmit, instead of both a current location and current time, only a current time to the key 30 and the receiver 330 may store only the current time received from the smartphone 20 in the storage unit 216. If the user of the smartphone 20 knows the time when the receiver 330 ceased to receive time information from the smartphone 20, he may try to remember where he was at that time and look for the smartphone 20.

Example Application 2

Figure 18:
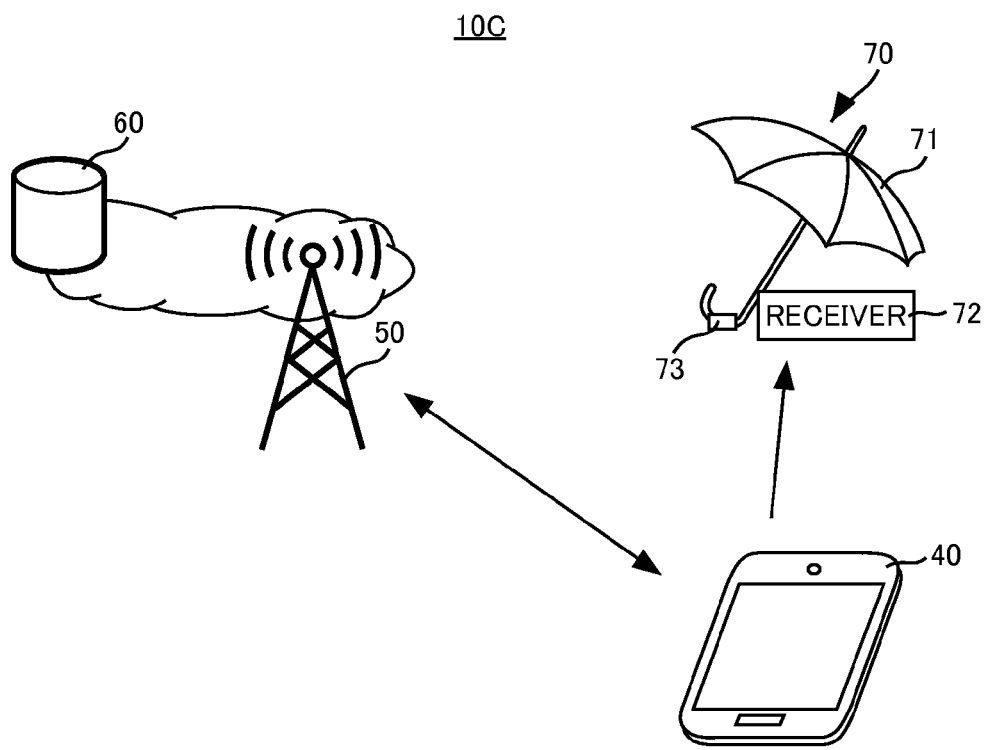
FIG. 18 is a schematic diagram of the control system of Example Application 2.

FIG. 18 is a schematic diagram of the control system of Example Application 2. Referring to FIG. 18, the control system 10C according to Example Application 2 includes a smartphone 40, a base station 50, a cloud server 60 and a rain item 70.

The smartphone 40 includes the arrangement of the wireless device 1 described above.

The rain item 70 includes an umbrella 71, a receiver 72 and a Light Emitting Device (LED) 73. The receiver 72 has the same configuration as the receiver 21 described above. The receiver 72 and LED 73 are mounted on the umbrella 71.

The smartphone 40 uses an application program installed thereon to automatically access the cloud server 60 via a wireless access network (a 3G link) of the base station 50, and acquires a weather forecast from the cloud server 60.

Similar to the wireless device 1, the smartphone 40 searches the database DB and, based on its positional information, acquires a device located near the smartphone (=rain item 70) and a control identifier CID for the device (=rain item 70).

Then, the smartphone 40 transmits a radio frame having a frame length that represents the control identifier CID for the rain item 70 and the weather forecast to the receiver 72 of the rain item 70.

The receiver 72 receives the radio frame and weather forecast from the smartphone 40. Then, based on the received radio wave, the receiver 72 detects the bit sequence using the method described above, and, if the detected bit sequence matches the control identifier CID for the rain item 70, checks at the content of the received weather forecast, and, if the weather forecast says that it will rain, uses the control circuit 218 to control the LED 73 to be on. Then, the LED 73 is turned on in accordance with control by the control circuit 218 of the receiver 72.

If the detected bit sequence does not match the control identifier CID for the rain item 70, the receiver 72 discards the weather forecast.

In this way, the smartphone 40 transmits, in addition to a control identifier CID for the rain item 70, additional information acquired via a network (i.e. a weather forecast) to the rain item 70 being controlled. Thus, the user of the smartphone 40 is prompted to carry the rain item 70.

In Example Application 2, if the weather forecast says that it will rain, the umbrella 71 may be opened instead of the LED 73 being turned on.

Generally, as described above, Example Application 2 may be employed in cases where the user of the smartphone 40 is to be prompted to carry an object that he must carry when he goes out.

The smartphone 40 may not hold the database DB described above, and may store in the storage unit 17 a program for setting a control identifier CID for the device (=rain item 70) and read this program from the storage unit 17 to acquire the control identifier CID for the device (=rain item 70). Alternatively, the user of the smartphone 40 may set a control identifier CID for the device (=rain item 70) to the smartphone 40.

Example Application 3

Figure 19:
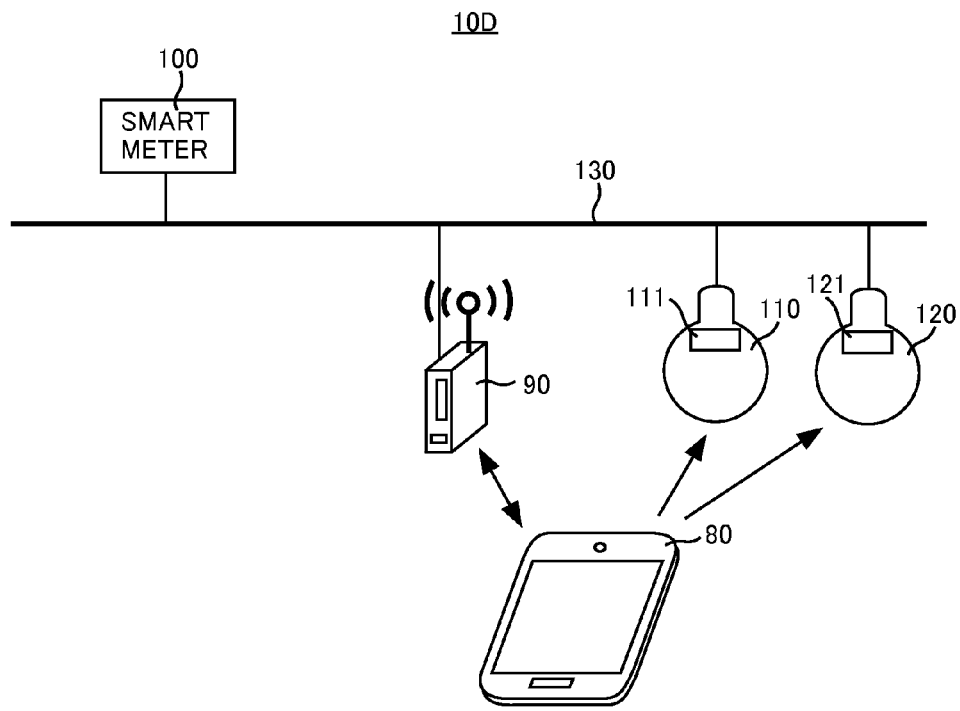
FIG. 19 is a schematic diagram of the control system of Example Application 3.

FIG. 19 is a schematic diagram of the control system according to Example Application 3. Referring to FIG. 19, a control system 10D according to Example Application 3 includes a smartphone 80, an access point 90, a smart meter 100, lights 110 and 120, and a control line 130.

The access point 90, smart meter 100 and lights 110 and 120 are connected to the control line 130. The control 130 may comply with any standards.

The smartphone 80 includes the arrangement of the wireless device 1 described above. The light 110 includes a receiver 111 and the light 120 includes a receiver 121. Each of the receivers 111 and 121 has the same configuration as the receiver 21 described above.

Similar to the wireless device 1, the smartphone 80 searches the database DB and, based on its positional information, acquires devices located near itself (=lights 110 and 120) and control identifiers CID for these devices (=lights 110 and 120).

The smartphone 80 uses a conventional method to establish a radio link with the access point 90. Then, the smartphone 80 accesses the access point 90 to transmit its authentication information to the access point 90, and inquires of the access point 90 whether the lights 110 and 120 are controllable.

In response to the inquiry by the smartphone 80, the access point 90 requests the smart meter 100 to transmit to itself the value of power that can be supplied to the two lights 110 and 120. In response to the request by the access point 90, the smart meter 100 transmits to the access point 90 the value of power that can be supplied to the two lights 110 and 120.

The access point 90 receives from the smart meter 100 the value of power that can be supplied to the two lights 110 and 120. The access point 90 holds in advance the value of power that allows the two lights 110 and 120 to be turned on. The access point 90 determines whether the smartphone 80 is an authenticated one based on the authentication information received from the smartphone 80. If the access point 90 determines that the smartphone 80 is an authenticated one, it determines whether the value of power that can be supplied to the two lights 110 and 120 is larger than the value of power that allows the two lights 110 and 120 to be turned on. If the value of power that can be supplied is larger than the value of power that allows the two lights 110 and 120 to be turned on, the access point 90 permits that the smartphone 80 controls the lights 110 and 120. Then, the access point 90 transmits, to the lights 110 and 120 via the control line 130, a signal that allows the lights 110 and 120 to be controlled by the smartphone 80. Thus, controls are possible through the control line 130.

After the smartphone 80 is permitted by the access point 90 to control the lights 110 and 120, it transmits a radio frame having a frame length that represents the control identifier CID_A for the light 110 to the receiver 111 and transmits a radio frame having a frame length that represents the control identifier CID_B for the light 120 to the receiver 121 by performing the same operations as the wireless device 1. Here, the control identifiers CID_A and CID_B includes control actions for controlling the modulated light of the lights 110 and 120, respectively.

The receiver 111 receives a radio frame from the smartphone 80. Then, based on the received radio wave, the receiver 111 detects the bit sequence using the method described above, and, if the detected bit sequence matches the control identifier CID_A for the light 110, controls the modulated light of the light 110 based on the control identifier CID_A.

The receiver 121 receives a radio frame from the smartphone 80. Then, based on the received radio wave, the receiver 121 detects the bit sequence using the method described above, and, if the detected bit sequence matches the control identifier CID_B for the light 120, controls the modulated light of the light 120 based on the control identifier CID_B.

Thus, in Example Application 3, the smartphone 80 can control the lights 110 and 120 on the conditions that it has acquired the control identifiers CID_A and CID_B for the lights 110 and 120 and, in addition, it is assigned to the access point 90 and it has obtained permission from the access point 90 to control the lights 110 and 120.

Thus, the controlling of the lights 110 and 120 may be limited by providing an additional condition (the condition with respect to power for the lights 110 and 120) that is different from the original condition that the control identifiers CID_A and CID_B have been obtained.

Further, the controlling of the lights 110 and 120 by the smartphone 80 may be limited to the time period in which controls are possible through the control line 130.

Generally, as described above, Example Application 3 may be employed in cases where the controlling of the controlled devices (=lights 110 and 120) is to be restricted based on local information held by the smart meter 100 and the authentication information of the smartphone 80 held by the access point 90, in addition to the original condition that the control identifiers CID_A and CID_B have been obtained.

Example Application 4

Figure 20:
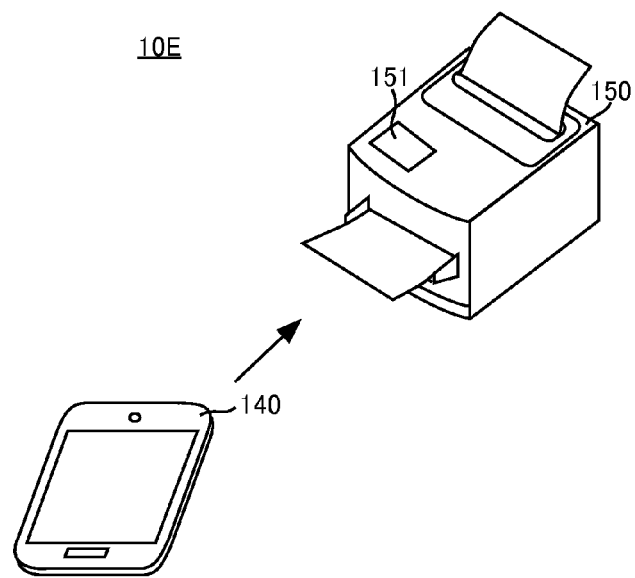
FIG. 20 is a schematic diagram of the control system of Example Application 4.

FIG. 20 is a schematic diagram of the control system of Example Application 4. Referring to FIG. 20, a control system 10E according to Example Application 4 includes a smartphone 140 and printer 150.

The smartphone 140 has the same configuration as the wireless device 1 described above. The printer 150 includes a receiver 151. The receiver 151 has the same configuration as the receiver 21 described above.

The smartphone 140 and printer 150 are provided in the same room. That is, the printer 150 is located near the smartphone 140. The printer 150 gets on standby at a low power consumption if it has not been used for a certain period of time (for example, 10 minutes). The low power consumption may be 10% to 30% of the power consumption found during normal operation, for example; generally, any value smaller than the power consumption found during normal operation may be used.

Similar to the wireless device 1, the smartphone 140 searches the database DB and, based on its positional information, acquires the device located near itself (=printer 150) and a control identifier CID for this device (=printer 150). Here, the control identifier CID includes the control action of activating the printer 150.

Then, the smartphone 140 transmits a radio frame having a frame length that represents the acquired control identifier CID to the receiver 151 of the printer 150.

The receiver 151 receives the radio frame from the smartphone 140. Then, based on the received radio wave, the receiver 151 detects the bit sequence using the method described above, and, if the detected bit sequence matches the control identifier CID for the printer 150, activates the printer 150 based on the control identifier CID.

After the printer 150 is activated in accordance with control by the receiver 151, it gets on standby at a low power consumption if a certain period of time passed after the completion of use by the holder of the smartphone 140.

In this way, in Example Application 4, the smartphone 140 activates the printer 150 located near itself. Thus, when the holder of the smartphone 140 desires to use the printer 150, he may remotely activate the printer 150 to print various data. Also, the power consumption of the printer 150 may be saved.

Alternatively, in Example Application 4, the control system 10E may include a personal computer instead of the smartphone 140. In this case, the personal computer activates the printer 150 by performing the same operations as the smartphone 140.

The printer 150 may be in any location that can be associated with the positional information of the smartphone 140 (=wireless device).

Example Application 5

Figure 21:
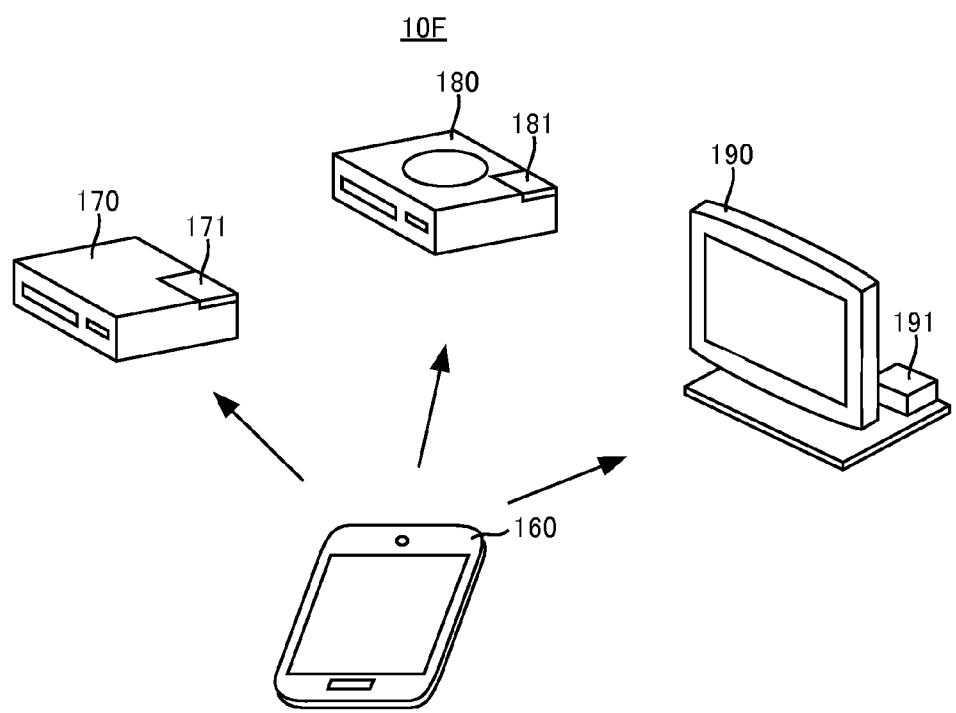
FIG. 21 is a schematic diagram of the control system of Example Application 5.

FIG. 21 is a schematic diagram of the control system of Example Application 5. Referring to FIG. 21, a control system 10F according to Example Application 5 includes a smartphone 160, a VTR 170, a game machine 180 and a television 190.

The smartphone 160, VTR 170, game machine 180 and television 190 are provided in one house.

The smartphone 160 has the same configuration as the wireless device 1 described above. The VTR 170 includes a receiver 171. The game machine 180 includes a receiver 181. The television 190 includes a receiver 191. Each of the receivers 171, 181 and 191 has the same configuration as the receiver 21 described above.

Similar to the wireless device 1, the smartphone 160 searches the database DB and, based on its positional information, acquires a device (=VTR 170) located near itself and a control identifier CID_V for this device (=VTR 170). Here, the control identifier CID_V includes one of the control action of turning on the VTR 170, the control action of turning off the VTR 170, the control action of increasing the sound volume of the VTR 170 and the control action of reducing the sound volume of the VTR 170.

Similar to the wireless device 1, the smartphone 160 searches the database DB and, based on its positional information, acquires a device (=game machine 180) located near itself and a control identifier CID-G for this device (=game machine 180). Here, the control identifier CID_G includes one of the control action of turning on the game machine 180, the control action of turning off the game machine 180, the control action of increasing the sound volume of the game machine 180 and the control action of reducing the sound volume of the game machine 180.

Similar to the wireless device 1, the smartphone 160 searches the database DB and, based on its positional information, acquires a device (=television 190) located near itself and a control identifier CID-T of this device (=television 190). Here, the control identifier CID_T includes one of the control action of turning on the television 190, the control action of turning off the television 190, the control action of increasing the sound volume of the television 190 and the control action of reducing the sound volume of the television 190.

When the smartphone 160 controls the VTR 170, the smartphone 160 transmits a radio frame having a frame length that represents the control identifier CID_V to the receiver 171 of the VTR 170.

The receiver 171 of the VTR 170 receives the radio frame from the smartphone 160. Based on the received radio wave, the receiver 171 detects the bit sequence using the method described above, and, if the detected bit sequence matches the control identifier CID_V for the VTR 170, turns on the VTR 170, turns off the VTR 170, increases the sound volume of the VTR 170, or reduces the sound volume of the VTR 170 based on the control identifier CID_V.

When the smartphone 160 controls the game machine 180, the smartphone 160 transmits a radio frame having a frame length that represents the control identifier CID_G to the receiver 181 of the game machine 180.

The receiver 181 of the game machine 180 receives the radio frame from the smartphone 160. Based on the received radio wave, the receiver 181 detects the bit sequence using the method described above, and, if the detected bit sequence matches the control identifier CID_G for the game machine 180, turns on the game machine 180, turns off the game machine 180, increases the sound volume of the game machine 180, or reduces the sound volume of the game machine 180 based on the control identifier CID_G.

When the smartphone 160 controls the television 190, the smartphone 160 transmits a radio frame having a frame length that represents the control identifier CID_T to the receiver 191 of the television 190.

The receiver 191 of the television 190 receives the radio frame from the smartphone 160. Based on the received radio wave, the receiver 191 detects the bit sequence using the method described above, and, if the detected bit sequence matches the control identifier CID_T for the television 190, turns on the television 190, turns off the television 190, increases the sound volume of the television 190, or reduces the sound volume of the television 190 based on the control identifier CID_T.

In this way, in Example Application 5, the smartphone 160 controls on/off and loud/quiet in volume of home electronics in a home. Thus, the smartphone 160 may be used as a remote control for home electronics.

The VTR 170, game machine 180 and television 190 may be in any location that can be associated with the positional information of the smartphone 160 (=wireless device).

Example Application 6

Figure 22:
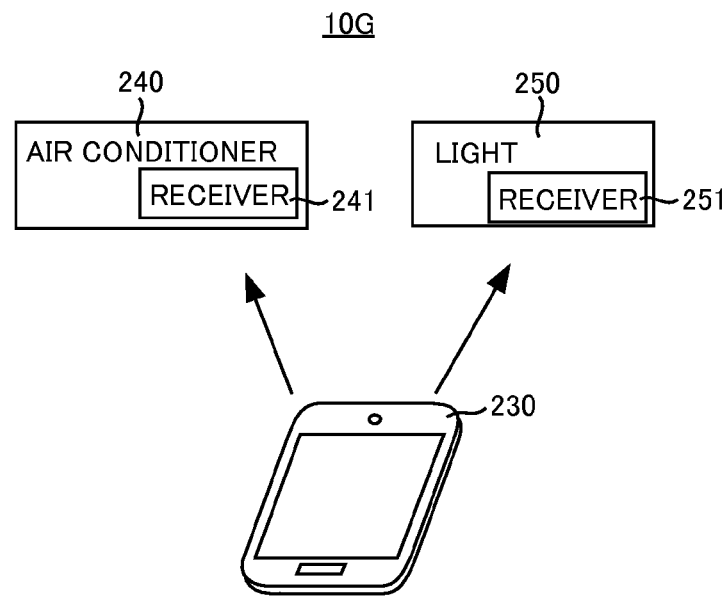
FIG. 22 is a schematic diagram of the control system of Example Application 6.

FIG. 22 is a schematic diagram of the control system of Example Application 6. Referring to FIG. 22, a control system 10G according to Example Application 6 includes a smartphone 230, an air conditioner 240 and a light 250.

The smartphone 230 is held by a person working in an office or commercial facilities. The air conditioner 240 and light 250 are provided in the office or commercial facilities.

The smartphone 230 has the same configuration as the wireless device 1 described above. The air conditioner 240 includes a receiver 241. The light 250 includes a receiver 251. Each of the receivers 241 and 251 has the same configuration as the receiver 21 described above.

Similar to the wireless device 1, the smartphone 230 searches the database DB and, based on its positional information, acquires a device located near itself (=air conditioner 240) and a control identifier CID-AC for this device (=air conditioner 240). Here, the control identifier CID-AC includes the control action of saving the electricity used by the air conditioner 240 or a control action that depends on the desire of the holder of the smartphone 230. Control actions that depend on the desire of the holder of the smartphone 230 include, for example, causing relatively strong ventilation, causing relatively week ventilation, setting the temperature to a relatively high level, setting the temperature to a relatively low level, and ensuring that the holder of the smartphone 230 is not exposed to direct airflow from the air conditioner.

Similar to the wireless device 1, the smartphone 230 searches the database DB and, based on its positional information, acquires a device located near itself (=light 250) and a control identifier CID-L for this device (=light 250). Here, the control identifier CID-L includes the control action of saving the electricity used by the light 250, or a control action that depends on the desire of the holder of the smartphone 230. Controls actions that depend on the desire of the holder of the smartphone 230 include, for example, increasing the brightness and reducing the brightness.

When the smartphone 230 controls the air conditioner 240, the smartphone 230 transmits a radio frame having a frame length that represents the control identifier CID-AC to the receiver 241 of the air conditioner 240.

The receiver 241 of the air conditioner 240 receives the radio frame from the smartphone 230. Then, based on the received radio wave, the receiver 241 detects the bit sequence using the method described above, and, if the detected bit sequence matches the control identifier CID-AC for the air conditioner 240, increases the ventilation of the air conditioner 240, reduces the ventilation of the air conditioner 240, sets the temperature to be achieved by the air conditioner 240 to a high level, or sets the temperature to be achieved by the air conditioner 240 to a low level, based on the control identifier CID-AC.

When the smartphone 230 controls the light 250, the smartphone 230 transmits a radio frame having a frame length that represents the control identifier CID-L to the receiver 251 of the light 250.

The receiver 251 of the light 250 receives a radio frame from the smartphone 230. Then, based on the received radio wave, the receiver 251 detects the bit sequence using the method described above, and, if the detected bit sequence matches the control identifier CID-L for the light 250, increases the brightness of the light 250 or reduces the brightness of the light 250, based on the control identifier CID-L.

In this way, in Example Application 6, a person working in the office or commercial facilities may use his own smartphone 230 to save the electricity used by the air conditioner 240 and light 250 or control the air conditioner 240 and light 250 as he wishes, while staying at his own desk.

Thus, energy conservation can be achieved in the office or commercial facilities. Also, the interior of the office or commercial facilities may be made more comfortable.

Alternatively, in Example Application 6, the control system 10G may include an electric device other than the air conditioner 240 and light 250, and may include any electric device that is provided in the office or commercial facilities.

The receivers 241 and 251 may be any receivers that are provided in a building, in facilities or above facilities and are capable of controlling the air conditioner 240 and light 250 (i.e. the controlled elements) depending on the desire of a person using the building or facilities.

Example Application 7

Figure 23:
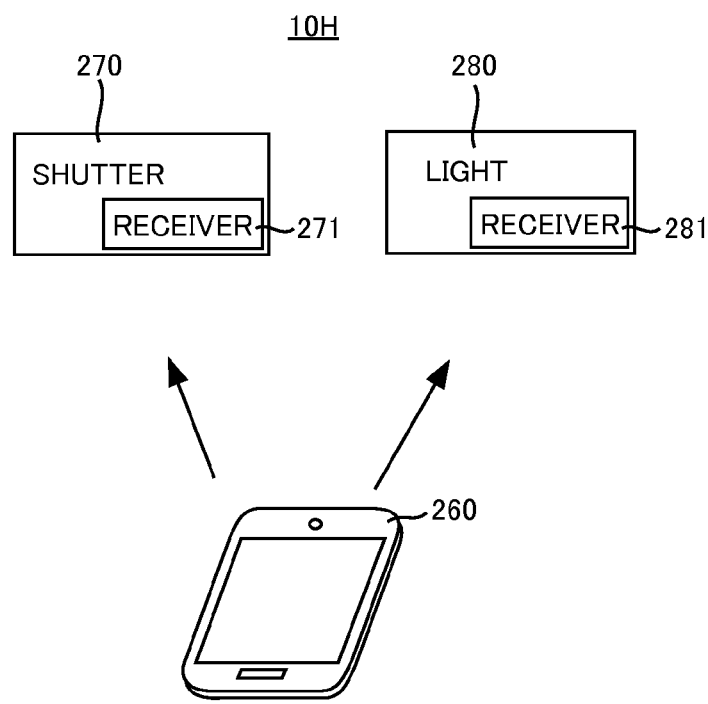
FIG. 23 is a schematic diagram of the control system of Example Application 7.

FIG. 23 is a schematic diagram of the control system of Example Application 7. Referring to FIG. 23, a control system 10H according to Example Application 7 includes a smartphone 260, a shutter 270 and a light 280.

The smartphone 260 is held by a resident of a building (for example, an apartment) including a living space in which the resident lives and a space for common use. The shutter 270 and light 280 are provided in the space for common use in this building.

The smartphone 260 has the same configuration as the wireless device 1 describe above. The shutter 270 includes a receiver 271. The light 280 includes a receiver 281. Each of the receivers 271 and 281 has the same configuration as the receiver 21 described above.

Similar to the wireless device 1, the smartphone 260 searches the database DB and, based on its positional information, acquires a device located near itself (=shutter 270) and a control identifier CID-S for this device (=shutter 270). Here, the control identifier CID-S includes the control action of opening the shutter 270 or the control action of closing the shutter 270.

Similar to the wireless device 1, the smartphone 260 searches the database DB and, based on its positional information, acquires a device located near itself (=light 280) and a control identifier CID-L for this device (=light 280). Here, the control identifier CID-L includes the control action of turning on the light 280 or the control action of turning off the light 280.

When the smartphone 260 controls the shutter 270, the smartphone 260 transmits a radio frame having a frame length that represents the control identifier CID-S to the receiver 271 of the shutter 270.

The receiver 271 of the shutter 270 receives the radio frame from the smartphone 260. Then, based on the received radio wave, the receiver 271 detects the bit sequence using the method described above, and, if the detected bit sequence matches the control identifier CID-S for the shutter 270, opens the shutter 270 or closes the shutter 270, based on the control identifier CID-S.

When the smartphone 260 controls the light 280, the smartphone 260 transmits a radio frame having a frame length that represents the control identifier CID-L to the receiver 281 of the light 280.

The receiver 281 of the light 280 receives the radio frame from the smartphone 260. Then, based on the received radio wave, the receiver 281 detects the bit sequence using the method described above, and, if the detected bit sequence matches the control identifier CID-L for the light 280, turns on the light 280 or turns off the light 280, based on the control identifier CID-L.

In this way, in Example Application 7, a resident of an apartment or the like may use his smartphone 260 to control the shutter 270 and light 280 provided in the space for common use of the apartment or the like.

Thus, the electricity used by electric devices provided in a space for common use of an apartment or the like may be saved. Further, an electric device provided in a space for common use of an apartment or the like may be freely controlled, thereby making the life in the apartment or the like more comfortable.

Alternatively, in Example Application 7, the control system 10H may include an electric device other than the shutter 270 and light 280; generally, the system may include any electric device that is provided in a space for common use of an apartment or the like.

The electric device may be controlled by a plurality of smartphones 260 (=a plurality of wireless devices) held by a plurality of persons.

Example Application 8

Figure 24:
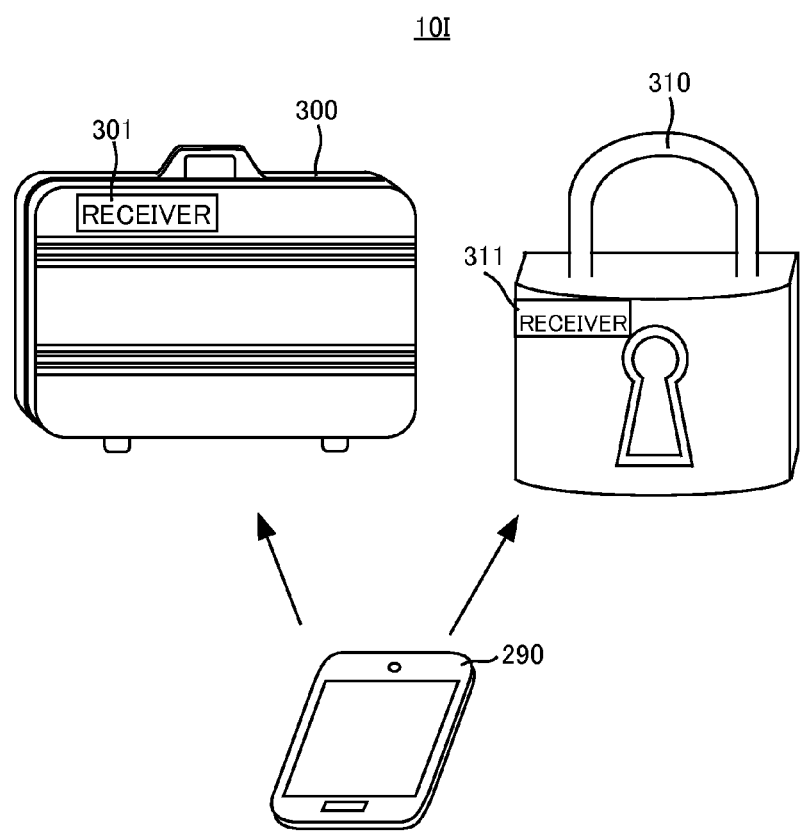
FIG. 24 is a schematic diagram of the control system of Example Application 8.

FIG. 24 is a schematic diagram of the control system of Example Application 8. Referring to FIG. 24, a control system 10I according to Example Application 8 includes a smartphone 290, a bag 300 and a key 310.

The smartphone 290 has the same configuration as the wireless device 1 described above. The bag 300 and key 310 are objects held by the user of the smartphone 290. The bag 300 includes a receiver 301 and the key 310 includes a receiver 311. Each of the receivers 301 and 311 has the same configuration as the receiver 21 described above. In this case, the controlled element 22 (see FIG. 3) controlled by the receiver 301 is a Light Emitting Device (LED) or speaker. The controlled element 22 controlled by the receiver 311 is a display device.

FIG. 25 is a conceptual diagram of a database of Example Application 8. Referring to FIG. 25, a database DB-1 according to Example Application 8 has the same configuration as the database DB (see FIG. 5). The database DB-1 includes, as a controlled object, identifying information ID1 that indicates whom the bag 300 and the key 310 belong to and includes "Called Object" and "Monitored Object" as control classifications. For the control classification of "Called Object", the control value is "Turn On LED" or "Produce Sound"; for the control classification of "Monitored Object", the control value is "Monitor Time and Location".

The smartphone 290 stores the database DB-1 in the storage unit 17.

When the bag 300 is to be controlled, the smartphone 290 searches the database DB-1 using the same method as the wireless device 1, and, based on its positional information, acquires a device located near itself (=bag 300) and the control identifier CID-BG for this device (=bag 300).

Then, the smartphone 290 transmits a radio frame having a frame length that represents the control identifier CID-BG to the receiver 301 of the bag 300.

The receiver 301 of the bag 300 receives the radio frame from the smartphone 290. Then, based on the received radio wave, the receiver 301 detects the bit sequence using the method described above, and, if the detected bit sequence matches the control identifier CID-BG for the bag 300 (that is, if the bag 300 is an object that is held by the user of the smartphone 290), turns on the LED which serves as the controlled element 22 based on the control identifier CID-BG.

Thus, the user of the smartphone 290 can see that the LED is on to find out where the bag 300, which is an object that he holds, is located.

If the controlled element 22 controlled by the receiver 301 is a speaker, the receiver 301 controls the speaker that serves as the controlled element 22 to produce a sound when the detected bit sequence matches the control identifier CID-BG for the bag 300. Thus, the user of the smartphone 290 can hear the sound produced by the speaker to find out where the bag 300, which is an object that he holds, is located.

When the key 310 is to be controlled, the smartphone 290 uses GPS, for example, to acquire a current location and a current time. Then, the smartphone 290 searches the database DB-1 using the same method as the wireless device 1, and, based on this positional information, acquires a device located near itself (=key 310) and a control identifier CID-K for this device (=key 310).

Then, the smartphone 290 transmits a radio frame having a frame length that represents the control identifier CID-K, the current location and current time to the receiver 311 of the key 310.

The receiver 311 of the key 310 receives the radio frame, current location and current time from the smartphone 290. Then, based on the received radio wave, the receiver 311 detects the bit sequence using the method described above, and, if the detected bit sequence matches the control identifier CID-K for the key 310 (that is, if the key 310 is an object held by the user of the smartphone 290), it stores in the storage unit 216 the received current location and current time in an associated manner, and displays the current location and current time on the display device which serves as the controlled element 22.

Thus, the user of the smartphone 290 can monitor the key 310, which is an object that he holds.

Thus, Example Application 8 allows the smartphone 290 to control a "called object" or allows the smartphone 290 to control a "monitored object".

Alternatively, the control system 10I may include an object other than the bag 300 and the key 310 as long as the object is an "object to be called" by the smartphone 290 or an "object to be monitored" by the smartphone 290.

Embodiment 2

Figure 26:
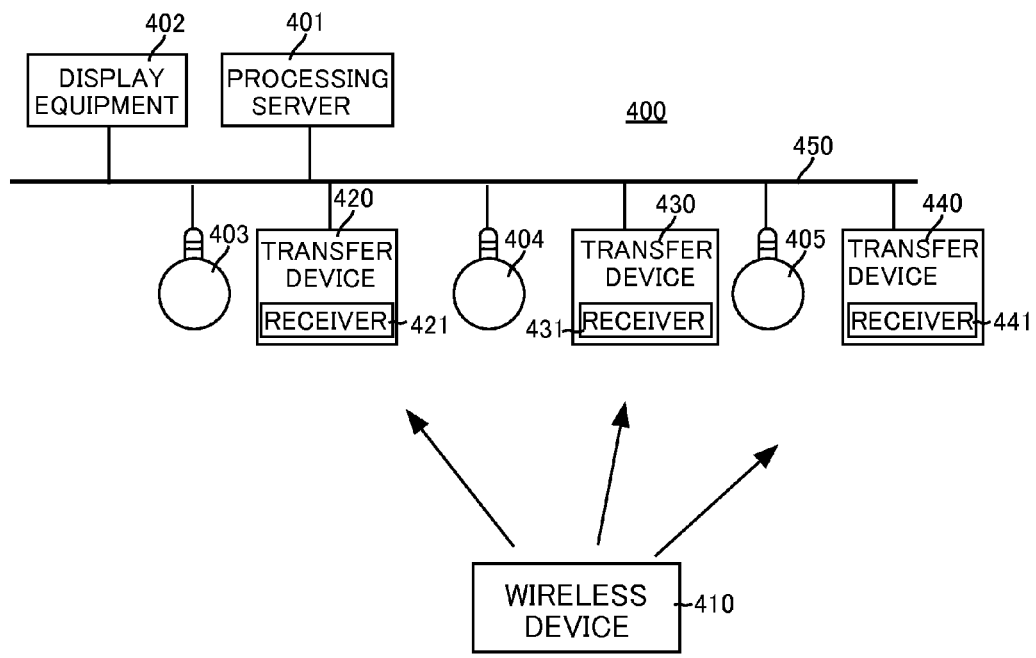
FIG. 26 is a schematic diagram of a control system according to Embodiment 2.

FIG. 26 is a schematic diagram of a control system according to Embodiment 2. Referring to FIG. 26, a control system 400 according to Embodiment 2 includes a wireless device 410 and transfer devices 420, 430 and 440.

A processing server 401, display equipment 402, lights 403 to 405 and the transfer devices 420, 430 and 440 are connected to the cable 450. The transfer devices 420, 430 and 440 include receivers 421, 431 and 441, respectively.

The wireless device 410 may be a smartphone, for example, and held by the user of the wireless device 410. At arbitrary timings, the wireless device 410 transmits a radio frame having a frame length that represents information that identifies itself (ID).

The receivers 421, 431 and 441 of the transfer devices 420, 430 and 440 receive the radio frame from the wireless device 410, and, based on the received radio wave of the received wireless frame, detect the bit sequence using the method described above. Then, the receivers 421, 431 and 441 determine whether the detected bit sequence matches the ID of the wireless device 410. Further, the receivers 421, 431 and 441 detect a reception signal strength RSSI encountered when the radio frame is received.

If the detected bit sequence matches the ID of the wireless device 410, the receivers 421, 431 and 441 provide the ID of the wireless device 410 and the reception signal strength RSSI to the transfer devices 420, 430 and 440, respectively. After each of the transfer devices 420, 430 and 440 receives the ID of the wireless device 410 and the reception signal strength RSSI, each of the transfer devices 420, 430 and 440 transmits its own identifying information, the ID of the wireless device 410 and the reception signal strength RSSI to the processing server 401 via the cable 450.

The processing server 401 receives the identifying information of the transfer device (one of the transfer devices 420, 430 and 440), the ID of the wireless device 410 and the reception signal strength RSSI via the cable 450. Then, based on the reception signal strength RSSI, the processing server 401 determines the distance L between the wireless device 410 and the transfer device (one of the transfer devices 420, 430 and 440). Here, the processing server 410 detects the distance L by detecting the distance corresponding to the reception signal strength RSSI based on the known relationship between reception signal strength RSSI and distance.

Then, the processing server 401 detects a position that is separated from the transfer device (one of the transfer devices 420, 430 and 440) by the distance L as the position of the wireless device 410, associates the detected position with the ID of the wireless device 410 and transmits them to the display equipment 402.

Further, the processing server 401 turns on or off a light (one of the lights 403 to 405) located close to the transfer device (one of the transfer devices 420, 430 and 440) that has transmitted the identifying information, the ID of the wireless device 410 and the reception signal strength RSSI.

Thus, upon reception of the ID of the wireless device 410, the processing server 401 performs the control of displaying the location and ID of the wireless device 410 on the display equipment 402, or the control of turning on or off the lights 403 to 405 that is located close to the transfer devices 420, 430 and 440. As such, the ID of the wireless device 410 corresponds to the control identifier CID described above.

When the display equipment 402 has received the location and ID of the wireless device 410 from the processing server 401, it displays the received location and ID of the wireless device 410 in an associated manner.

Figure 27:
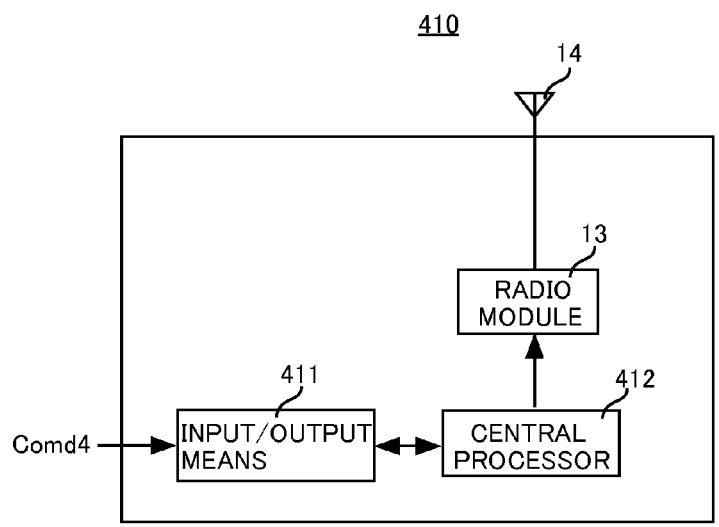
FIG. 27 is a schematic diagram of a configuration of the wireless device shown in FIG. 26.

FIG. 27 is a schematic diagram of a configuration of the wireless device 410 shown in FIG. 26. Referring to FIG. 27, the wireless device 410 is the same as the wireless device 1 of FIG. 2 except that the antenna 15, GPS 16, storage unit 17 and timer 18 of the wireless device 1 are removed and the input/output means 11 and central processor 12 are replaced by the input/output means 411 and central processor 412, respectively.

The input/output means 411 receives from the user of the wireless device 410 a command signal Comd4 for transmitting the ID of the wireless device 410, and outputs the received command signal Comd4 to the central processor 412.

The central processor 412 holds in advance the ID of the wireless device 410. After the central processor 412 receives the command signal Comd4 from the input/output means 411, it outputs the ID of the wireless device 410 to the radio module 13.

In the wireless device 410, after the radio module 13 receives the ID of the wireless device 410 from the central processor 412, it transmits via the antenna 14 a radio frame having a frame length that represents the received ID of the wireless device 410.

Figure 28:
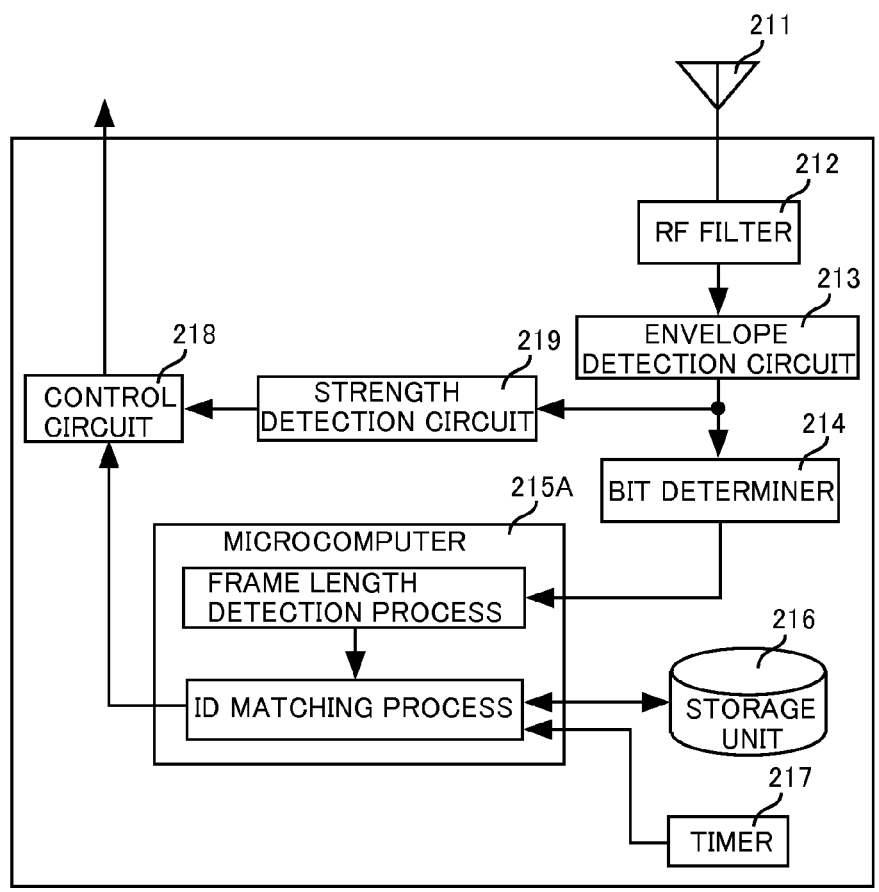
FIG. 28 is a schematic diagram of a configuration of the receiver shown in FIG. 26.

FIG. 28 is a schematic diagram of a configuration of the receiver 421 shown in FIG. 26. Referring to FIG. 28, the receiver 421 is the same as the receiver 21 of FIG. 3 except that the microcomputer 215 of the receiver 21 is replaced by the microcomputer 215A and a strength detection circuit 219 is added.

The strength detection circuit 219 receives a detection signal from the envelope detection circuit 213 and detects the strength of the received detection signal as a reception signal strength RSSI. Then, the strength detection circuit 219 outputs the detected reception signal strength RSSI to the control circuit 218.

Out of the frame length detection process, ID matching process and control process performed by the microcomputer 215, the microcomputer 215A performs the frame length detection process and ID matching process. Then, when the ID matching process is completed, the microcomputer 215A outputs the ID of the wireless device 410 to the control circuit 218.

In the receiver 421, the storage unit 216 stores the ID of the wireless device 410, and the control circuit 218 outputs the ID of the wireless device 410 and reception signal strength RSSI to the transfer device 420.

Each of the receivers 431 and 441 shown in FIG. 26 has the same configuration as the receiver 421 shown in FIG. 28.

Figure 29:
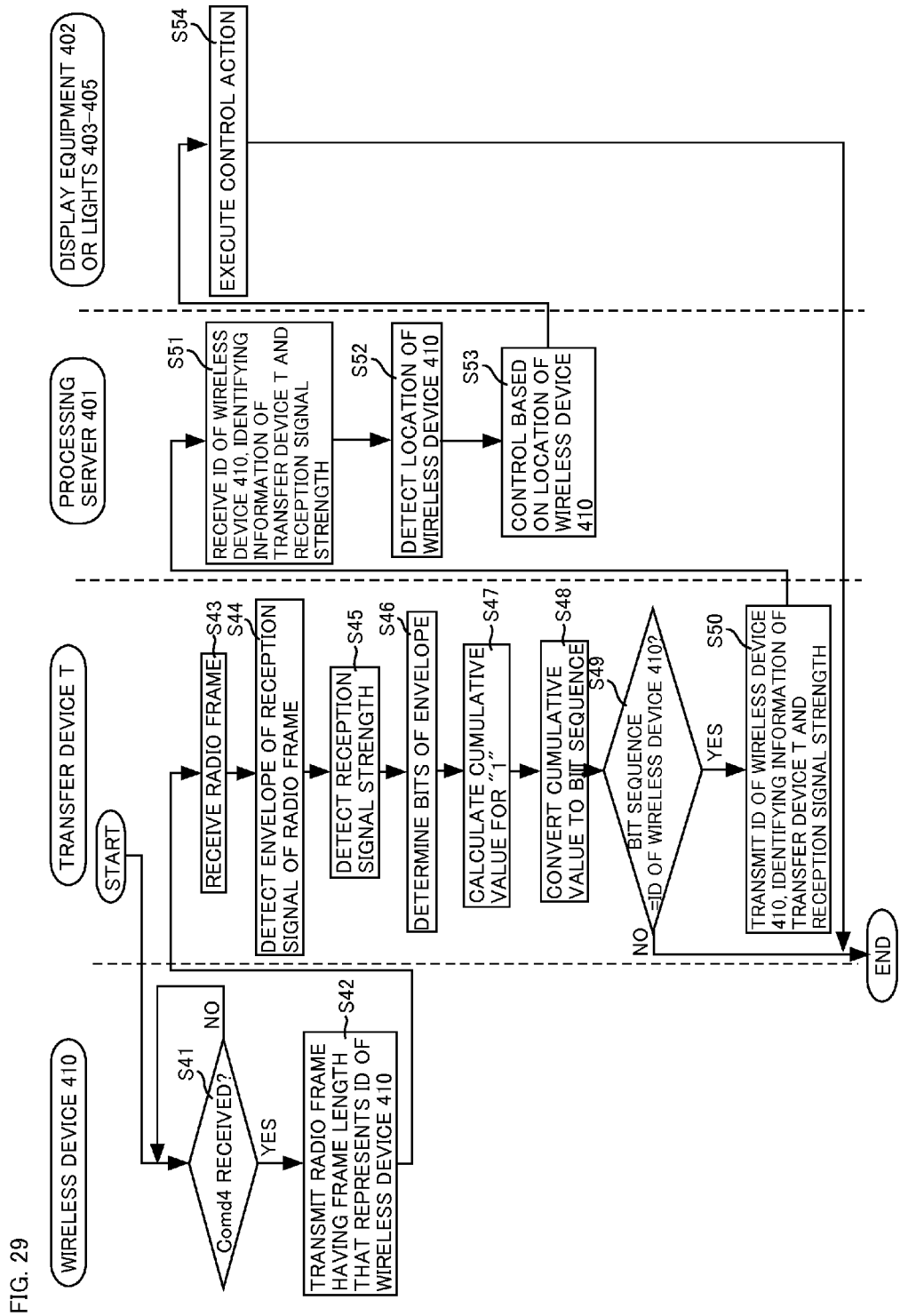
FIG. 29 is a flow chart illustrating the operation of the control system shown in FIG. 26.

FIG. 29 is a flow chart illustrating the operation of the control system 400 shown in FIG. 26. The transfer device T shown in FIG. 29 is one of the transfer devices 420, 430 and 440.

Referring to FIG. 29, upon starting the operation of the control system 400, the central processor 412 of the wireless device 410 determines whether it has received the command signal Comd4 (step S41). If the central processor 412 of the wireless device 410 has received the command signal Comd4, it outputs the ID of the wireless device 410 to the radio module 13, and the radio module 13 transmits, via the antenna 14, a radio frame having a frame length that represents the ID of the wireless device 410 (step S42).

Then, the transfer device T sequentially performs steps S6 and S7 of FIG. 10 (steps S43 and S44). After step S44, the transfer device T detects the reception signal strength RSSI (step S45).

Thereafter, the transfer device T sequentially performs steps S8 to S10 of FIG. 10 (steps S46, S47 and S48).

After step S48, the transfer device T determines whether the bit sequence matches the ID of the wireless device 410 (step S49).

If it is determined at step S49 that the bit sequence does not match the ID of the wireless device 410, the process ends.

If it is determined at step S49 that the bit sequence matches the ID of the wireless device 410, the transfer device T transmits the ID of the wireless device 410, the identifying information of the transfer device T and the reception signal strength RSSI to the processing server 401 (step S50).

The processing server 401 receives the ID of the wireless device 410, the identifying information of the transfer device T and the reception signal strength RSSI (step S51) and, based on the reception signal strength RSSI, detects the location of the wireless device 410 using the method described above (step S52).

Then, the processing server 401 controls the display equipment 402 or lights 403 to 405 based on the location of the wireless device 410 (step S53).

That is, when the location of the wireless device 410 is to be displayed on the display equipment 402, the processing server 401 transmits the location of the wireless device 410 and the ID of the wireless device 410 to the display equipment 402.

When the light near the wireless device 410 (one of the lights 403 to 405) is to be controlled, the processing server 401 controls such that the light near the wireless device 410 (one of the lights 403 to 405) is turned on.

After step S53, the display equipment 402 or the lights 403 to 405 perform(s) the control action (step S54). That is, when the display equipment 402 has received the location of the wireless device 410 and the ID of the wireless device 410 from the processing server 401, it displays the location of the wireless device 410 and the ID of the wireless device 410 in an associated manner. Or, the lights 403 to 405 are turned on in accordance with control by the processing server 401. Then, after step S54, the process ends.

When the processing server 401 controls the light near the wireless device 410 (one of the lights 403 to 405), the transfer device T does not perform step S45 and does not transmit the reception signal strength RSSI at step S50, the processing server 401 does not receive the reception signal strength RSSI at step S51 and, at step S52, the processing server 401 detects the location of the transfer device T that has transmitted the ID of the wireless device 410 and the identifying information of the transfer device T as the location of the wireless device 410. Since the processing server 401 holds in advance the locations of the transfer devices 420, 430 and 440 and the identifying information of the transfer devices 420, 430 and 440 in an associated manner such that, based on the identifying information of the transfer device T (one of the transfer devices 420, 430 and 440), the location of the transfer device T that has transmitted the ID of the wireless device 410 and the identifying information of the transfer device T can be detected as the location of the wireless device 410.

In this way, the processing server 401 performs controls in response to reception of the ID of the wireless device 410. Thus, a device (i.e. the display equipment 402 or one of the lights 403 to 405) may be controlled based on information that identifies the transmission source (i.e. the ID of the wireless device 410).

Since the wireless device 410 is held by the user of the wireless device 410, it moves as the user moves. Further, since the wireless device 410 transmits at arbitrary timings a radio frame having a frame length that represents the ID of itself (see step S42), one of the transfer devices 420, 430 and 440 receives the radio frame from the wireless device 410. That is, if the transfer device 420 is located in the communication range of the wireless device 410, the transfer device 420 receives the radio frame from the wireless device 410; if the transfer device 430 is located in the communication range of the wireless device 410, the transfer device 430 receives the radio frame from the wireless device 410; and, if the transfer device 440 is located in the communication range of the wireless device 410, the transfer device 440 receives the radio frame from the wireless device 410.

Then, in response to reception of the ID of the wireless device 410, the processing server 401 displays the ID of the wireless device 410 on the display equipment 402, or turns on the light (one of the lights 403 to 405) near the location of the wireless device 410.

Thus, the location of the user of the wireless device 410 may be known. That is, the use of the control system 400 allows realizing a human detection sensor that identifies the user.

In the above description, each of the receiver 421, 431 and 441 stores the ID of the wireless device 410 in the storage unit 216; alternatively, in Embodiment 2, the IDs of a plurality of wireless devices may be stored in the storage unit 216 of the receivers 421, 431 and 441. This will allow the locations of a plurality of users of a plurality of wireless devices to be known.

In the control system 400, each of the transfer devices 420, 430 and 440 constitutes the "communication device", the processing server 401 constitutes the "control device" and the display equipment 402 or lights 403 to 405 constitute the "controlled element(s)".

Figure 30:
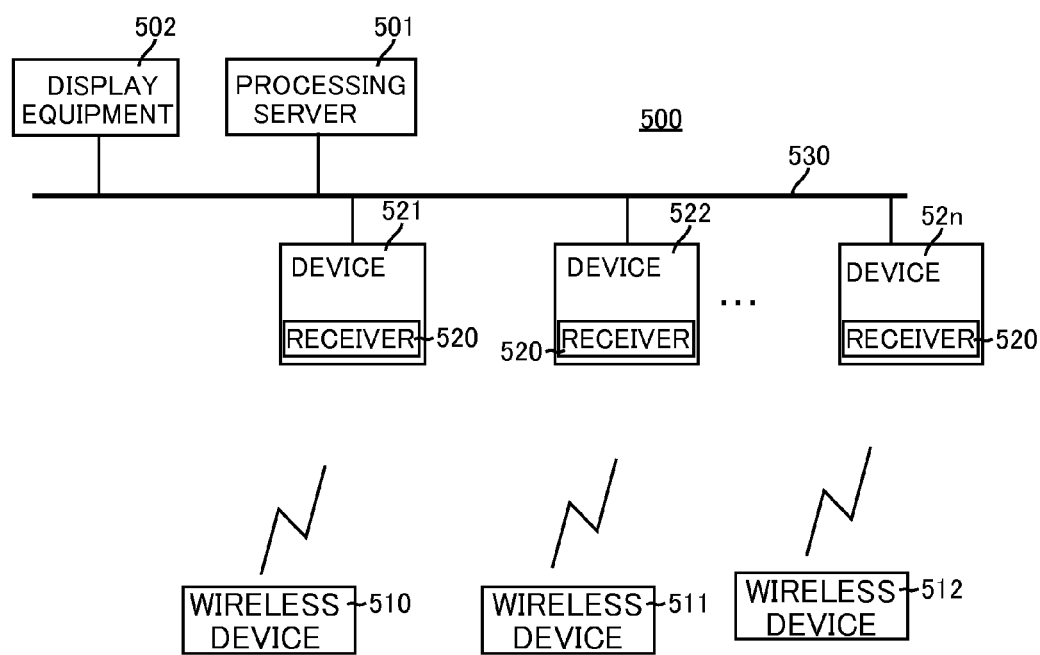
FIG. 30 is a schematic diagram of a configuration of another control system according to Embodiment 2.

FIG. 30 is a schematic diagram of a configuration of another control system according to Embodiment 2. The control system according to Embodiment 2 may be a control system 500 shown in FIG. 30.

Referring to FIG. 30, the control system 500 includes wireless devices 510 to 512 and devices 521 to 52n (n is an integer not less than 2).

A processing server 501, display equipment 502 and the devices 521 to 52n are connected to a cable 530.

Each of the wireless devices 510 to 512 has the same configuration as the wireless device 410 shown in FIG. 27. Each of the wireless devices 510 to 512 transmits, at regular periods or arbitrary intervals, a radio frame having a frame length that represents its ID.

Each of the devices 521 to 52n is provided in a predetermined location. Each of the devices 521 to 52n includes a receiver 520. The receiver 520 has the configuration of the receiver 421 shown in FIG. 28 except that the strength detection circuit 219 is removed. The receiver 520 receives a radio frame from one of the wireless devices 510 to 512 and, based on the received radio wave of the received radio frame, detects a bit sequence using the method described above.

If the detected bit sequence matches the ID of any one of the wireless devices 510 to 512, the receiver 520 outputs the ID of one of the wireless devices 510 to 512 to the devices 521 to 52n.

The storage unit 216 of the receiver 520 stores the IDs of the wireless devices 510 to 512.

If the receiver 520 detects the ID of one of the wireless devices 510 to 512, each of the devices 521 to 52n transmits the ID of one of the wireless devices 510 to 512 and its own identifying information to the processing server 501 via the cable 530.

The processing server 501 holds, in advance, a correspondence table TBL3 for the correspondence between the identifying information of the devices 521 to 52n and the locations of the devices 521 to 52n. The processing server 501 receives the ID of the wireless devices 510 to 512 and the identifying information of the device (one of the devices 521 to 52n). Then, the processing server 501 refers to the correspondence table TBL3 to detect the location of the device (one of the devices 521 to 52n) corresponding to the identifying information of the device (one of the devices 521 to 52n).

Then, the processing server 501 transmits the ID of the wireless devices 510 to 512 and the detected location to the display equipment 502 and controls the display equipment 502 to display the ID of the wireless devices 510 to 512 and the detected location.

When the display equipment 502 has received the ID and location of the wireless devices 510 to 512 from the processing server 501, it displays the received ID and location of the wireless devices 510 to 512 in an associated manner.

Figure 31:
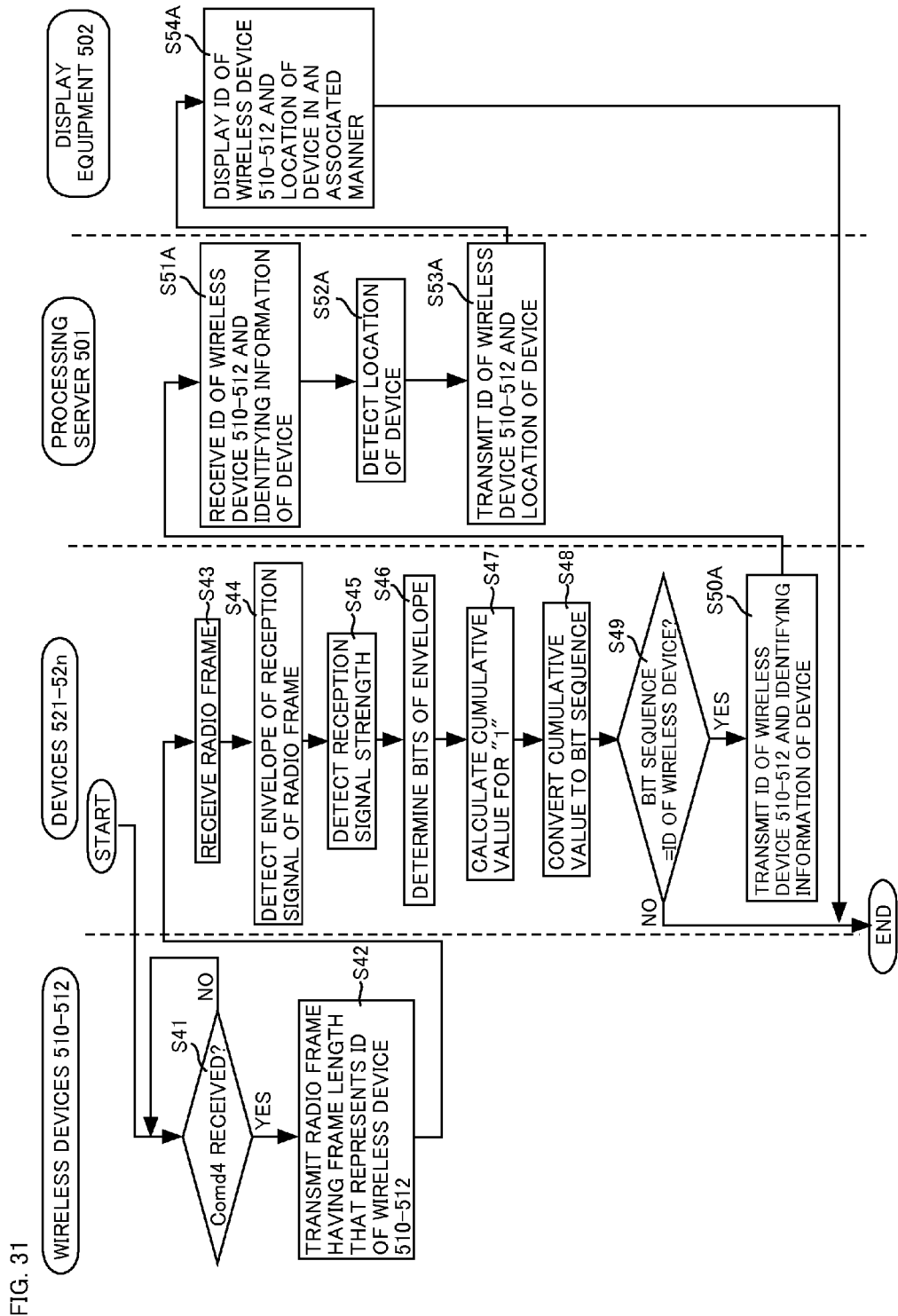
FIG. 31 is a flow chart illustrating the operation of the control system shown in FIG. 30.

FIG. 31 is a flow chart illustrating the operation of the control system 500 shown in FIG. 30. The flow chart shown in FIG. 31 is the same as that shown in FIG. 29 except that steps S50 to S54 of the flow chart shown in FIG. 29 are replaced by steps S50A to S54A, respectively.

Referring to FIG. 31, upon starting the operation of the control system 500, steps S41 to S49 described above are sequentially performed. In this case, at step S42, each of the wireless devices 510 to 512 transmits, at regular periods or arbitrary intervals, a radio frame having a frame length that represents its own ID.

At steps S43 to S49, each of the devices 521 to 52n receives the radio frame from one of the wireless devices 510 to 512 and detects the bit sequence based on the received radio wave of the received radio frame.

If it is determined at step S49 that the detected bit sequence matches the ID of one of the wireless devices 510 to 512, each of the devices 521 to 52n transmits the ID of the wireless device (one of the wireless devices 510 to 512) and its own identifying information to the processing server 501 (step S50A).

The processing server 501 receives the ID of the wireless device (one of the wireless devices 510 to 512) and the identifying information of the device (one of the devices 521 to 52n) (step S51A).

Then, the processing server 501 refers to the correspondence table TBL3 to detect the location of the device (one of the devices 521 to 52n) corresponding to the identifying information of the device (one of the devices 521 to 52n) (step S52).

Thereafter, the processing server 501 transmits the ID of the wireless device (one of the wireless devices 510 to 512) and the location of the device (one of the devices 521 to 52n) to the display equipment 502 (step S53A), and the display equipment 502 displays the ID of the wireless device (one of the wireless devices 510 to 512) and the location of the device (one of the devices 521 to 52n) in an associated manner (step S54A). Thus, the process ends.

As the control system 500 is used, the processing server 501, upon reception of the ID of the wireless devices 510 to 512, controls the display equipment 502 to display the ID of the wireless devices 510 to 512 and the location of the device (one of the devices 521 to 52n) that has transmitted the ID of the wireless devices 510 to 512 in an associated manner. Thus, a device (i.e. the display equipment 502) may be controlled based on information that identifies the transmission source (i.e. the ID of the wireless devices 510 to 512).

Further, since the IDs of the wireless devices 510 to 512 are received by one of the devices 521 to 52n, each of the wireless devices 510 to 512 is located near one of the devices 521 to 52n.

Thus, in the control system 500, the location of the device (one of the devices 521 to 52n) that has received the IDs of the wireless devices 510 to 512 is displayed on the display equipment 502 as the locations of the wireless devices 510 to 512.

The control system 500 may be provided in a hospital, for example, where each of the wireless devices 510 to 512 is held by a doctor or a nurse.

Thus, by displaying the location of a doctor or a nurse on the display equipment 502, it is possible to know where the doctor or the nurse is located.

Instead of in a hospital, the control system 500 may be provided in a school; in general, it may be provided in facilities where a plurality of persons work.

In the control system 500, each of the devices 521 to 52n constitutes a "communication device", the processing server 501 constitutes the "control device", and the display equipment 502 constitutes the "controlled element".

Embodiment 3

Figure 32:
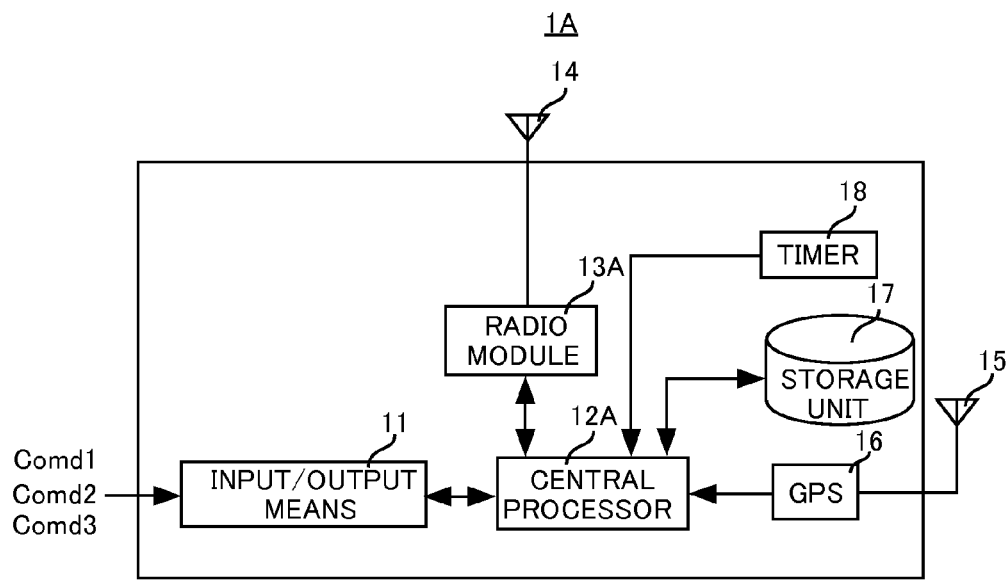
FIG. 32 is a schematic diagram of a configuration of the wireless device shown in FIG. 1 according to Embodiment 3.

FIG. 32 is a schematic diagram of a configuration of the wireless device 1 shown in FIG. 1 according to Embodiment 3. In Embodiment 2, the wireless device 1 is composed of the wireless device 1A shown in FIG. 20.

To control a controlled device, the wireless device 1A complies with a Carrier Sense Multiple Access with Collision Avoidance (SCMA/CA) wireless communication scheme to transmit radio frames to the receiver of a controlled device in a desired frequency band that includes a plurality of frequency channels such that a control identifier CID for the controlled device may be detected by the receiver of the controlled device. That is, the wireless device 1A transmits a control identifier CID for a controlled device to the receiver mounted on the controlled device by repeatedly performing the process of transmitting one radio frame such that a time interval between timings at which the receiver mounted on the controlled device detects a radio frame is equal to one of one or more signal detection intervals that represent the control identifier CID for the controlled device.

The desired frequency band may be, for example, an ISM band. The CSMA/CA wireless communication scheme means a wireless communication scheme where a device performs carrier sensing, and transmits a radio signal when the wireless communication space is available and waits to transmit a radio signal when the wireless communication space is not available.

Referring to FIG. 32, the wireless device 1A is the same as the wireless device 1 except that the central processor 12 of the wireless device 1 shown in FIG. 2 is replaced by a central processor 12A and the radio module 13 is replaced by a radio module 13A.

The central processor 12A controls the radio module 13A to perform carrier sensing. Similar to the central processor 12, the central processor 12A generates a control identifier CID for a controlled device (=at least one of the devices 2 to 4). If, based on the result of carrier sensing by the radio module 13A, the central processor 12A determines that the wireless communication space is available, it controls the timing in which the radio module 13A transmits radio frames such that the signal detection intervals representing the generated control identifier CID may be detected by the receiver of the controlled device (=at least one of the devices 2 to 4). If, based on the result of carrier sensing by the radio module 13A, the central processor 12A determines that the wireless communication space is not available, it does not control the timing in which the radio module 13A transmits radio frames.

Otherwise, the central processor 12 A performs the same functions as the central processor 12.

In accordance with control by the central processor 12A, the radio module 13A performs carrier sensing via the antenna 14, and outputs the result of carrier sensing to the central processor 12A. Further, the radio module 13A transmits radio frames to the receiver of the controlled device (=at least one of the devices 2 to 4) via the antenna 14 in accordance with the transmission timing controlled by the central processor 12A.

Otherwise, the radio module 13A performs the same functions as the radio module 13.

Figure 33:
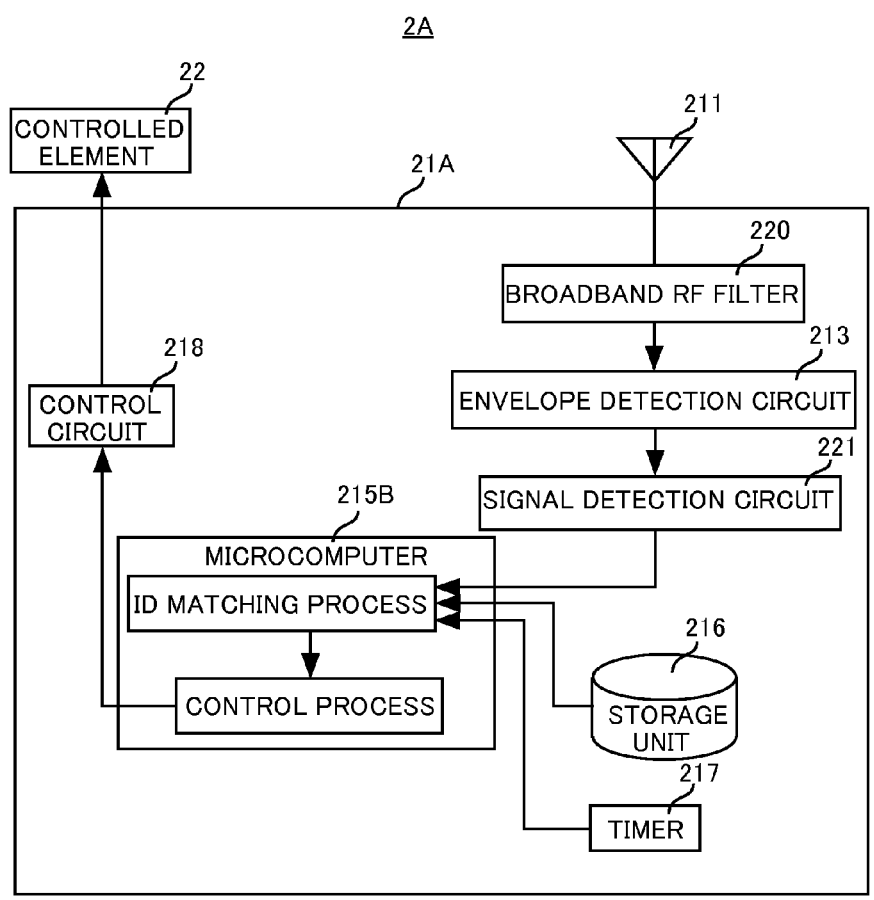
FIG. 33 is a schematic diagram of a configuration of a device shown in FIG. 1 according to Embodiment 3.

FIG. 33 is a schematic diagram of a configuration of the devices 2 to 4 shown in FIG. 1 according to Embodiment 3. In Embodiment 3, each of the devices 2 to 4 is composed of the device 2A shown in FIG. 33.

The device 2A receives radio frames from the wireless device 1A in a desired frequency band including a plurality of frequency channels and, if the received radio frames match a control identifier CID for itself, controls the controlled element 22 based on the control identifier CID.

Referring to FIG. 33, the device 2A is the same as the device 2 shown in FIG. 3 except that the receiver 21 of the device 2 is replaced by a receiver 21A.

The receiver 21A is the same as the receiver 21 shown in FIG. 3 except that the RF filter 212 of the receiver 21 is replaced by a broadband RF filter 220, the bit determiner 214 is replaced by a signal detection circuit 221, and the microcomputer 215 is replaced by a microcomputer 215B.

In the receiver 21A, the antenna 211 is connected to the broadband RF filter 220. The broadband RF filter 220 receives a reception signal of a radio frame via the antenna 211 and outputs only those components of the received reception signal that are contained in the desired frequency band to the envelope detection circuit 213.

The signal detection circuit 221 receives the envelope from the envelope detection circuit 213. Then, the signal detection circuit 221 samples the envelope at a sampling period to convert it to a digital signal sequence and outputs the converted digital signal sequence to the microcomputer 215B.

The microcomputer 215B sequentially performs an ID matching process and control process. In the ID matching process, the microcomputer 215B receives the digital signal sequence from the signal detection circuit 221 and reads the control identifiers CID for the device 2A from the storage unit 216. Then, the microcomputer 215B determines whether the digital signal sequence matches the control identifiers CID for the device 2A.

If the microcomputer 215B determines that the digital signal sequence matches the control identifiers CID, it outputs the control action for the controlled element 22 to the control circuit 218 based on this control identifier CID. That is, the microcomputer 215B performs the control process.

If the microcomputer 215B determines that the digital signal sequence does not match the control identifiers CID, it discards the digital signal sequence.

Otherwise, the microcomputer 215B performs the same functions as the microcomputer 215.

Figure 34:
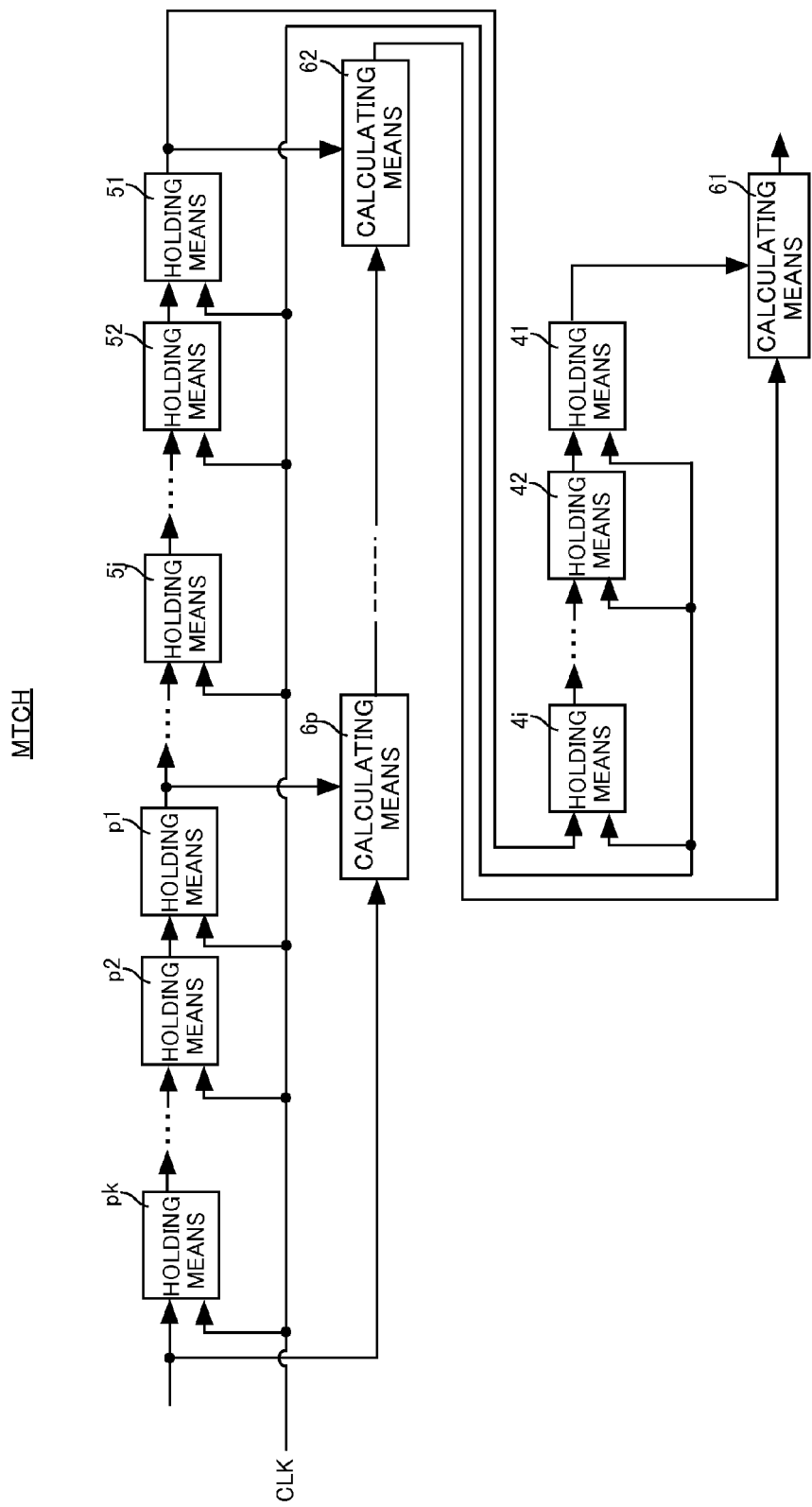
FIG. 34 shows functional blocks of a matching-processing means that performs the ID matching process in the microcomputer shown in FIG. 33.

FIG. 34 shows functional blocks of a matching-processing means that performs the ID matching process in the microcomputer 215B shown in FIG. 33.

Referring to FIG. 34, the matching-processing means MTCH of the microcomputer 215B includes holding means 41 to 4$i$ (i is a positive integer), 51 to 5$j$ (j is a positive integer), p1 to pk (p is an integer equal to the number of signal detection intervals that constitute a control identifier CID for the device 2A; k is a positive integer), and calculating means 61 to 6$p$.

The holding means 41 to 4$i$, 51 to 5$j$, p1 to pk are connected in series. Each of the holding means 41 to 4$i$, 51 to 5$j$, p1 to pk operates in synchronization with the clock CLK. The period of the clock CLK is equal to the sampling period T of the device 2A.

The holding means 41 to 4$i$, 51 to 5$j$, p1 to pk−1 receive a signal from the holding means 42 to 4$i$, 51, 52 to 5$j$, p1, p2 to pk, respectively. The holding means pk receives a digital signal from the signal detection circuit 221. The holding means 42 to 4$i$, 51 to 5$j$, p1 to pk hold a signal for one period of the clock CLK and output the held signal to the holding means 41 to 4$i$−1, 4$i$, 51 to 5$j$−1, 5$j$, p1 to pk−1, respectively. The holding means 41 outputs a signal to the calculating means 61, the holding means 51 outputs a signal to the calculating means 62 also, and so forth, and the holding means p1 outputs a signal to the calculating means 6$p$ also.

The calculating means 61 calculates the logical product of the signal from the holding means 41 and the signal from the calculating means 62, and outputs the calculation result to the microcomputer 215B. The calculating means 62 calculates the logical product of the signal from the holding means 51 and the signal from the calculating means 63 (not shown), and outputs the calculation result to the calculating means 61. And so forth, and; the calculating means 6$p$ calculates the logical product of the signal from the holding means p1 and the signal from the signal detection circuit 221, and outputs the calculation result to the calculating means 6$p$−1 (not shown).

If a control identifier CID for the device 2A is represented by signal detection intervals, the holding means 41 to 4$i$ detect a time interval corresponding to the first one of the plurality of signal detection intervals constituting the control identifier CID; the holding means 51 to 5$j$ detect a time interval corresponding to the second one of the plurality of signal detection intervals constituting the control identifier CID; and so forth, and; the holding means p1 to pk detect a time interval corresponding to the last one of the plurality of signal detection intervals constituting the control identifier CID.

Figure 35:
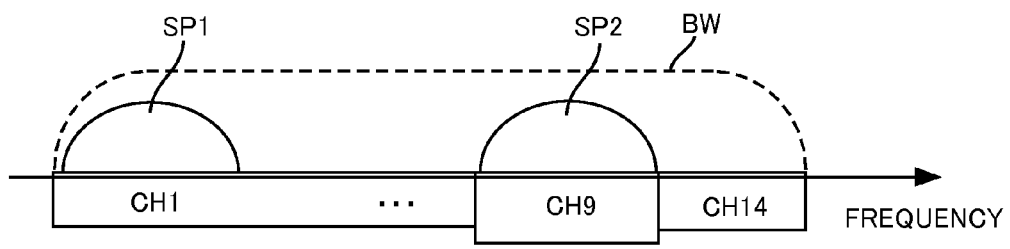
FIG. 35 is a conceptual diagram of frequency bands.

FIG. 35 is a conceptual diagram of frequency bands. Referring to FIG. 35, the frequency band BW is an ISM frequency band. The frequency band BW includes channels CH1 to CH14.

The spectrum SP1 is the spectrum of a desired wave, and the spectrum SP2 is the spectrum of a wave other than the desired wave on another channel.

Thus, the frequency band BW is a frequency band including a plurality of frequency channels.

The wireless device 1A performs carrier sensing in the frequency band of channel CH1 and, if the frequency band of channel CH1 is available, transmits radio frames.

The broadband RF filter 220 shown in FIG. 33 passes those components of the reception signal of a radio signal that are in the frequency band BW. Therefore, the receiver 21A receives, in addition to radio frames transmitted by the wireless device 1A, radio frames transmitted on channels other than channel CH1, such as channel CH9.

Figure 36:
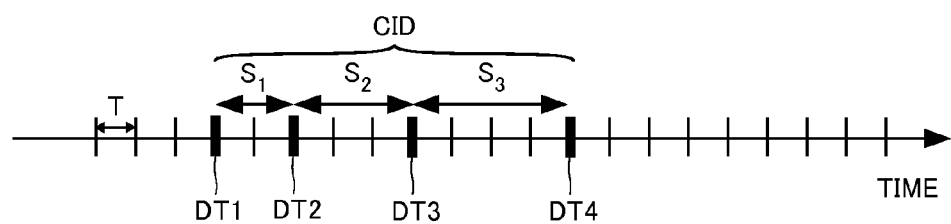
FIG. 36 is a conceptual diagram of signal detection intervals that represent a control identifier for a device.

FIG. 36 is a conceptual diagram of signal detection intervals that represent a control identifier CID for the device 2A. Referring to FIG. 36, a control identifier CID for the device 2A may be made up of the pattern [$S_1 S_2 S_3$] of three signal detection intervals $S_1$, $S_2$ and $S_3$, for example. If the sampling period of an envelope at the receiver 21A is denoted by T, the signal detection interval $S_1$ is 2T, the signal detection interval $S_2$ is 3T, and the signal detection interval $S_3$ is 4T. The sampling period T may be 500 μs, for example.

To detect the three signal detection intervals $S_1$, $S_2$ and $S_3$, it is necessary to determine that the reception signals in the four detection timings DT1 to DT4 are "1".

If the number of detection timings is denoted by k (k is an integer not less than 2), a control identifier CID for the device 2A is represented by k−1 signal detection intervals $S_1$ to $S_{k-1}$. For example, if k=n, 0≤$S_i$≤mT (i=1, 2, . . . , n−1; m is a positive integer), the $m^{n-1}$ control identifiers CID shown in Table 1 may be represented by the signal detection intervals $S_1$ to $S_{n-1}$.

TABLE 1

| ID | $S_1$ | $S_2$ | ... | $S_{n-1}$ |
|---|---|---|---|---|
| 0 | T | T | ... | T |
| 1 | 2T | T | ... | T |
| 2 | 3T | T | ... | T |
| . | . | . | . | . |
| . | . | . | . | . |
| . | . | . | . | . |
| m − 1 | mT | T | ... | T |
| m | T | 2T | ... | T |
| m + 1 | T | 3T | ... | T |
| . | . | . | . | . |
| . | . | . | . | . |
| $m^{n-1}$ | mT | mT | ... | mT |

Accordingly, in Embodiment 3, a control identifier CID for the device 2A that is to be controlled is represented by one of the $m^{n-1}$ control identifiers CID shown in Table 1.

Figure 37:
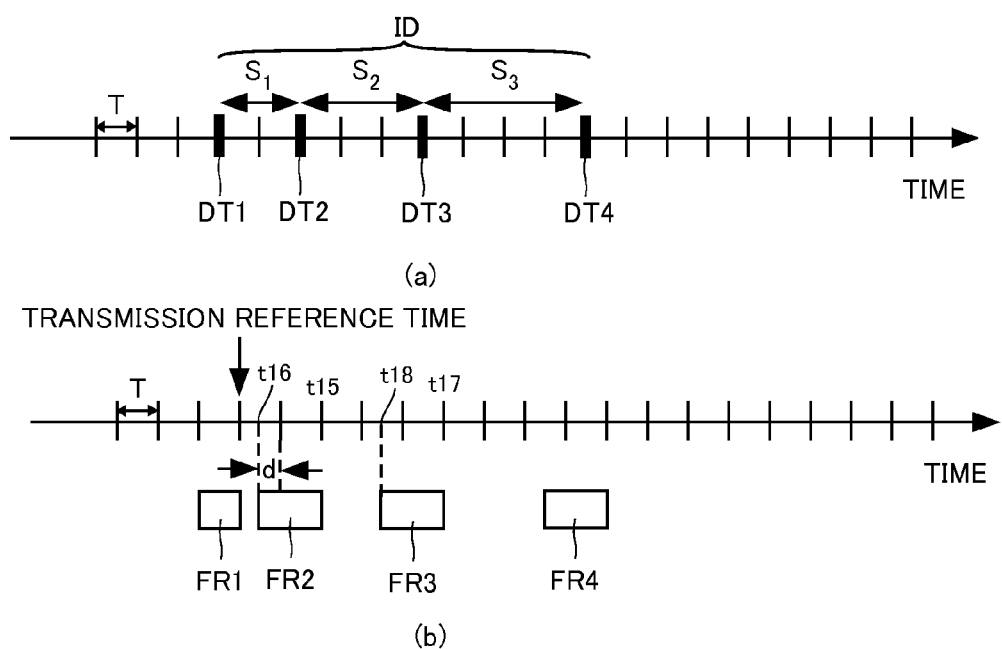
FIG. 37 illustrates a method of transmitting radio frames in the wireless device shown in FIG. 32.

FIG. 37 illustrates a method of transmitting radio frames in the wireless device 1A shown in FIG. 32.

FIG. 37($a$) shows detection timings in the receiver 21A, and FIG. 37($b$) shows reference timings of transmission control of radio frames in the wireless device 1A.

Referring to FIG. 37, a control identifier CID for the device 2A is made up of the above-described pattern of signal detection intervals, $[S_1S_2S_3]$. The wireless device 1A sequentially transmits four radio frames FR1 to FR4 in such a way that the receiver 21A can detect that the reception signals at the detection timings DT1 to DT4 are "1" to detect the signal detection interval $S_1$ with 2T, the signal detection interval $S_2$ with 3T and the signal detection interval $S_3$ with 4T.

A more specific description will be given. The wireless device 1A transmits the radio frame FR1 with a frame length of T. Then, the wireless device 1A defines the time at which transmission of the radio frame FR1 is completed as a transmission reference time for the radio frames FR2 to FR4 (see FIG. 37(b)).

By receiving the radio frame FR1, the receiver 21A can detect that the reception signal at the detection timing DT1 is "1". As a result, a reference relative to which the signal detection intervals $S_1$, $S_2$ and $S_3$ may be detected is determined.

Thereafter, the wireless device 1A transmits the radio frame FR2 such that the receiver 21A may detect that the reception signal at the detection timing DT2 is "1". That is, the wireless device 1A attempts to transmit the radio frame FR2 prior to the transmission control reference timing by the transmission spare time d, and transmits the radio frame FR2 such that the radio frame FR2 straddles the detection timing DT2. The transmission spare time d may be 100 μs, for example.

Subsequently, the wireless device 1A sequentially transmits the radio frames FR3 and FR4 in an analogous manner (see FIG. 37(b)).

Figure 38:
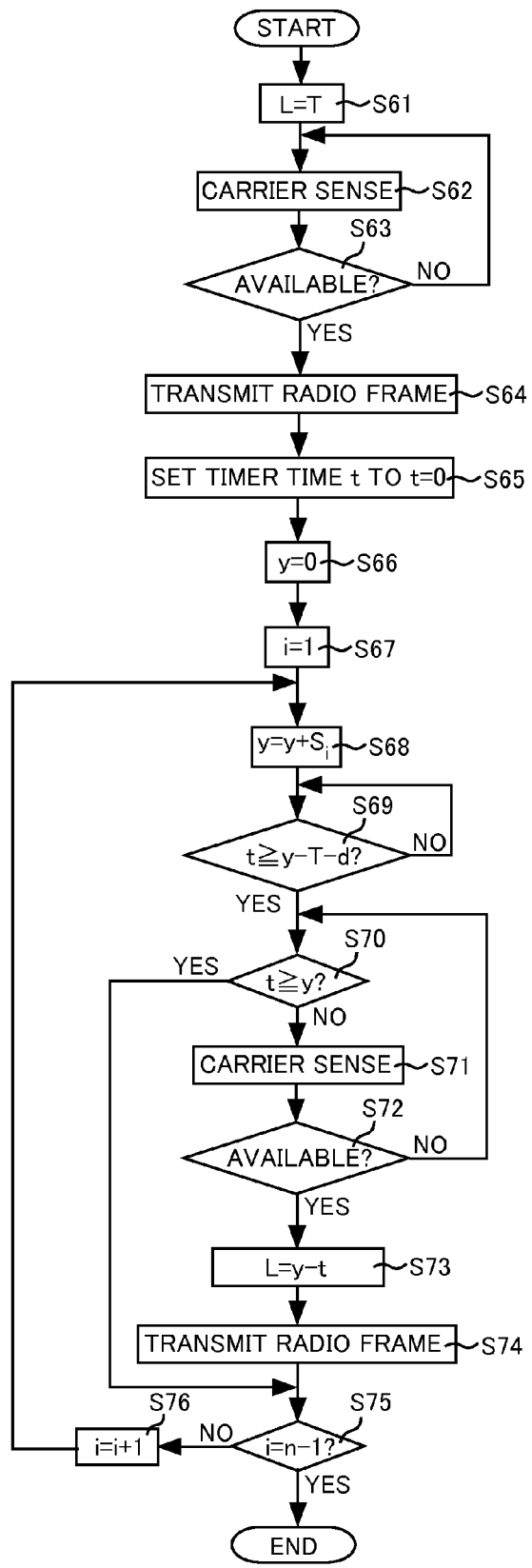
FIG. 38 is a flow chart showing the method of transmitting a radio frame in the wireless device shown in FIG. 32.

FIG. 38 is a flow chart showing the method of transmitting a radio frame in the wireless device 1A shown in FIG. 32. The flow chart shown in FIG. 38 is a flow chart executed in lower-order layers (i.e. the MAC layer and physical layer).

Referring to FIG. 38, upon starting the transmission of radio frames, the central processor 12A of the wireless device 1A sets the length L of a radio frame to L=T (step S61).

Then, the central processor 12A controls the radio module 13A to perform carrier sensing, and the radio module 13A performs carrier sensing in the frequency band of channel CH1, for example (step S62), and outputs the result of carrier sensing to the central processor 12A.

Based on the result of carrier sensing received from the radio module 13A, the central processor 12A determines whether the frequency band of channel CH1 is available (step S63).

If it is determined at step S63 that the frequency band of channel CH1 is not available, steps S62 and S63 are repeatedly executed. That is, the wireless device 1A waits to transmit radio frames.

If it is determined at step S63 that the frequency band of channel CH1 is available, the central processor 12A controls the radio module 13A to transmit a radio frame with a frame length of T, and the radio module 13A transmits a radio frame via the antenna 14 in accordance with control by the central processor 12A (step S64).

Then, the central processor 12A sets the time t of the timer 18 to t=0 (step S65), and sets the frame transmission completion time y to y=0 (step S66).

Then, the central processor 12A sets i to i=1 (step S67), and sets y to y=y+$S_i$ (step S68).

Thereafter, the central processor 12A determines whether t≥y−T−d is satisfied (step S69). If it is determined at step S69 that t≥y−T−d is satisfied, the central processor 12A further determines whether t≥y is satisfied (step S70). If it is determined at step S70 that t≥y is satisfied, the process proceeds to step S75.

If it is determined at step S70 that t<y is satisfied, the central processor 12A controls the radio module 13A to perform carrier sensing, and the radio module 13A performs carrier sensing in the frequency band of channel CH1, for example (step S71), and outputs the result of carrier sensing to the central processor 12A.

Based on the result of carrier sensing received from the radio module 13A, the central processor 12A determines whether the frequency band of channel CH1 is available (step S72).

If it is determined at step S72 that the frequency band of channel CH1 is not available and then it is determined at step S70 that t<y is satisfied again, steps S71 and S72 are repeatedly executed. That is, the wireless device 1A waits to transmit radio frames. If it is determined at step S70 that t≥y is satisfied again, the process proceeds to step S75.

If it is determined at step S72 that the frequency band of channel CH1 is available, the central processor 12A sets the frame length L to L=y−t (step S73), and controls the radio module 13A to transmit a radio frame with a frame length of L=y−t. Then, the radio module 13A transmits radio frames in accordance with control by the central processor 12A (step S74).

If it is determined at step S70 that t≥y is satisfied, or after step S74, the central processor 12A determines whether i=n−1 is satisfied (step S75).

If it is determined at step S75 that i=n−1 is not satisfied, the central processor 12A sets i to i=i+1 (step S76). Thereafter, the process returns to step S68 and above-described steps S68 to S76 are repeatedly executed until it is determined at step S75 that i=n−1 is satisfied. If it is determined at step S75 that i=n−1 is satisfied, the operation of transmitting radio frames in the wireless device 1A ends.

The radio frame FR1 shown in FIG. 37(b) is transmitted by the above-described steps S61 to S74. Then, the transmission completion time of the radio frame FR1 is set to the reference (=0) of the timer time t (see step S5). Thereafter, the frame transmission completion time y is set to "0" (step S66).

By executing steps S68 to S74 for the first time, the radio frame FR2 is transmitted. A more specific description will be given. Since $S_1$=2T, y=y+$S_1$ of step S68 sets the frame transmission completion time y to the transmission control reference timing t15, which is 2T after the transmission completion time for the radio frame FR1 (see FIG. 37(b)).

Further, y−T−d gives the timing t16 (see FIG. 37(b)). Consequently, determining at step S69 whether t≥y−T−d is satisfied is equivalent to determining whether the timer time t has reached the timing t16. Determining that t≥y−T−d is satisfied is equivalent to determining that the timing at which the radio frame FR2 is to be transmitted has been reached.

Further, it is determined at step S70 whether t≥y is satisfied in order to determine whether the timer time t has reached the frame transmission completion time y (=transmission control reference time point t15). If the timer time t has not reached the frame transmission completion time y (=transmission control reference time point t15), carrier sensing is performed and, if the frequency band of channel CH1 is available, the radio frame FR2 with a frame length of L=y−t (=t15−t16) is transmitted (see "NO" at step S70, and steps S71 to S74).

By executing steps S68 to S74 for the second time, the radio frame FR3 is transmitted. Since $S_2=3T$, $y=y+S_2$ of step S68 sets the frame transmission completion time y to the transmission control reference timing t17, which is 3T after the transmission completion time (=t15) for the radio frame FR2 (see FIG. 37(b)).

Further, y−T−d gives the timing t18 (see FIG. 37(b)). Consequently, if the timer time t has reached the timing t18 and the transmission control reference timing t17 has not passed, the radio frame FR3 is transmitted (see "YES" at step S69, "NO" at step S70, and steps S71 to S74).

Thereafter, the radio frame FR4 is transmitted in an analogous manner.

When the radio frames FR1 to FR4 are transmitted in accordance with the flow chart shown in FIG. 38, the radio frame FR1 has a length of T, and each of the radio frames FR2 to FR4 has a frame length of y−t.

Figure 39:
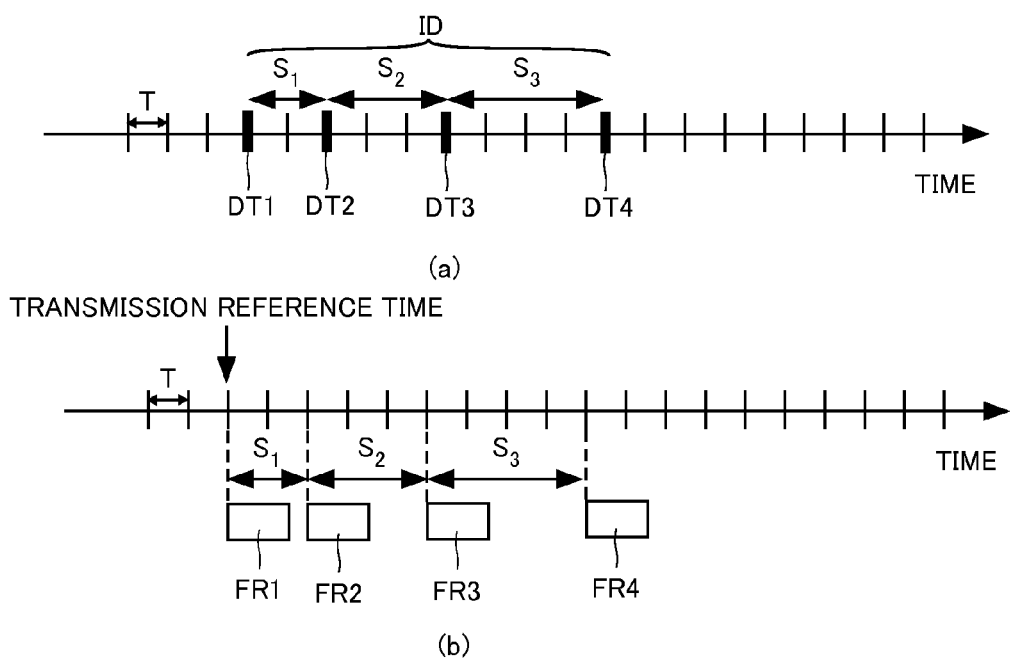
FIG. 39 illustrates another method of transmitting a radio frame in the wireless device shown in FIG. 32.

FIG. 39 illustrates another method of transmitting a radio frame in the wireless device 1A shown in FIG. 32.

FIG. 39(a) shows detection timings of signal detection intervals in the receiver 21A, and FIG. 39(b) shows a transmission control reference timing in the wireless device 1A.

Referring to FIG. 39, the control identifier CID for the device 2A is made up of the above-described pattern of signal detection intervals, $[S_1 S_2 S_3]$. The wireless device 1A sequentially transmits four radio frames FR1 to FR4 in such a way that the receiver 21A detects that the reception signals at the detection timings DT1 to DT4 are "1" to detect the signal detection interval $S_1$ with 2T, the signal detection interval $S_2$ with 3T and the signal detection interval $S_3$ with 4T.

A more specific description will be given. The wireless device 1A transmits the radio frame FR1 in synchronization with an arbitrary transmission control reference timing (=transmission reference time). Then, if the time corresponding to the signal detection interval $S_1$ with 2T passed after the transmission reference time, the wireless device 1A transmits the radio frame FR2. Further, if the time corresponding to the signal detection interval $S_2$ with 3T passed after the transmission start time for the radio frame FR2, the wireless device 1A transmits the radio frame FR3. Further, if the time corresponding to the signal detection interval $S_3$ with 4T passed after the transmission start time for the radio frame FR3, the wireless device 1A transmits the radio frame FR4 (see FIG. 39(b)).

By receiving the radio frames FR1 to FR4, the receiver 21A can determine that the reception signals at the detection timings DT1 to DT4 are "1". As a result, the signal detection intervals $S_1$, $S_2$ and $S_3$ are detected.

Each of the radio frames FR1 to FR4 has a frame length of T+M or greater. Here, M is the maximum difference between the timings in the wireless device 1A and receiver 21A encountered when a radio frame is transmitted using a CSMA/CA wireless communication scheme, and M=50 (DIFS)+15×20(backoff)=350 μs.

Consequently, as the frame length of each of the radio frames FR1 to FR4 is set to T+M or greater, the radio frames FR1 to FR4 are transmitted so as to straddle the detection timings DT1 to DT4 in the receiver 21A, respectively, thereby allowing the receiver 21A to stably detect the three signal detection intervals $S_1$, $S_2$ and $S_3$.

Figure 40:
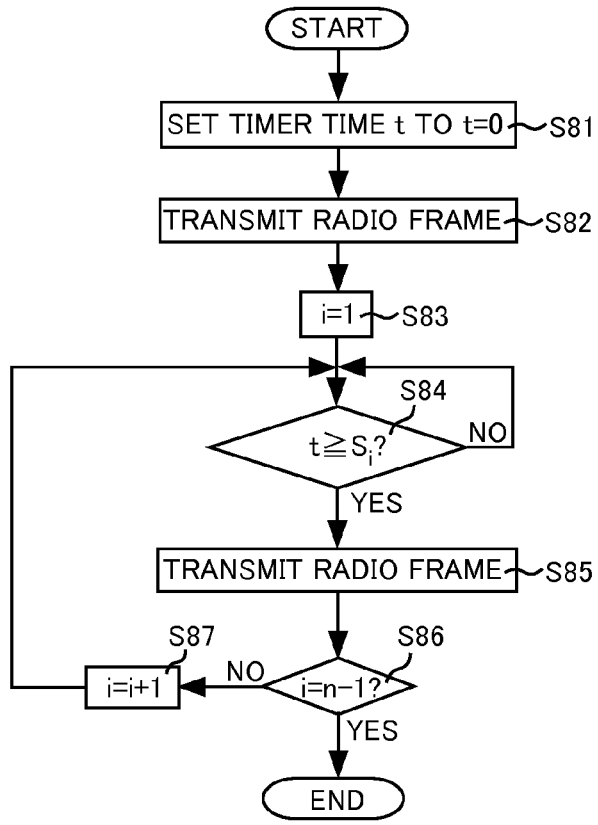
FIG. 40 is a flow chart showing the other method of transmitting a radio frame in the wireless device shown in FIG. 32.

FIG. 40 is a flow chart showing the other method of transmitting a radio frame in the wireless device 1A shown in FIG. 32. The flow chart shown in FIG. 40 is a flow chart executed in an upper-order layer (i.e. the application layer).

Referring to FIG. 40, upon starting transmission of radio frames, the central processor 12A sets the timer time t to t=0 (step S81), and transmits the first radio frame FR1 (step S82).

Then, the central processor 12A sets i to i=1 (step S83), and determines whether the timer time t is not less than the signal detection interval $S_1$ (step S84).

If it is determined at step S84 that the timer time t is not less than the signal detection interval $S_1$, the radio frame FR2 is transmitted (step S85).

Thereafter, the central processor 12A determines whether i=n−1 is satisfied (step S86). If it is determined at step S86 that i=n−1 is not satisfied, the central processor 12A sets i to i=i+1 (step S87). Thereafter, the process returns to step S84, and the above-described steps S84 to S87 are repeatedly executed until it is determined at step S86 that i=n−1 is satisfied. Then, if it is determined at step S86 that i=n−1 is satisfied, the operation of transmitting radio frames in the wireless device 1A ends.

Above-described step S82 transmits the radio frame FR1 shown in FIG. 39(b). Then, when steps S84 and S85 are executed for the first time, if the time corresponding to the signal detection interval $S_1$ passed after the transmission start time for the radio frame FR1, the radio frame FR2 is transmitted (see FIG. 39(b)).

When steps S84 and S85 are executed for the second time, if the time corresponding to the signal detection interval $S_2$ passed after the transmission initiation time for the radio frame FR2, the radio frame FR3 is transmitted (see FIG. 39(b)).

Further, when steps S84 and S85 are executed for the third time, if the time corresponding to the signal detection interval $S_3$ passed after the transmission initiation time for the radio frame FR3, the radio frame FR4 is transmitted (see FIG. 39(b)).

Since the flow chart shown in FIG. 40 is executed in an upper-order layer (i.e. the application layer), as described above, the step of performing carrier sensing and the step of determining whether the wireless communication space is available based on the result of carrier sensing are not shown in FIG. 40. However, after the upper-order layer (i.e. the application layer) of the wireless device 1A transmits radio frames at step S85, the lower-order layers (i.e. the MAC layer and physical layer) of the wireless device 1A perform carrier sensing, and transmit radio frames when the wireless communication space is available and wait to transmit radio frames when the wireless communication space is not available.

Thus, also in the case where the wireless device 1A transmits radio frames in accordance with the flow chart shown in FIG. 40, the wireless device transmits radio frames when the wireless communication space is available and waits to transmit radio frames when the wireless communication space is not available.

Figure 41:
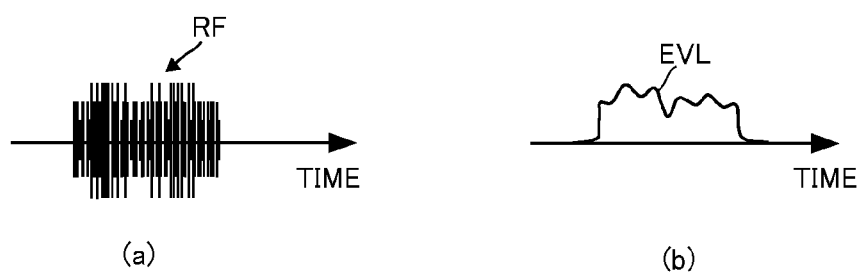
FIG. 41 conceptually shows a wireless signal and envelope.

FIG. 41 conceptually shows a wireless signal and envelope. The broadband RF filter 220 of the receiver 21A receives a reception signal of radio frames via the antenna 211 and outputs those components of the received reception signal that are in the above-described frequency band BW (see FIG. 41(a)), i.e. the reception signal RF, to the envelope detection circuit 213.

Then, the envelope detection circuit 213 detects an envelope of the reception signal RF and outputs the envelope EVL (see FIG. 41(b)) to the signal detection circuit 221.

The signal detection circuit 221 samples the envelope EVL at the sampling period T to convert the envelope EVL to a digital signal. Then, the signal detection circuit 221 outputs the digital signal to the microcomputer 215B.

Figure 42:
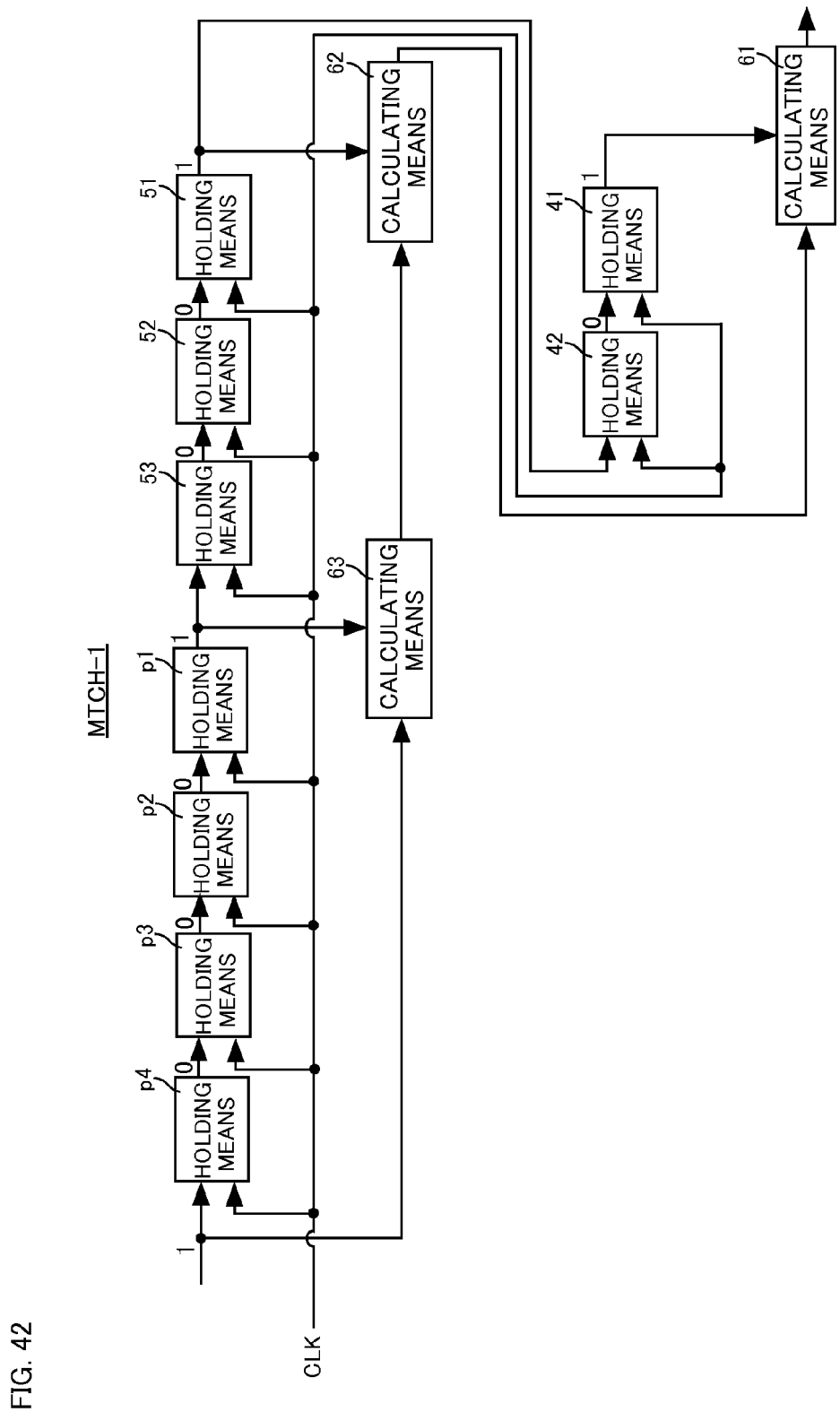
FIG. 42 is a functional block diagram of a specific example of a matching-processing means in the microcomputer.

FIG. 42 is a functional block diagram of a specific example of the matching-processing means MTCH in the microcomputer 215B. If the control identifier CID for the device 2A is made up of the pattern of signal detection intervals, $[S_1S_2S_3]$, the matching-processing means MTCH is composed of the matching-processing means MTCH-1 shown in FIG. 42.

Referring to FIG. 42, the matching-processing means MTCH-1 includes holding means 41, 42, 51 to 53, p1 to p4 and calculating means 61 to 63.

The holding means 41, 42, 51 to 53, p1 to p4 are connected in series. The holding means 41, 42, 51 to 53, p1 to p3 receive a signal from the holding means 42, 51 to 53, p1 to p4, respectively, and outputs the received signal to the calculating means 61, holding means 41, 42, 51 to 53, p1 and p2, respectively. Further, the holding means 51 outputs a signal to the calculating means 62 and the holding means p1 outputs a signal to the calculating means 63 also. Further, the holding means p4 receives a signal from the signal detection circuit 221 and outputs the received signal to the holding means p3.

The calculating means 61 calculates the logical product of a signal from the holding means 41 and a signal from the calculating means 62, and outputs the calculation result to the microcomputer 215B. The calculating means 62 calculates the logical product of a signal from the holding means 51 and a signal from the calculating means 63, and outputs the calculation result to the calculating means 61. The calculating means 63 calculates the logical product of a signal from the holding means p1 and a signal from the signal detection circuit 221, and outputs the calculated logical product to the calculating means 62.

If a control identifier CID for the device 2A is made up of the pattern of signal detection intervals, $[S_1S_2S_3]$, the signal detection circuit 221 samples the envelope EVL at the detection timing DT1 and outputs a signal composed of "1" to the matching-processing means MTCH-1 (see FIG. 37(a)).

Thereafter, the signal detection circuit 221 samples the envelope EVL at the sampling period T and outputs a signal composed of "0" to the matching-processing means MTCH-1 (see FIG. 37(a)).

Subsequently, the signal detection circuit 221 outputs a signal composed of "1" at the detection timing DT2 to the matching-processing means MTCH-1, and outputs a signal composed of "0" to the matching-processing means MTCH-1 at the two sampling timings between the detection timings DT2 and DT3 (see FIG. 37(a)).

Further, the signal detection circuit 221 outputs a signal composed of "1" to the matching-processing means MTCH-1 at the detection timing DT3, outputs a signal composed of "0" to the matching-processing means MTCH-1 at the three sampling timings between the detection timings DT3 and DT4, and outputs a signal composed of "1" to the matching-processing means MTCH-1 at the detection timing DT4 (see FIG. 37(a)).

As a result, the matching-processing means MTCH-1 receives the digital signal sequence [1010010001] from the signal detection circuit 221.

Then, when a signal composed of "1" detected at the detection timing DT4 has been inputted to the matching-processing means MTCH-1, the holding means 41, 42, 51 to 53, p1 to p4 output signals composed of "1", "0", "1", "0", "0", "1", "0", "0" and "0", respectively.

Then, the calculating means 63 calculates the logical product of a signal from the holding means p1 (=1) and a signal from the signal detection circuit 221 (=1), and outputs the calculation result (=1) to the calculating means 62.

The calculating means 62 calculates the logical product of a signal from the holding means 51 (=1) and a signal from the calculating means 63 (=1) and outputs the calculation result (=1) to the calculating means 61.

The calculating means 61 calculates the logical product of a signal from the holding means 41 (=1) and a signal from the calculating means 62 (=1) and outputs the calculation result (=1) to the microcomputer 215B.

Thus, the matching-processing means MTCH-1 uses the holding means 41 and 42 to detect the signal detection interval $S_1$ with 2T, uses the holding means 51 to 53 to detect the signal detection interval $S_2$ with 3T, and uses the holding means p1 to p4 to detect the signal detection interval $S_3$ with 4T, thereby determining that a reception signal received from the wireless device 1A matches the control identifier CID=$[S_1S_2S_3]$.

Thus, if a signal outputted from the matching-processing means MTCH-1 to the microcomputer 215B is composed of "1", it indicates that the reception signal received from the wireless device 1A matches the control identifier CID=$[S_1S_2S_3]$, and if a signal outputted from the matching-processing means MTCH-1 to the microcomputer 215B is composed of "0", it indicates that the reception signal received from the wireless device 1A does not match the control identifier CID=$[S_1S_2S_3]$.

A signal composed of "1" outputted by the holding means 41 indicates that the signal detected at the detection timing DT1 is "1", a signal composed of "1" outputted by the holding means 51 indicates that the signal detected at the detection timing DT2 is "1", a signal composed of "1" outputted by the holding means p1 indicates that the signal detected at the detection timing DT3 is "1", and a signal composed of "1" inputted to the holding means p4 and calculating means 63 indicates that the signal detected at the detection timing DT4 is "1".

Thus, if all of the holding means 41, 51 and p1 output a signal composed of "1" and a signal composed of "1" is inputted to the matching-processing means MTCH-1 when all of the holding means 41, 51 and p1 have outputted a signal composed of "1", it is equivalent to determining that a signal composed of "1" was detected at all of the detection timings DT1 to DT4 for detecting the plurality of signal detection intervals $S_1$, $S_2$ and $S_3$ that represent the control identifier CID for the device 2A based on the digital signal sequence [1010010001].

Figure 43:
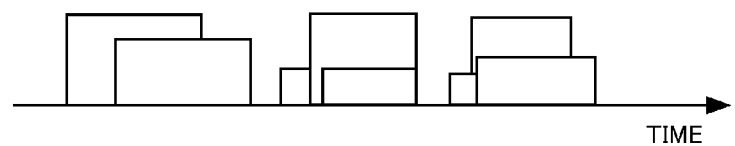
FIG. 43 is a conceptual diagram of reception signals in the case of asynchronous detection.

FIG. 43 is a conceptual diagram of reception signals in asynchronous detection. Referring to FIG. 43, in asynchronous detection, a plurality of reception signals of a plurality of radio frames transmitted on a plurality of channels are detected as overlapping ones.

Therefore, the receiver 21A receives radio frames transmitted by the wireless device 1A and radio frames transmitted by a wireless device other than the wireless device 1A.

Accordingly, in Embodiment 3, signals composed of "1" detected at the detection timings DT1 to DT4 shown in FIG. 37 may not be based on a radio frame transmitted by the wireless device 1A, and may be based on a radio frame transmitted by any wireless device other than the wireless device 1A.

That is, in Embodiment 3, the signal detection circuit 221 detects a signal composed of "1" if a reception signal of a radio frame is present at the detection timings DT1 to DT4 and detects a signal composed of "0" if no reception signal of a radio frame is present at the detection timings DT1 to DT4, and only the reception of a signal composed of "1" is meaningful.

Figure 44:
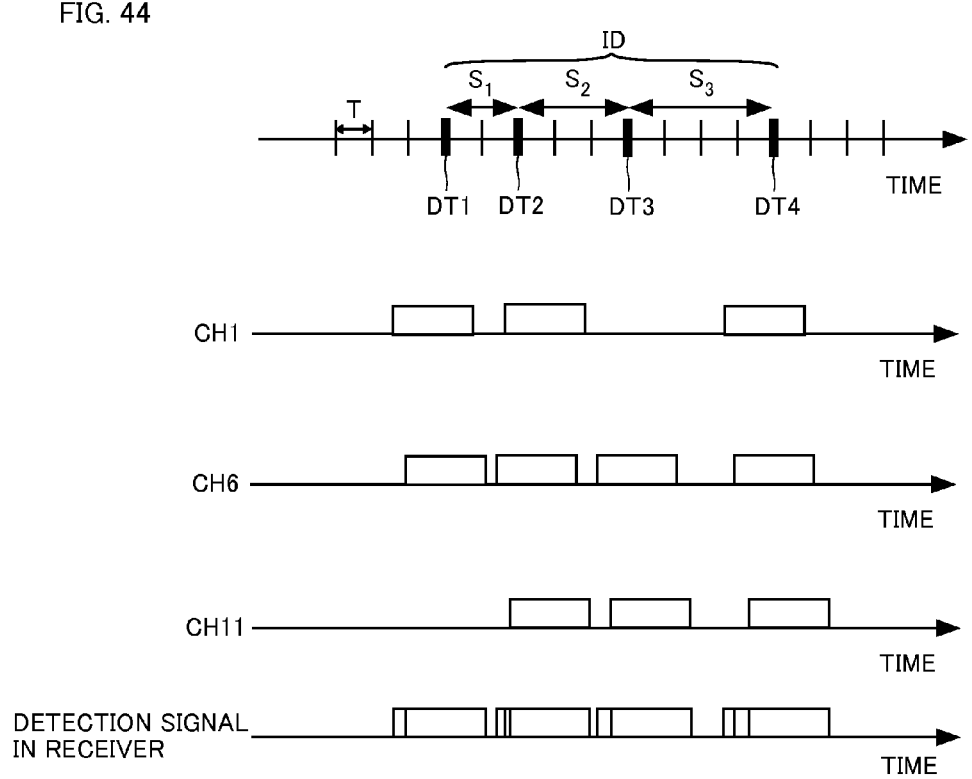
FIG. 44 conceptually illustrates the reception of radio frames via a plurality of channels.

FIG. 44 conceptually illustrates the reception of radio frames from a plurality of channels. Referring to FIG. 44, the wireless device 1A transmits a radio frame on channel CH1, for example, and the receiver 21A receives a plurality of radio frames transmitted on channels CH1, CH6 and CH11, for example.

The superimposition of a radio frame transmitted on channel CH1 and a radio frame transmitted on channel CH6 straddles the detection timing DT1 in the receiver 21A.

The superimposition of a radio frame transmitted on channel CH1, a radio frame transmitted on channel CH6 and a radio frame transmitted on channel CH11 straddles the detection timing DT2 in the receiver 21A.

The superimposition of a radio frame transmitted on channel CH6 and a radio frame transmitted on channel CH11 straddles the detection timing DT3 in the receiver 21A.

The superimposition of a radio frame transmitted on channel CH1, a radio frame transmitted on channel CH6 and a radio frame transmitted on channel CH11 straddles the detection timing DT4 in the receiver 21A.

As a result, even though no radio frame transmitted by the wireless device 1A is present at the detection timing DT3, the receiver 21A detects a signal composed of "1" at all of the detection timings DT1 to DT4 and determines that the reception signal of the radio frames matches a control identifier CID=[$S_1S_2S_3$] for the device 2A.

Thus, in Embodiment 3, the receiver 21A detects a signal composed of "1" at each of the detection timings DT1 to DT4 based on both radio frames transmitted by the wireless device 1A and radio frames transmitted by a wireless device other than the wireless device 1A. Therefore, even if the wireless device 1A fails to transmit radio frames that would straddle the detection timings DT1 to DT4, the receiver 21A determines that the reception signal of radio frames that have been received matches a control identifier CID for the device 2A=[$S_1S_2S_3$] if a wireless device other than the wireless device 1A transmits radio frames so as to straddle the detection timings DT1 to DT4.

The receiver 21A can receive a control identifier CID for the device 2A if another wireless device transmits radio frames in the case that the wireless device 1A, when sequentially transmitting a plurality of radio frames, succeeds in transmitting the first radio frame as the wireless communication space is available but then fails to transmit the second radio frame as the wireless communication space is not available when the second radio frame is to be transmitted. In such cases, since the wireless device 1A has started to transmit the control identifier CID to control the device 2A, the wireless device 1A can control the device 2A even if some of the plurality of radio frames for transmitting the control identifier CID are transmitted by another wireless device. Thus, even if the wireless device 1A fails to transmit the radio frames so as to straddle the detection timings DT1 to DT4, the receiver 21A may determine that the reception signal of the received radio frames matches a control identifier CID for the device 2A=[$S_1S_2S_3$] if a wireless device other than the wireless device 1A transmits radio frames so as to straddle the detection timings DT1 to DT4.

Therefore, it is possible to control absolutely the controlled device (=device 2A) when one desires to control it.

Particularly, if in the case that there is a hidden terminal for the wireless device 1A, a radio frame transmitted by this hidden terminal may be used as a radio frame for detecting the control identifier CID for the device 2A.

Figure 45:
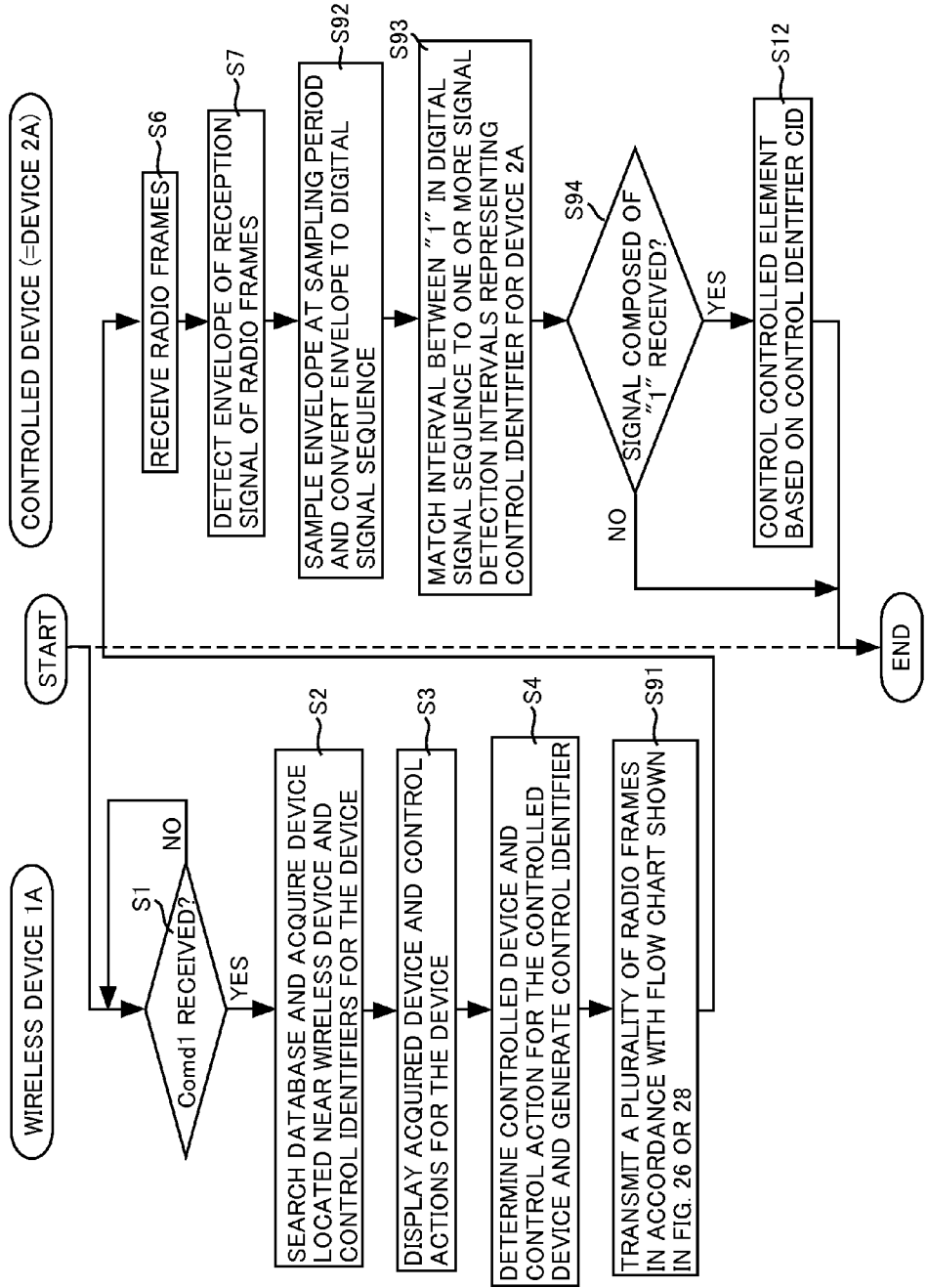
FIG. 45 is a flow chart illustrating the operation of the control system shown in FIG. 1 according to Embodiment 3.

FIG. 45 is a flow chart illustrating the operation of the control system 10 shown in FIG. 1 according to Embodiment 3.

The flow chart shown in FIG. 45 is the same as that of FIG. 10 except that step S5 of the flow chart shown in FIG. 10 is replaced by step S91 and steps S8 to S11 are replaced by steps S92 to S94.

Referring to FIG. 45, upon starting a series of operation, the steps S1 to S4 described above are sequentially executed. Then, after the step S4, the wireless device 1A transmits a plurality of radio frames in accordance with the flow chart shown in FIG. 38 or 40 (step S91).

Then, the steps S6 and S7 described above are sequentially executed. Then, after the step S7, the signal detection circuit 221 samples the envelope received from the envelope detection circuit 213 at the sampling period to convert the envelope to a digital signal sequence (step S92), and outputs the converted digital signal sequence to the microcomputer 215B.

The matching-processing means MTCH of the microcomputer 215B matches the intervals between "1" in the digital signal sequence to the one or more signal detection intervals that represent the control identifier CID for the device 2A (step S93).

Then, the microcomputer 215B determines whether it has received a signal composed of "1" from the matching-processing means MTCH (step S94).

If, at the step S94, the microcomputer 215B determines that it has received a signal for "1" from the matching-processing means MTCH, the step S12 described above is executed.

If, at the step S94, the microcomputer 215B determines that it has not received a signal composed of "1" from the matching-processing means MTCH, or after the step S12, the series of operation ends.

At the step S91, the wireless device 1A transmits a plurality of radio frames in accordance with the flow chart shown in FIG. 38 or 40 and as the result, the receiver 21A of the device 2A determines that the reception signal received from the wireless device 1A matches the pattern of the plurality of signal detection intervals [$S_1S_2S_3$] that represent the control identifier CID for the device 2A (see step S93). At this moment, the receiver 21A detects that the reception signal at each of the detection timings DT1 to DT4 is "1" and the time interval between two adjacent detection timings (DT1 and DT2, for example) is equal to one of the plurality of signal detection intervals $S_1$, $S_2$ and $S_3$. If the wireless communication space is available as the result of the carrier sensing, the wireless device 1A transmits one radio frame (see FIG. 38, step S71, "YES" at step S72, steps S73 and S74, and FIG. 40, step S85). The wireless device 1A waits to transmit radio frames until it is determined based on the result of carrier sensing that the wireless communication space is available (see FIG. 38, step S71 and "NO" at step S72). As described above, also in the case that the wireless device 1A transmits radio frames in accordance with the flow chart shown in FIG. 40, it transmits radio frames when the wireless communication space is available and waits to transmit radio frames when the wireless communication space is not available.

Thus, that at the step S91 the wireless device 1A transmits a plurality of radio frames in accordance with the flow chart shown in FIG. 38 or 40 corresponds to that the wireless device 1A performs, each time carrier sensing is performed, a transmission process in which the wireless device transmits, when the wireless communication space is available, one radio frame in a desired frequency band such that each of the time intervals between the detection timings for radio frames at the controlled device (=device 2A) that is to be controlled constitutes one of the one or more signal detection intervals that represent a control identifier CID for the controlled device (=device 2), and waits to transmit one radio frame when the wireless communication space is not available as the result of carrier sensing.

Thus, according to the flow chart shown in FIG. 45, the wireless device 1A searches the database DB and, based on its positional information, acquires the devices 2 to 4 (=device 2A) located near itself and the control identifiers CID for the devices 2 to 4 (=device 2A), and determines a controlled device out of the devices 2 to 4 (=device 2A) and transmits the control identifier CID for the determined controlled device to the receiver 21A of the controlled device to control the controlled device.

Thus, a device to be controlled (a light, for example) may be specified, and the control identifiers for controlling the device may be acquired in a simple manner to control the controlled device.

The wireless device 1A according to Embodiment 3 transmits, when the wireless communication space is available, one radio frame in a desired frequency band such that the time intervals between the detection timings for radio frames at the receiver 21A of a controlled device that is to be controlled constitutes one of the one or more signal detection intervals that represent a control identifier CID for the controlled device, and waits to transmit a radio frame when the wireless communication space is not available. When the wireless communication space is not available, a wireless device other than the wireless device 1A transmits a radio frame. As a result, the receiver 21A of the controlled device receives radio frames from the wireless device 1A when the wireless communication space is available, and receives radio frames from a wireless device other than the wireless device 1A when the wireless communication space is not available. Then, the receiver 21A of the controlled device detects a signal composed of "1" at each detection timing detecting each of one or more signal detection intervals that represent a control identifier CID for the controlled device, and determines that the reception signal matches the control identifier CID for the control device and controls the controlled element 22.

Therefore, it is possible to control absolutely the controlled device when one desires to control it.

In Embodiment 3, as described above, a control identifier CID for a controlled device (=device 2A) is represented by one or more signal detection intervals and is transmitted to the receiver 21A of the controlled device (=device 2A), while in Embodiment 1, as described above, a control identifier CID for a controlled device (=device 2A) is represented by a frame length and is transmitted to the receiver 21A of the controlled device (=device 2A). That is, Embodiment 1 and Embodiment 3 are different from each other only in terms of how a control identifier CID for the controlled device (=device 2A) is transmitted, and otherwise are the same.

Accordingly, example implementations similar to Example Implementations 1 to 3 of Embodiment 1 may be carried out in Embodiment 3.

In this case, the step S5 performed at the step S25 shown in FIG. 11 is executed in accordance with the flow chart shown in FIG. 38 or 40, the step S5 shown in FIG. 12 is executed in accordance with the flow chart shown in FIG. 38 or 40, and the step S5 shown in FIG. 13 is executed in accordance with the flow chart shown in FIG. 38 or 40.

In Embodiment 3, example applications similar to Example Applications 1 to 8 of Embodiment 1 may be carried out.

In Embodiment 3, the additional functions described in connection with Embodiment 1 may be added to the wireless device 1A and devices 2 to 4 (=device 2A).

In Embodiment 3, Embodiment 2 may be carried out. In this case, the IDs of the wireless devices 410, 510 to 512 are represented by the signal detection intervals.

Otherwise, Embodiment 3 may be described in a manner similar to that of Embodiments 1 and 2.

Figure 46:
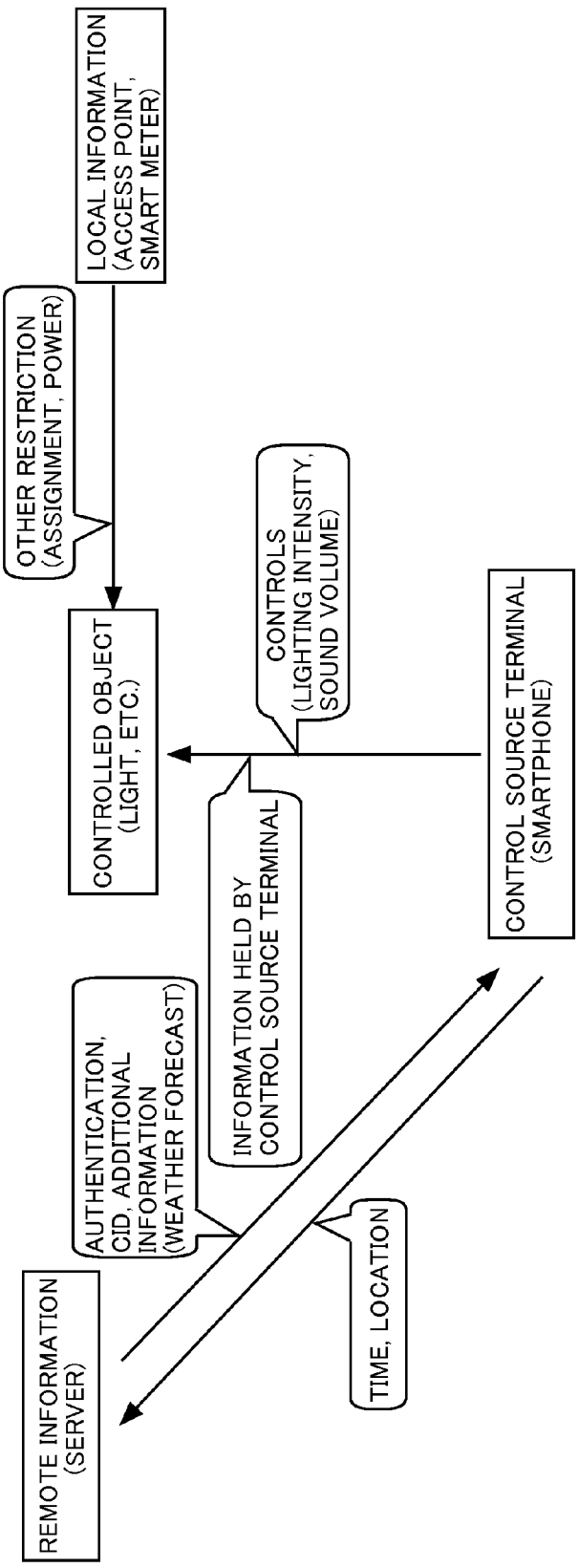
FIG. 46 is a conceptual diagram of control systems according to embodiments of the present invention.

FIG. 46 is a conceptual diagram of control systems according to embodiments of the present invention. Referring to FIG. 46, the control source terminal (for example, a smartphone) transmits a control identifier CID for a control object located near itself to the control object in the same way as the wireless devices 1 and 1A described above to control the control object. Here, if the control object is a light, the control source terminal controls the modulated light of the light, or, if the control object is a speaker, controls the sound volume of the speaker.

The control source terminal may access the server and acquire a control identifier CID for the control object from the server to control the control object. Here, the control source terminal may obtain the control identifier CID for the control object from the server if the user of the control source terminals is authenticated as a legitimate user.

The control source terminal may access the server and acquire remote information that the server holds (for example, a weather forecast), and transmit the acquired remote information, together with a control identifier CID for a control object, to the control object to prompt the user of the control source terminal to carry an object that the user is supposed to carry when going out.

The control source terminal may transmit information that it holds, together with a control identifier CID for a control object, to the control object to allow one to know where and when the control source terminal was lost.

The controlling of a control object may be restricted by local information (information relating to assignment to an access point, information held by a smart meter or the like).

Thus, in a control system according to embodiments of the present invention, basically, the control source terminal acquires a control identifier CID for a control object located near itself based on its positional information and controls a control object; further, information held by a server, information held by the control source terminal itself and local information may be used to allow the control source terminal to control the control object, or to restrict the controlling of the control object by the control source terminal.

In the description above, a control identifier CID for a controlled device is transmitted in the form of a frame length of a radio frame or signal detection intervals at the receiver 21A; alternatively, in embodiments of the present invention, a control identifier CID for a controlled device may be transmitted to the receiver of a controlled device using any scheme.

It should be understood that the embodiments disclosed herein are exemplary in every respect and not limitative. The scope of the present invention is not defined by the embodiments described above but the claims, and is intended to cover all the modifications in the spirit and scope equivalent to those of the claims.

INDUSTRIAL APPLICABILITY

The present invention is useful in a wireless device, a controlled device controlled by the same, a control system including a wireless device and a controlled device, and a program for causing a computer in a wireless device to control a controlled device.

The invention claimed is:

1. A wireless device comprising:
searching/acquiring circuitry that performs a searching/acquiring process that searches a database that stores, in an associated manner, positional information of the wireless device, a device and a control identifier that controls the device, and acquires a device located near the wireless device and a control identifier that controls the device based on the positional information of the wireless device;
determining/generating circuitry that performs a determining/generating process that determines a controlled device that is a device to be controlled and a control action for the controlled device based on the device located near the wireless device and the control identifier that controls the device that have been acquired by the searching/acquiring circuitry, and generates a control identifier for the controlled device based on the controlled device and the control action that have been determined; and
transmitting circuitry that performs a transmitting process that transmits, by wireless communication, the control identifier generated by the determining/generating circuitry to a receiver mounted on the controlled device determined by the determining/generating circuitry, wherein
the control identifier includes specifying information that specifies the controlled device and control information that indicates the control action for the controlled device, and
the transmitting circuitry performs the transmitting process by (i) assigning a first time period to the control identifier, (ii) generating a radio frame having a frame length that represents the control identifier by performing RF modulation during a time period corresponding to the first time period, and (iii) transmitting the generated radio frame having the frame length that represents the control identifier.

2. The wireless device according to claim 1, further comprising:
control circuitry that performs an authentication process and, if a user of the wireless device is authenticated as a legitimate user, controls the searching/acquiring circuitry, the determining/generating circuitry, and the transmitting circuitry to execute the searching/acquiring process, the determining/generating process, and the transmitting process, respectively, wherein
the searching/acquiring circuitry performs the searching/acquiring process in accordance with control by the control circuitry,
the determining/generating circuitry performs the determining/generating process in accordance with control by the control circuitry, and
the transmitting circuitry performs the transmitting process in accordance with control by the control circuitry.

3. The wireless device according to claim 1, wherein
the control identifier stored in the database is changed in response to time in accordance with a desired rule, and,
based on the control identifier stored in the database when the database is searched, the searching/acquiring circuitry acquires a device located near the wireless device and a control identifier that controls the device.

4. A controlled device controlled by the wireless device according to claim 1, comprising:

a controlled element that is an electrical device that is to be controlled; and
a receiver that receives a radio frame and, if a control identifier detected based on the received radio frame matches a control identifier for the controlled device, to control the controlled element based on the detected control identifier.

5. The controlled device according to claim 4, further comprising:
storage circuitry that stores the controlled device and a control identifier that controls the controlled device in an associated manner, wherein
the control identifier stored in the storage circuitry is changed in response to time in accordance with a desired rule, and
when the receiver has detected a control identifier based on the radio frame, the receiver uses the control identifier stored in the storage circuitry as a control identifier for the controlled device.

6. The controlled device according to claim 4, wherein the controlled element is in a location associated with the positional information of the wireless device.

7. The controlled device according to claim 4, wherein the receiver is provided in a building, in facilities or above facilities and controls the controlled element in accordance with a desire of a person using the building or the facilities.

8. The controlled device according to claim 4, wherein the controlled element is controlled by a plurality of the wireless devices.

9. A control system comprising:
the wireless device according to claim 4.

10. The control system according to claim 9, wherein the wireless device controls the controlled device using local information held by the wireless device and its authentication information.

11. A control system comprising:
the wireless device according to claim 1.

12. The control system according to claim 11, wherein the wireless device controls the controlled device using local information held by the wireless device and its authentication information.

13. A non-transitory computer readable medium including a computer program that causes a computer to execute control of a controlled device in a wireless device, the program causing the computer to execute:
a first step in which searching/acquiring circuitry performs a searching/acquiring process that searches a database that stores, in an associated manner, positional information of the wireless device, a device and a control identifier that controls the device, and acquires a device located near the wireless device and a control identifier that controls the device based on the positional information of the wireless device;
a second step in which determining/generating circuitry performs a determining/generating process that determines a controlled device that is a device to be controlled and a control action for the controlled device based on the device located near the wireless device and the control identifier that controls the device that have been acquired by the searching/acquiring circuitry, and generates a control identifier for the controlled device based on the controlled device and the control action that have been determined; and
a third step in which transmitting circuitry performs a transmitting process that transmits, by wireless communication, the control identifier generated by the determining/generating circuitry to a receiver mounted on the controlled device determined by the determining/generating circuitry, wherein the control identifier includes specifying information that specifies the controlled device and control information that indicates the control action for the controlled device, and in the third step, the transmitting circuitry performs the transmitting process by (i) assigning a first time period to the control identifier, (ii) generating a radio frame having a frame length that represents the control identifier by performing RF modulation during a time period corresponding to the first time period, and (iii) transmitting the generated radio frame having the frame length that represents the control identifier.

14. The non-transitory computer readable medium including a computer program that causes a computer to execute according to claim 13, further causing the computer to execute a fourth step in which control circuitry performs an authentication process and, if a user of the wireless device is authenticated as a legitimate user, controls the searching/acquiring circuitry, the determining/generating circuitry, and the transmitting circuitry to execute the searching/acquiring process, the determining/generating process, and the transmitting process, respectively, wherein, in the first step, the searching/acquiring circuitry performs the searching/acquiring process in accordance with control by the control circuitry, in the second step, the determining/generating circuitry performs the determining/generating process in accordance with control by the control circuitry, and in the third step, the transmitting circuitry performs the transmitting process in accordance with control by the control circuitry.

15. The non-transitory computer readable medium including a computer program that causes a computer to execute according to claim 13, wherein the control identifier stored in the database is changed in response to time in accordance with a desired rule, and, in the first step, based on the control identifier stored in the database when the database is searched, the searching/acquiring circuitry acquires a device located near the wireless device and a control identifier that controls the device.

16. A wireless device comprising:

searching/acquiring circuitry that performs a searching/acquiring process that searches a database that stores, in an associated manner, positional information of the wireless device, a device and a control identifier that controls the device, and acquires a device located near the wireless device and a control identifier that controls the device based on the positional information of the wireless device;

determining/generating circuitry that performs a determining/generating process that determines a controlled device that is a device to be controlled and a control action for the controlled device based on the device located near the wireless device and the control identifier that controls the device that have been acquired by the searching/acquiring circuitry, and generates a control identifier for the controlled device based on the controlled device and the control action that have been determined; and transmitting circuitry that performs a transmitting process that transmits, by wireless communication, the control identifier generated by the determining/generating circuitry to a receiver mounted on the controlled device determined by the determining/generating circuitry, wherein the control identifier includes specifying information that specifies the controlled device and control information that indicates the control action for the controlled device, and the transmitting circuitry performs the transmitting process by repeatedly performing a process transmitting one radio frame such that a time interval between detection timings at which the receiver detects radio frames is equal to one of one or more signal detection intervals that represent the control identifier.

\* \* \* \* \*